US006564009B2

(12) United States Patent
Owa et al.

(10) Patent No.: US 6,564,009 B2
(45) Date of Patent: May 13, 2003

(54) APPARATUS FOR RECORDING AND/OR REPRODUCING DATA ONTO AND/OR FROM AN OPTICAL DISK AND METHOD THEREOF

(75) Inventors: Hideo Owa, Kanagawa (JP); Shoei Kobayashi, Kanagawa (JP); Susumu Sensyu, Kanagawa (JP); Shinji Katsuramoto, Chiba (JP); Toshio Watanabe, Kanagawa (JP); Hidenori Mori, Kanagawa (JP); Masanobu Yamamoto, Kanagawa (JP); Masaki Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/078,191

(22) Filed: May 13, 1998

(65) Prior Publication Data

US 2003/0002866 A1 Jan. 2, 2003

(30) Foreign Application Priority Data

May 19, 1997 (JP) .............................................. 9-127729
May 19, 1997 (JP) .............................................. 9-127731

(51) Int. Cl.[7] .............................................. H04N 5/781
(52) U.S. Cl. ........................ 386/126; 369/43; 369/47.1; 369/275.1
(58) Field of Search .............................. 386/33, 45, 95, 386/111, 112, 125, 126; 360/97.01, 114, 77.08, 77.05, 132, 133, 135; 369/13, 47.1, 53.1, 43, 59.1, 109.01, 110.01, 116, 32, 124.01, 124.06, 124.09, 124.11, 275.1, 275.2, 275.3, 275.4; H04N 5/76, 5/92, 5/781

(56) References Cited

U.S. PATENT DOCUMENTS

| 4,067,044 A | | 1/1978 | Maeda et al. |
| 4,613,212 A | * | 9/1986 | Norikazu ..................... 350/432 |
| 4,799,112 A | * | 1/1989 | Bremmer et al. ............. 360/51 |
| 5,481,386 A | | 1/1996 | Shimano et al. |
| 5,510,905 A | * | 4/1996 | Birk ........................... 386/125 |
| 5,719,983 A | * | 2/1998 | Henderson et al. .......... 386/125 |
| 5,910,932 A | * | 6/1999 | Watanabe et al. ............. 369/13 |
| 5,956,313 A | * | 9/1999 | Maegawa et al. ........... 369/116 |
| 6,118,753 A | * | 9/2000 | Keshner et al. ........... 369/275.3 |
| 6,154,442 A | * | 11/2000 | Kondo et al. ............... 369/286 |
| 6,181,664 B1 | * | 1/2001 | Kano et al. ................ 369/77.2 |
| 6,217,970 B1 | * | 4/2001 | Arita et al. ................. 360/135 |
| 6,285,823 B1 | * | 9/2001 | Saeki et al. .................... 386/95 |

FOREIGN PATENT DOCUMENTS

| DE | 44 04 635 A1 | 8/1994 |
| EP | 0 409 468 | 1/1991 |
| EP | 0 473 785 | 3/1992 |
| EP | 0 526 185 A2 | 2/1993 |
| EP | 0 571 905 A2 | 12/1993 |
| EP | 0 618 695 A2 | 10/1994 |
| EP | 0 639 830 | 2/1995 |
| EP | 0 674 316 | 9/1995 |
| EP | 0 727 777 | 8/1996 |
| EP | 0 762 398 | 3/1997 |
| EP | 0 840 156 | 5/1998 |
| EP | 0 867 873 | 9/1998 |
| WO | WO96 27880 | 9/1996 |

OTHER PUBLICATIONS

Patent Abstracts of Japan vol. 018, No. 681 (E–1649), Dec. 21, 1994 & JP 06 268954 A (Sony Corp), Sep. 22, 1994.

* cited by examiner

*Primary Examiner*—Thai Tran
(74) *Attorney, Agent, or Firm*—Frommer Lawrence & Haug LLP; William S. Frommer; Dennis M. Smid

(57) ABSTRACT

An optical disk apparatus for recording and/or reproducing user data onto and/or from an optical disk. The apparatus includes an optical head for irradiating a laser beam having a wavelength of approximately 680 (nm) or less to the optical disk and having a lens with a numerical aperture (NA) of approximately 0.7 or more and a working distance of approximately 560 ($\mu$m) or less. By utilizing such apparatus, a relatively large amount of data may be recorded onto the optical disk.

33 Claims, 55 Drawing Sheets

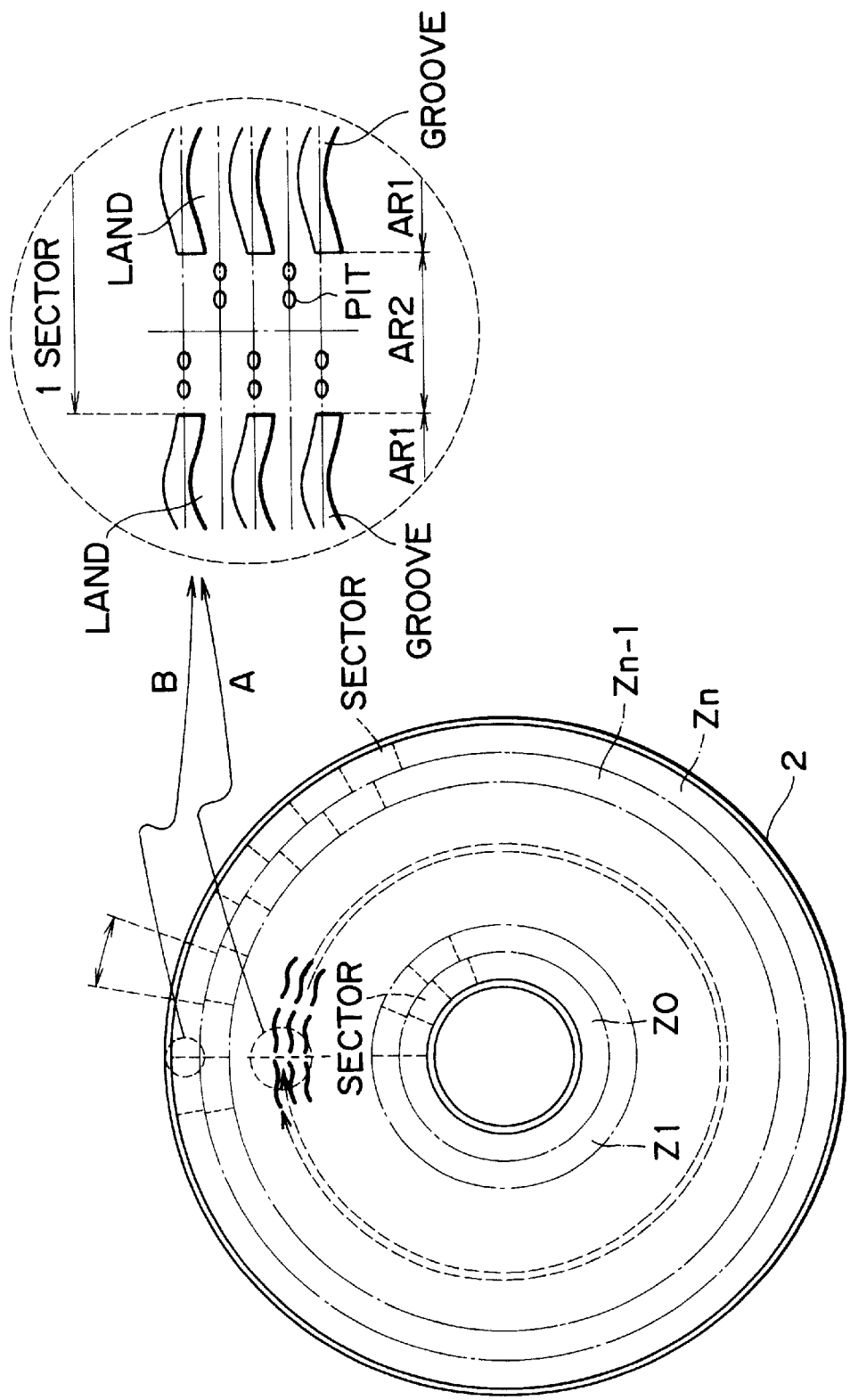

FIG. 4C1
FIG. 4C2

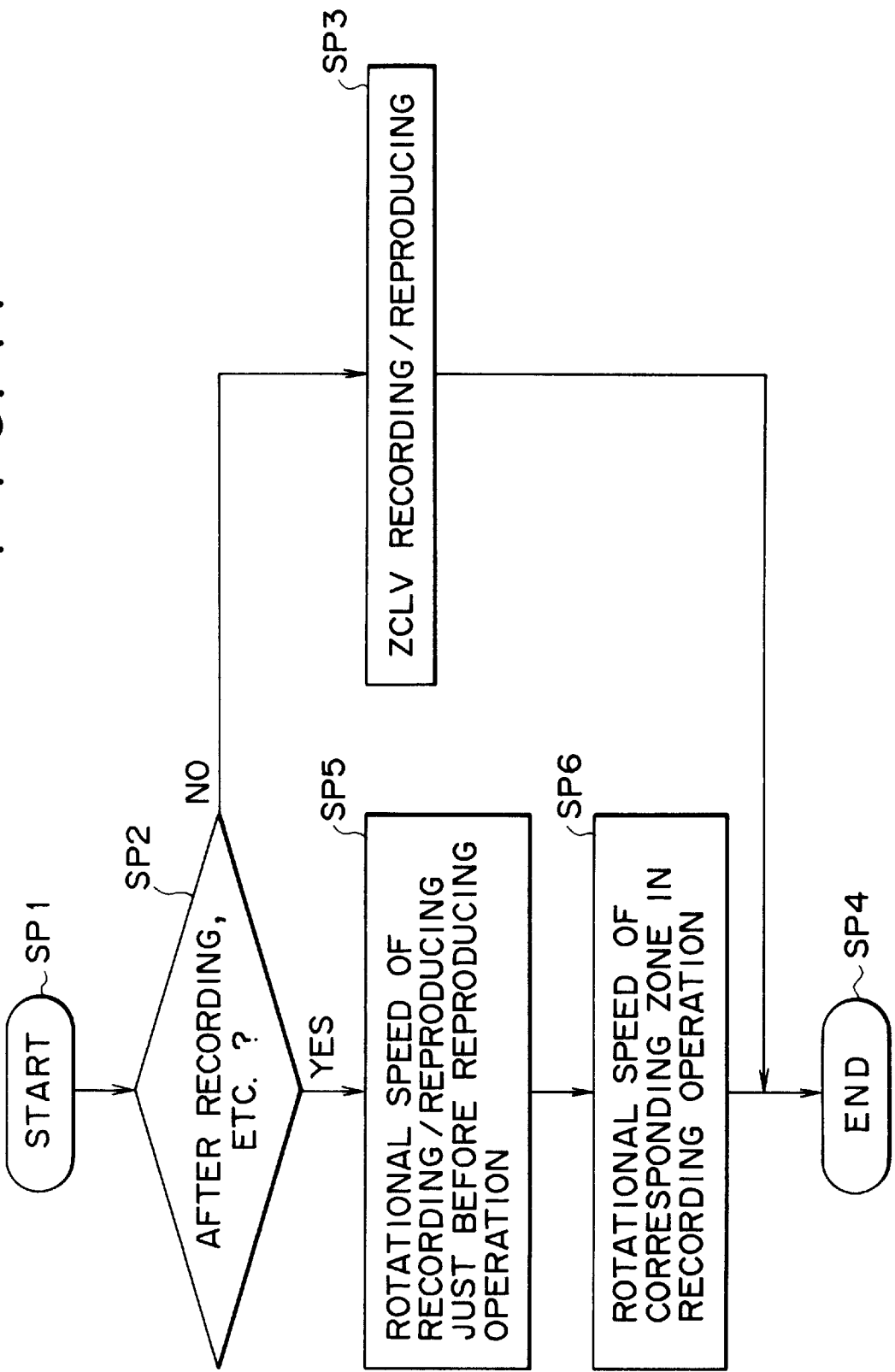

FIG. 16C1
FIG. 16C2

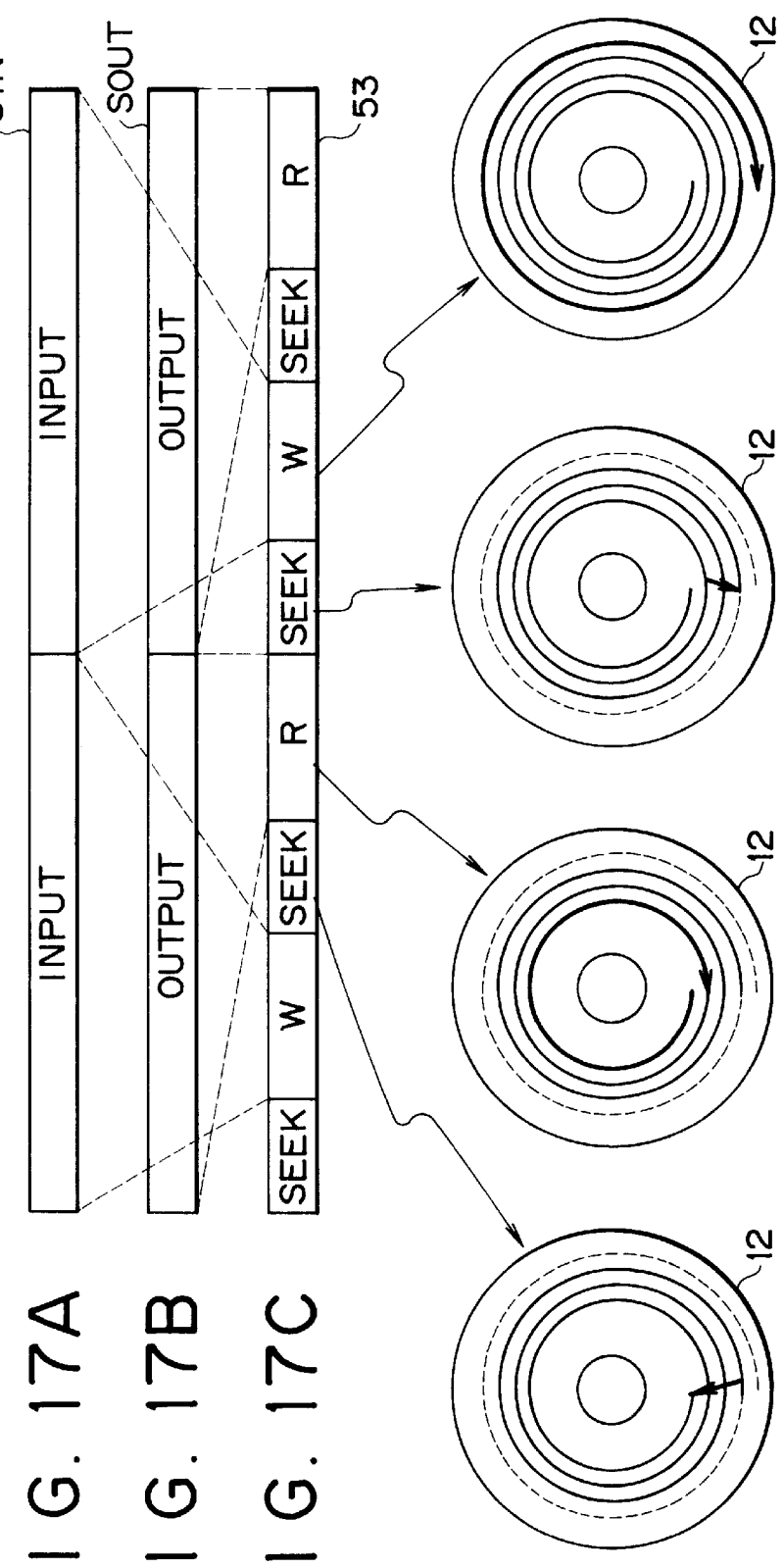

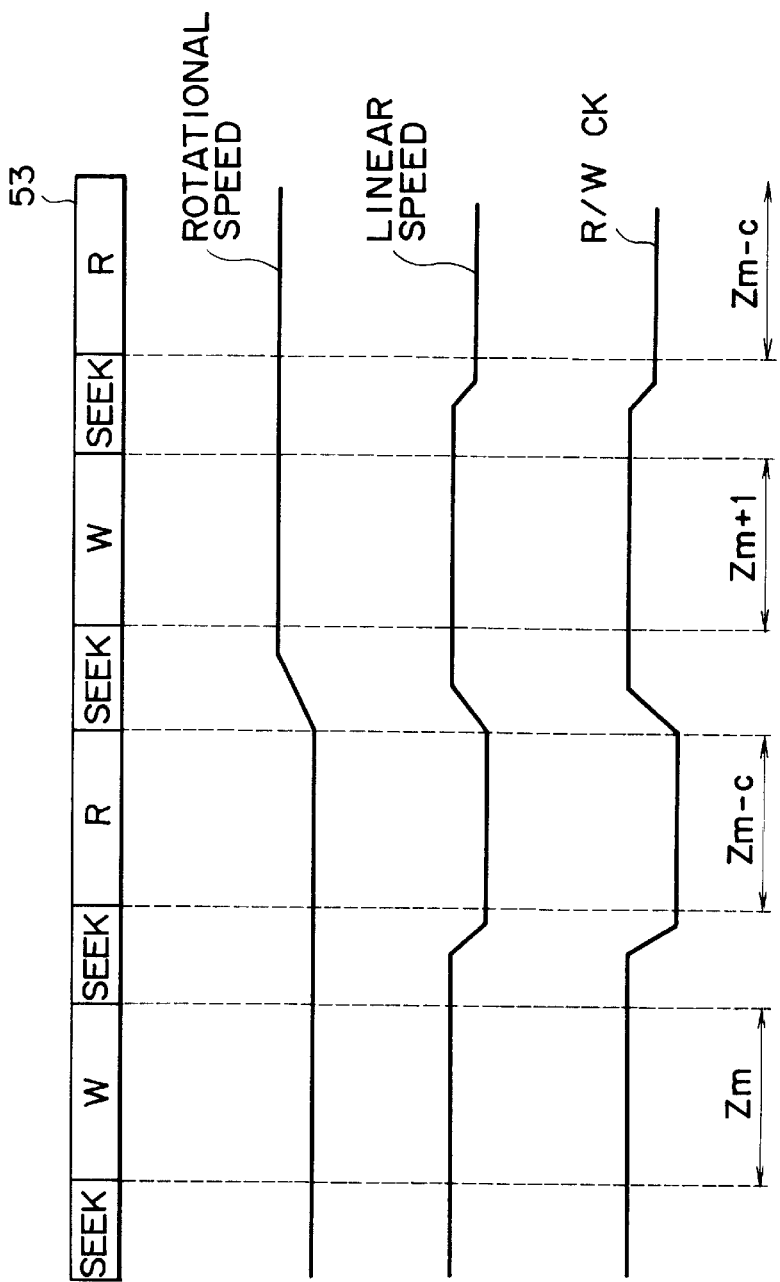

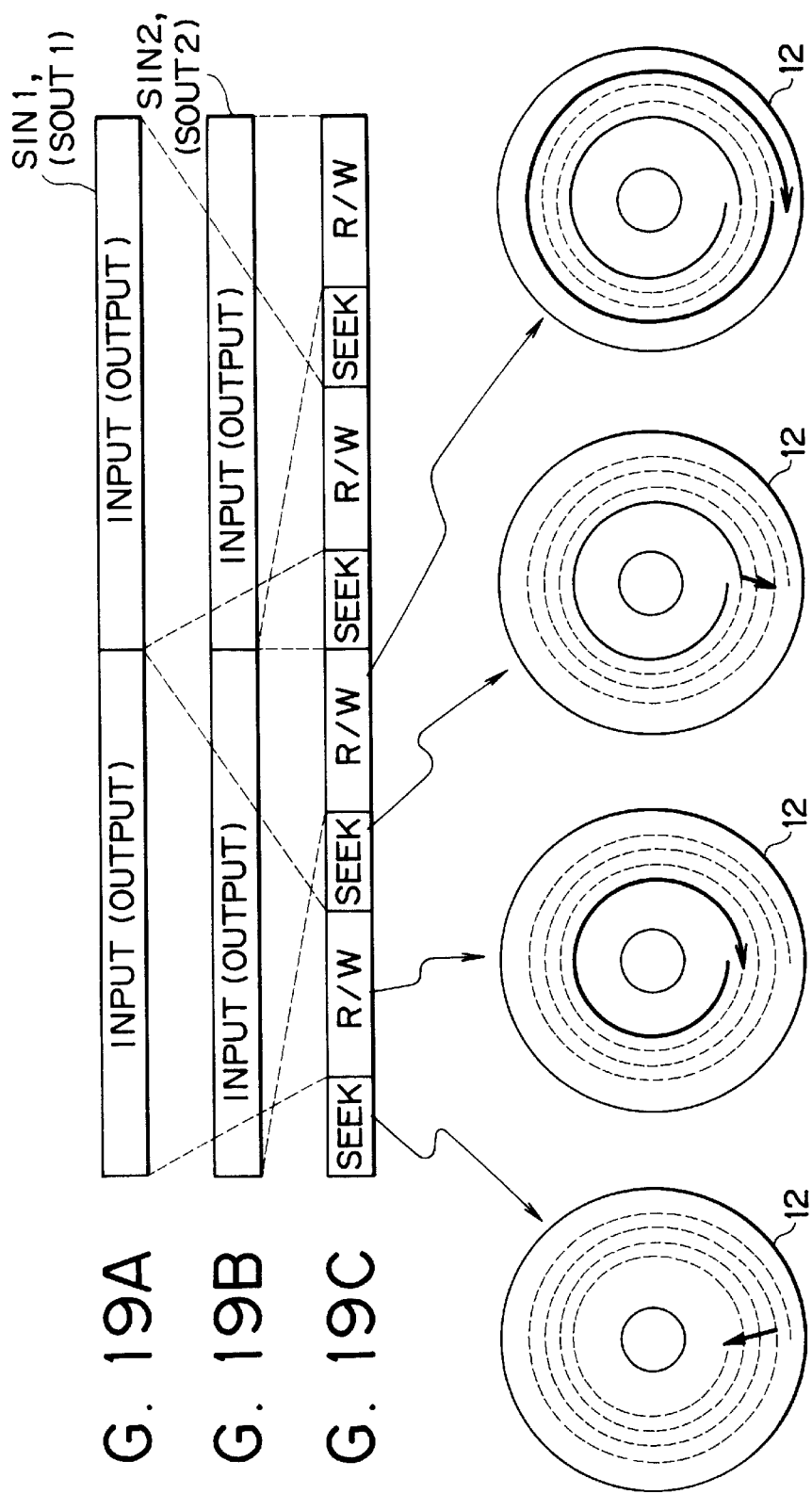

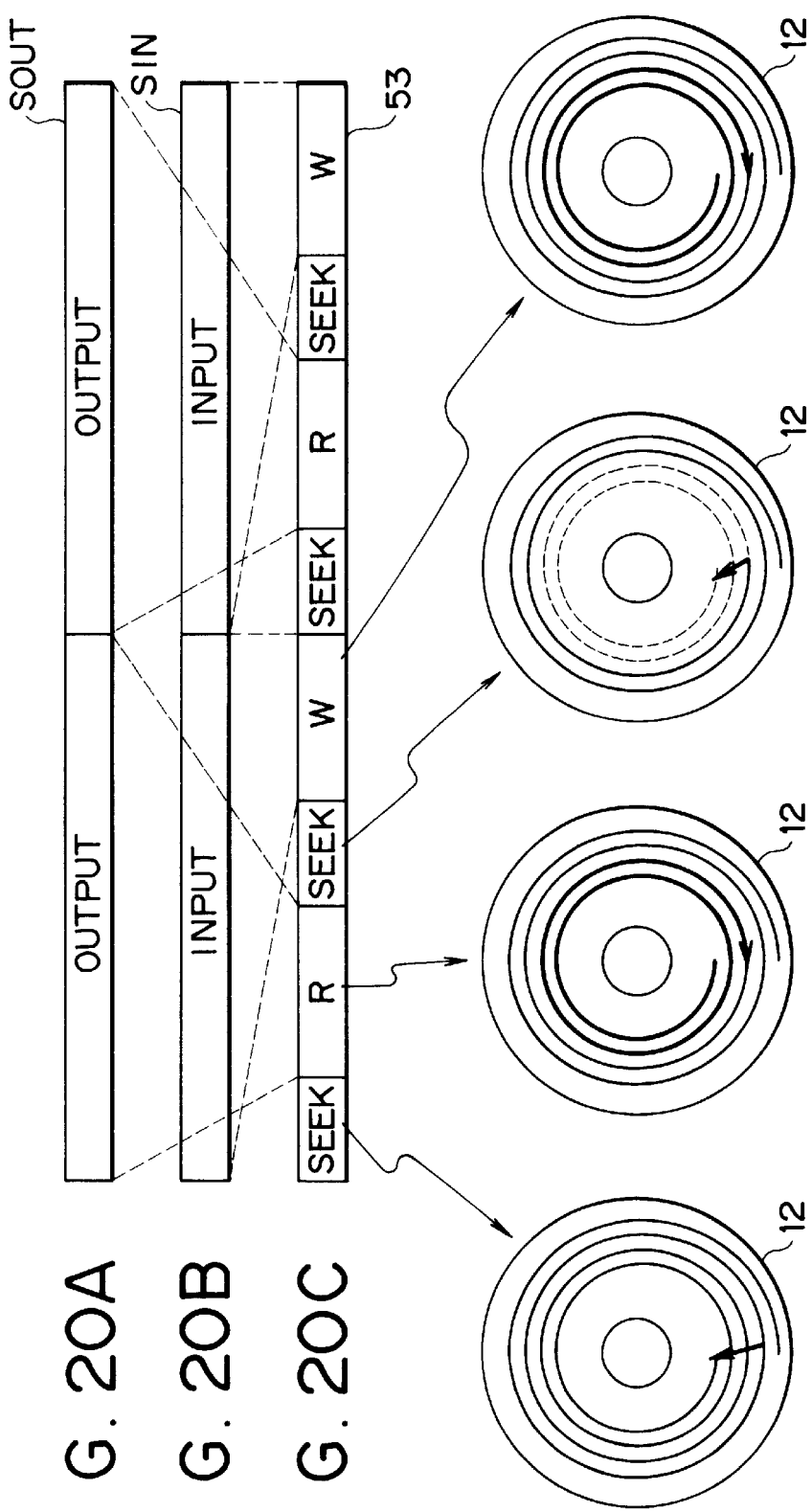

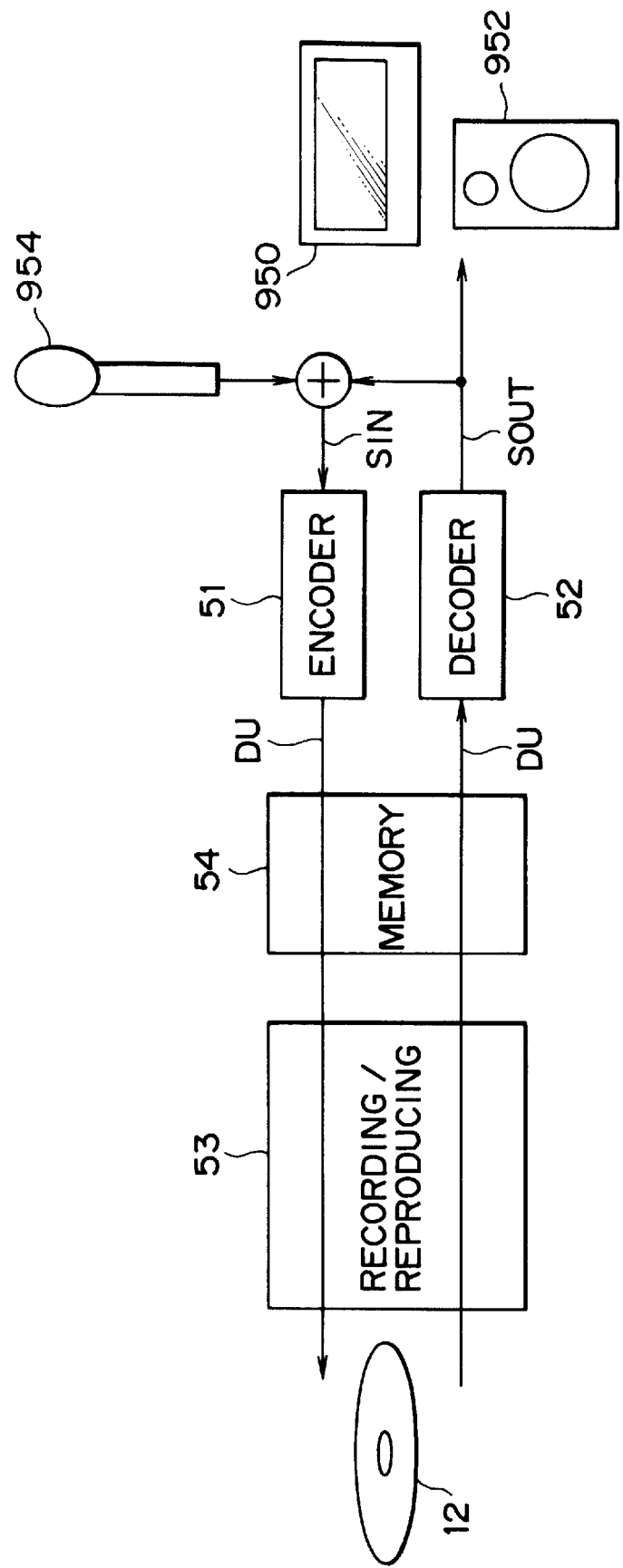

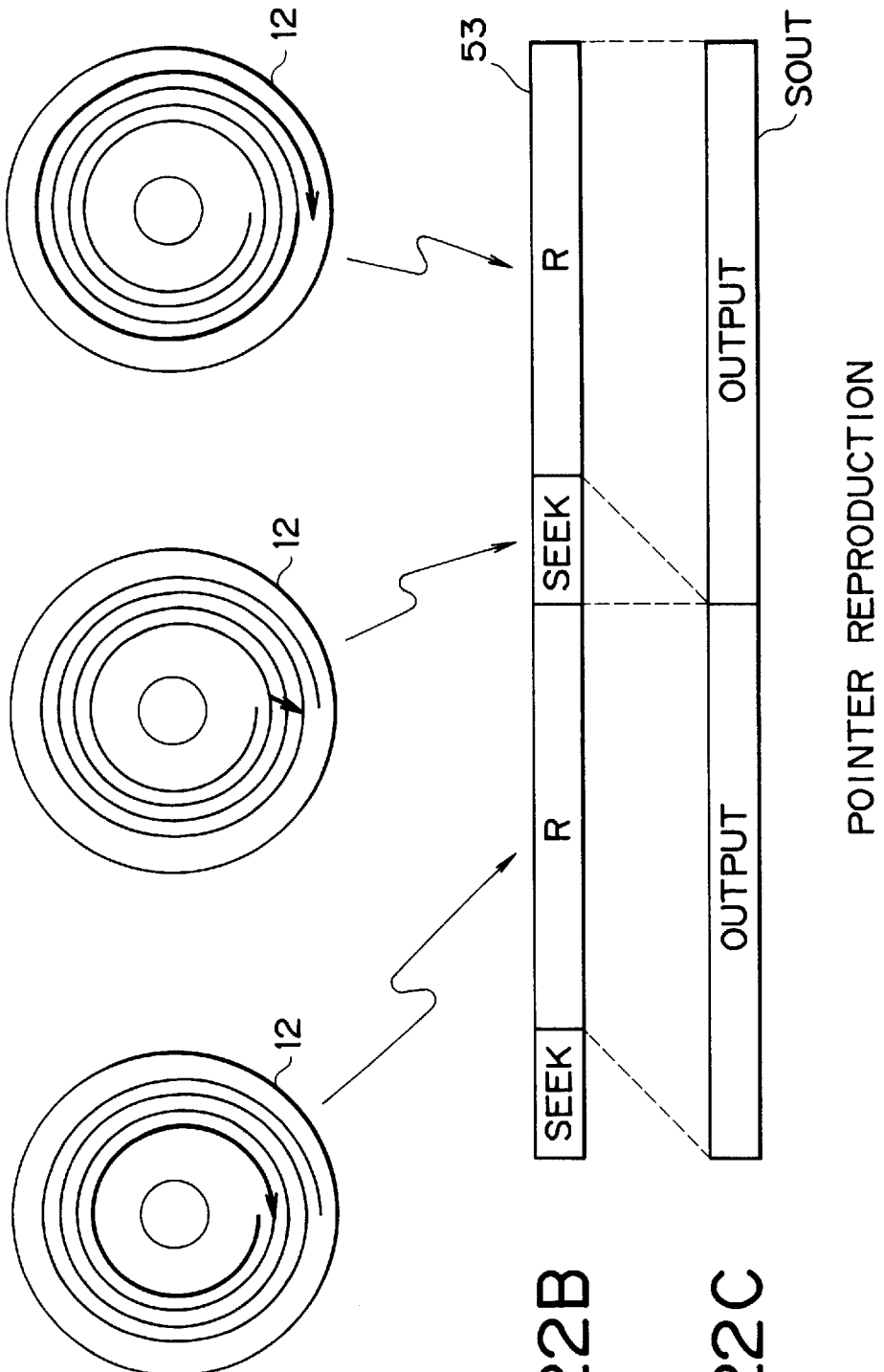

F I G. 24
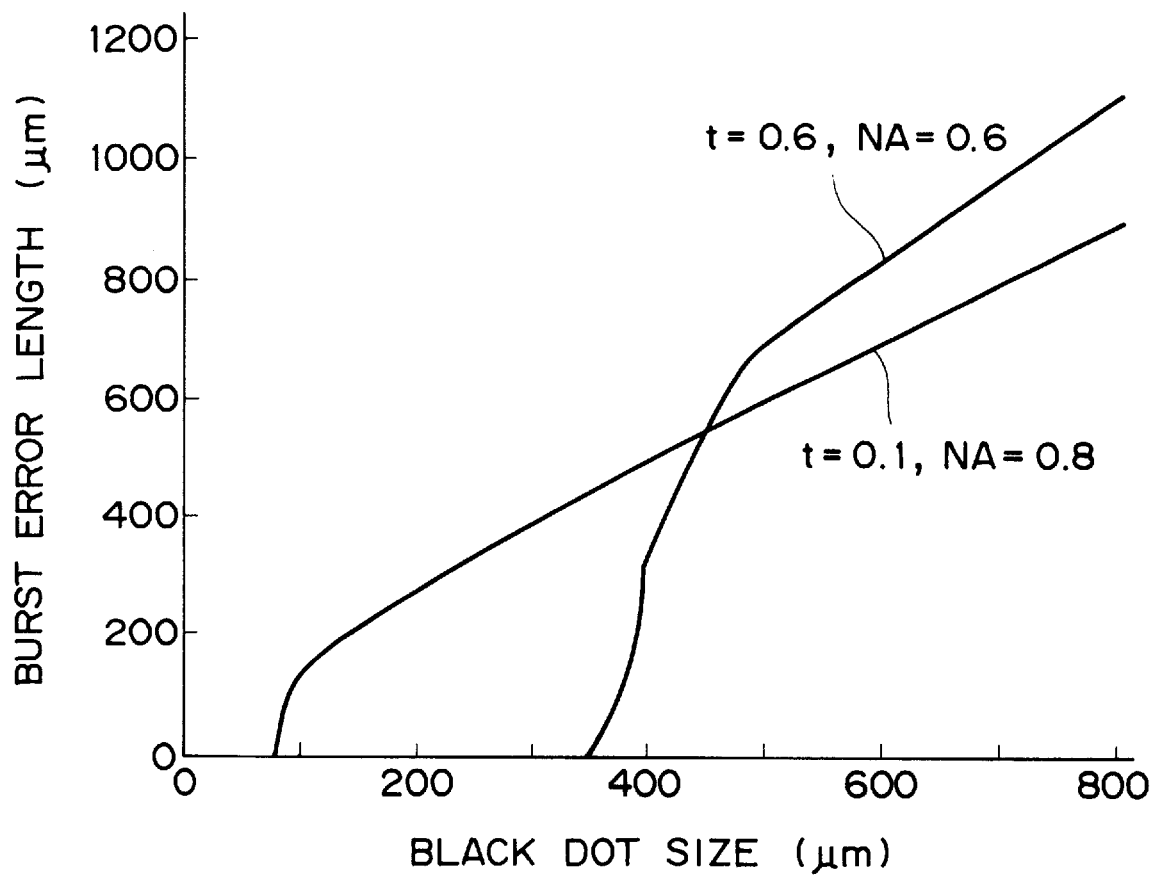

F I G. 25
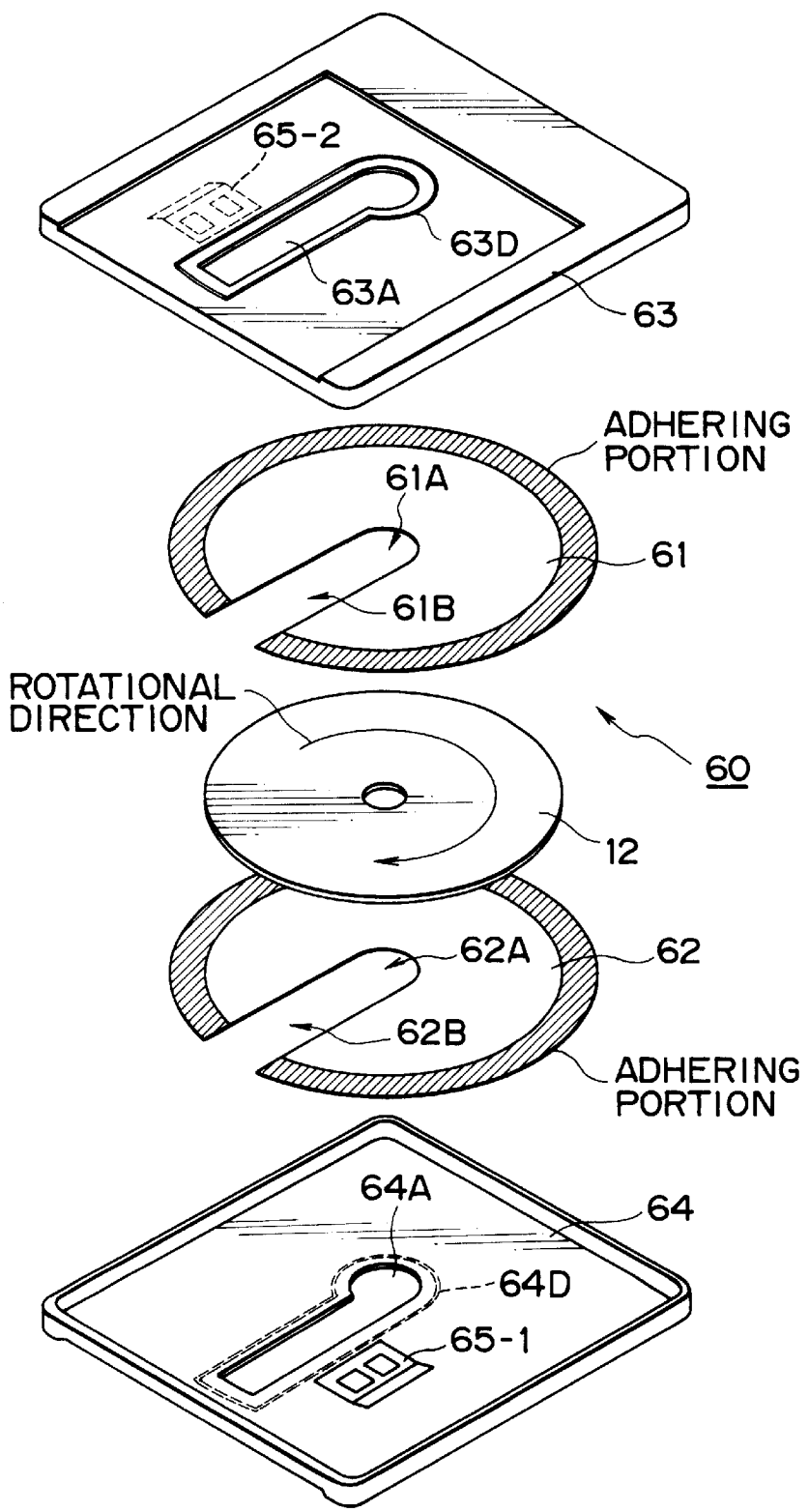

F I G. 35
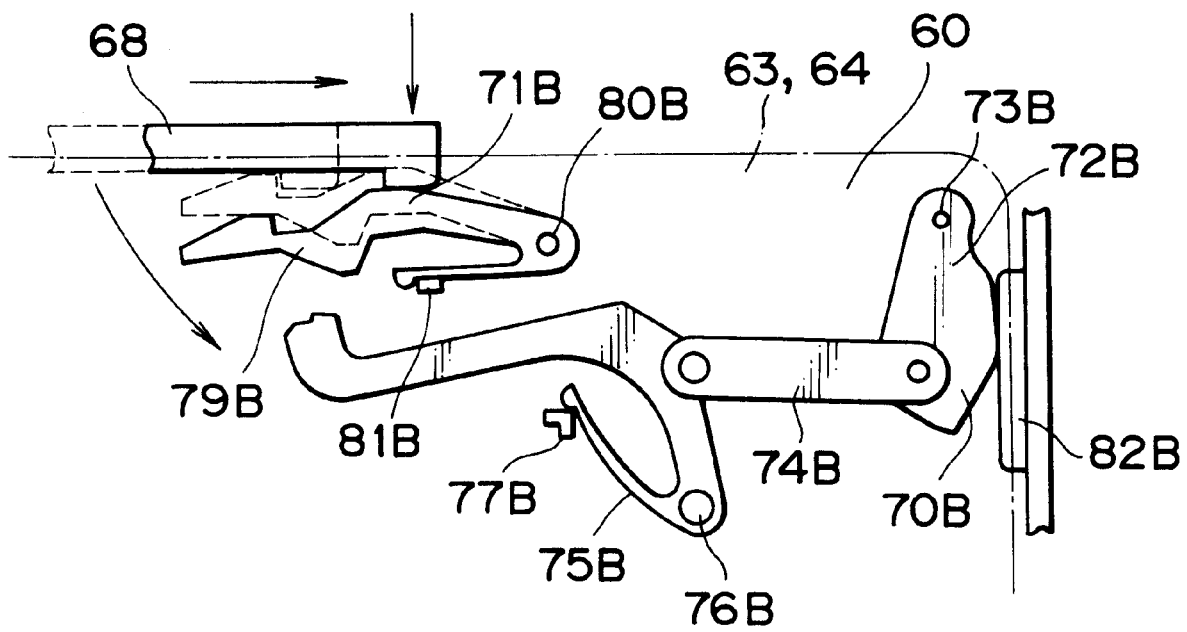

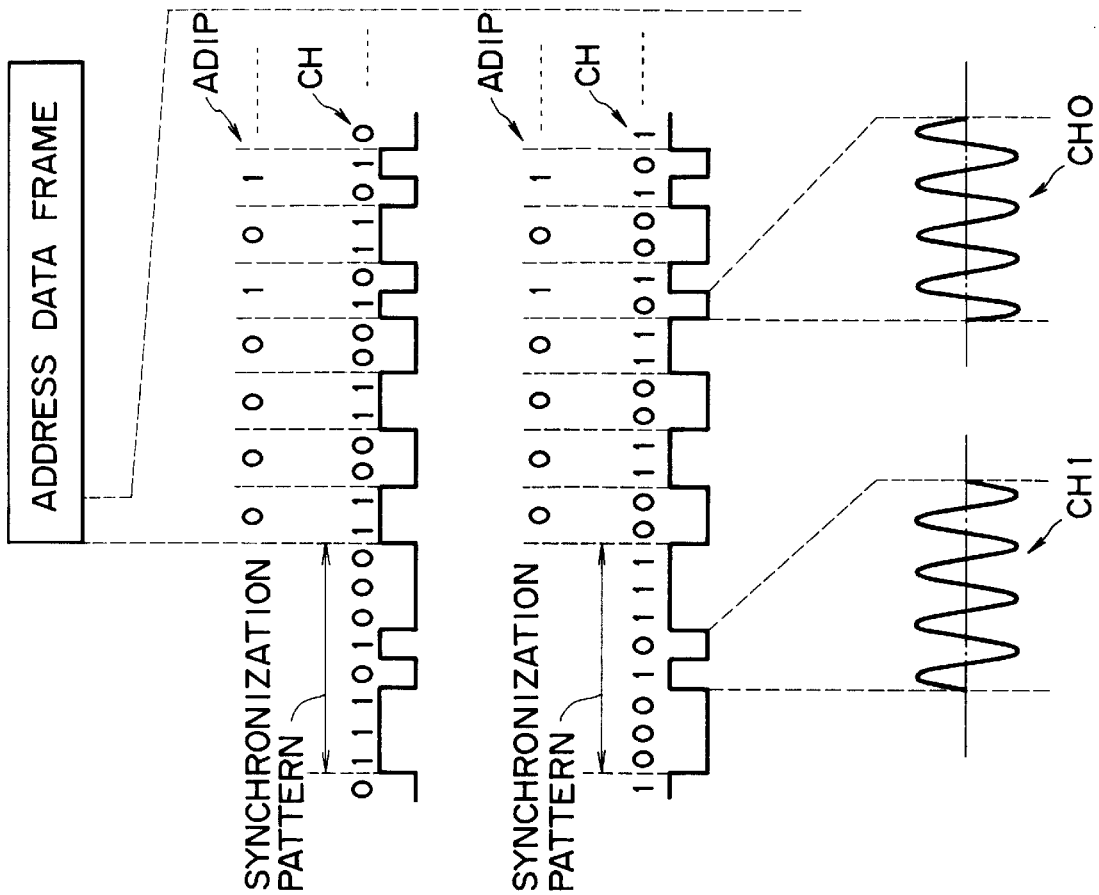

FRAME STRUCTURE

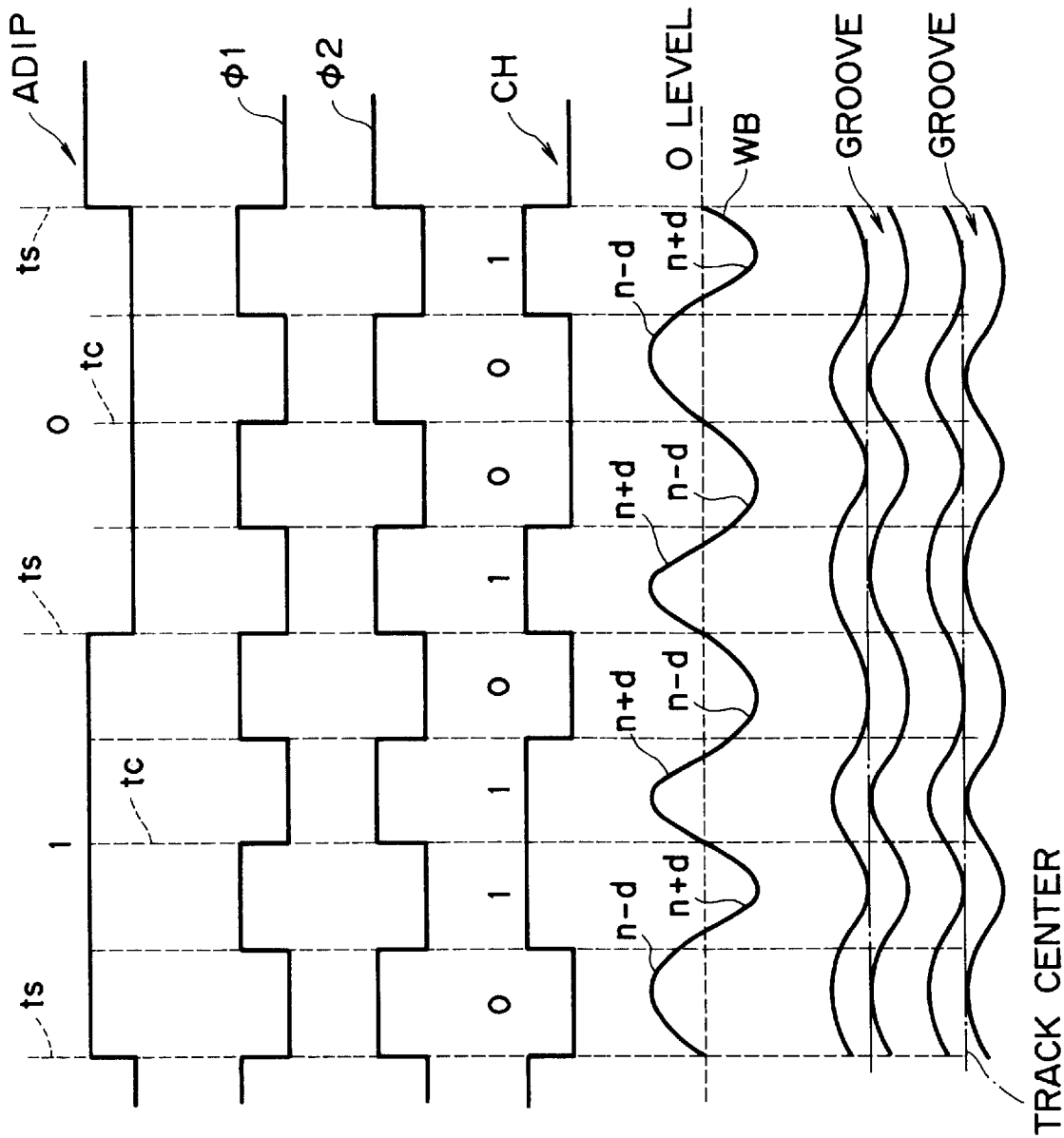

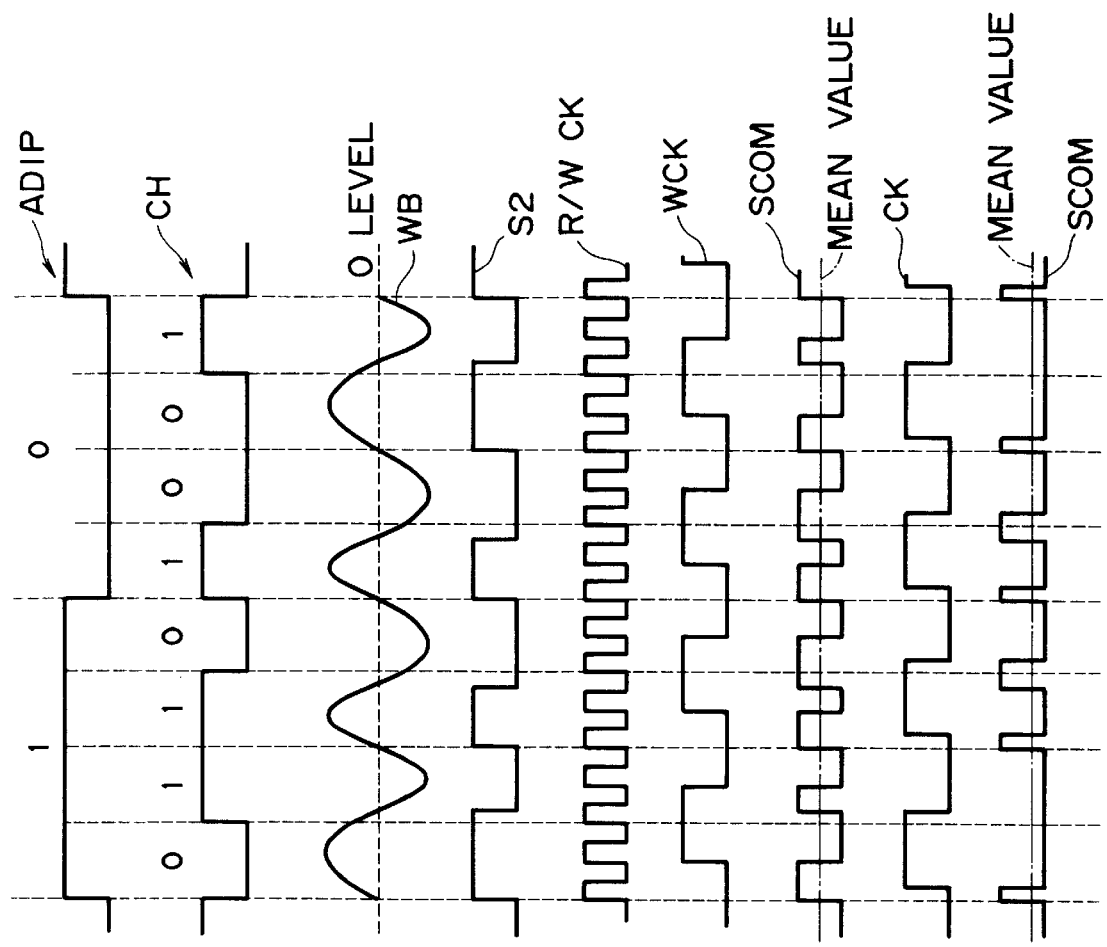

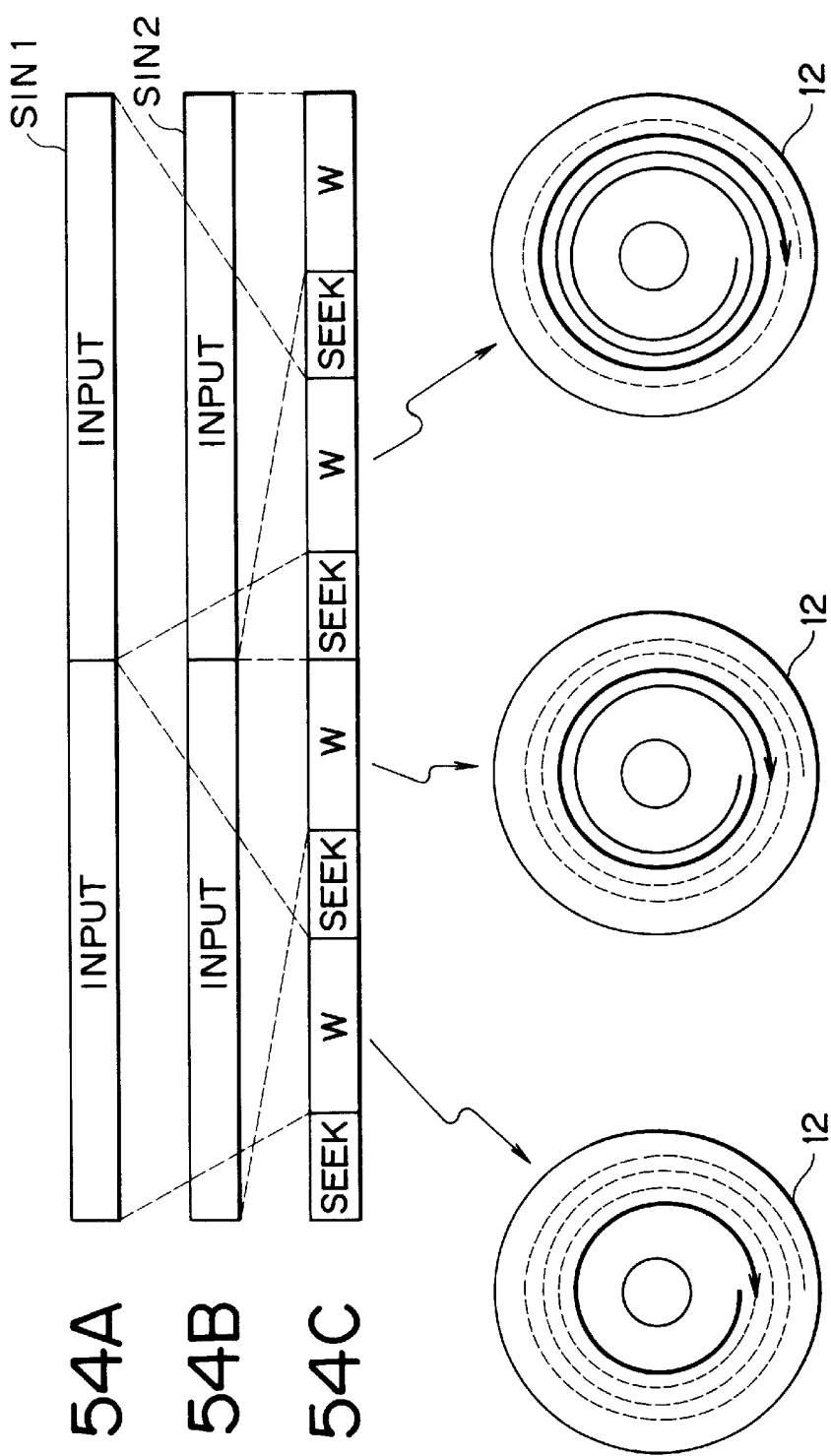

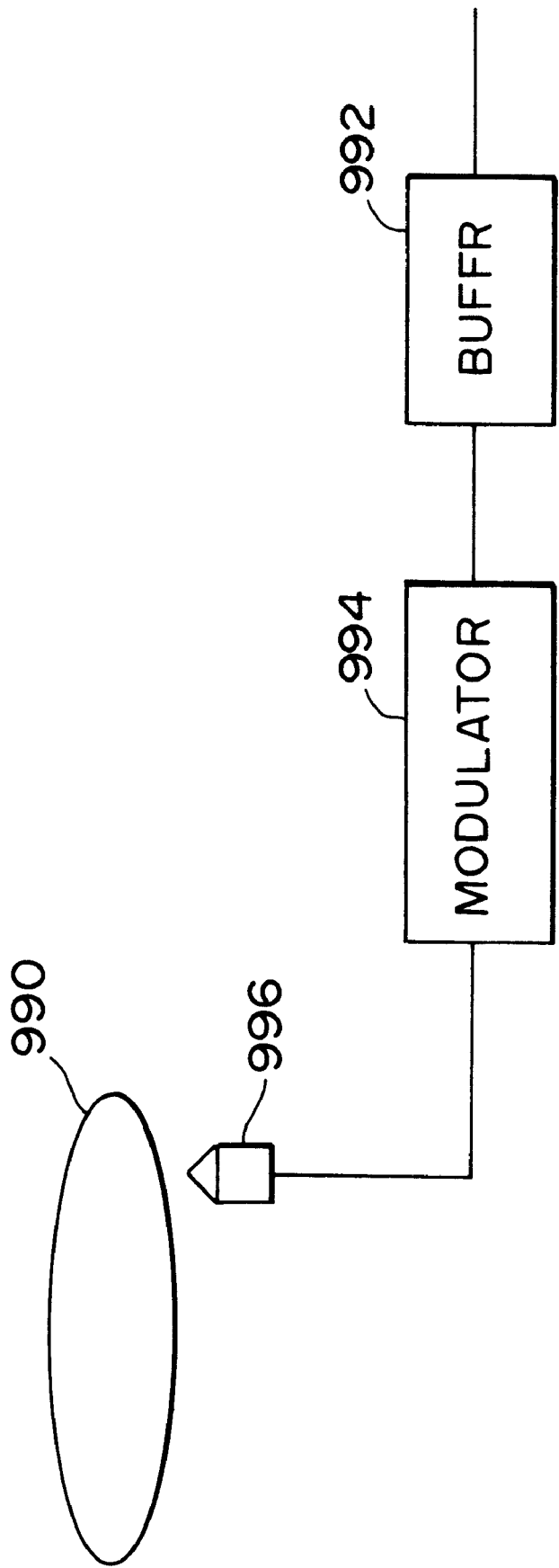

APPARATUS FOR RECORDING AND/OR REPRODUCING DATA ONTO AND/OR FROM AN OPTICAL DISK AND METHOD THEREOF

BACKGROUND OF THE INVENTION

The present invention relates to an optical disk apparatus and, more particularly, to such apparatus for recording and/or reproducing data (such as video signal data and audio signal data) onto and/or from an optical disk which utilizes a laser beam having a wavelength of 680 (nm) or less and a lens system having a numerical aperture (NA) of 0.7 or more and arranged to have a working distance of 560 μm or less so as to enable a relatively large amount of data to be recorded onto the optical disk.

Video and/or audio data may be recorded onto and/or reproduced from a number of different types of storage media such as a tape cassette and a so-called digital versatile disc (DVD). However, as hereinbelow described, the tape cassette and the DVD may have disadvantages associated therewith.

A video tape cassette for consumer use may have approximately 2 hours of data recorded thereon. Although such recording time may be acceptable for consumer use, the reproduction quality may not always be acceptable. For example, repeated use of a video tape cassette may adversely affect or even destroy data recorded on the respective tape so that upon reproduction relatively poor quality video/audio data may be provided. Additionally, the video tape cassette may not be conducive for enabling particular functions or operations, such as an easy access function, to be performed by a video tape cassette recorder/reproducer.

A rewritable type DVD may have a shape and size approximately similar to that of a compact disc (CD) and may have 2.6 GB of data (such as video and/or audio data) recorded on one face thereof. Such amount of data may only provide approximately 1 hour of recording/reproduction time. Such relatively small amount of time may be unacceptable. For example, such small amount of recording time may necessitate the need for several DVDs to record a single motion picture. As a result, such use of multiple DVDs may be inconvenient for a user or consumer.

An apparatus for recording and/or reproducing data onto/from a DVD may utilize a laser beam having a wavelength of 650 (nm) and a lens optical system having a numerical aperture of 0.6. Such apparatus may be operative to provide a number of functions or operations, such as editing, trick play, or the like. Additionally, such apparatus may utilize an effective access technique so as to enable operational modes to be quickly switched.

A DVD, used in conjunction with a DVD player, may enable relatively high quality reproduction and may facilitate the operation of a number of functions, such as an easy access function. However, to enable two hours of recording/reproducing time from one side of a DVD (so as to provide the same recording/reproducing time as with the video tape cassette) and to enable the above functions (editing, easy access, and so forth) would require approximately 8 GB of data, whereas, as previously described, a single-sided DVD may only enable 2.6 GB of data to be recorded thereon.

OBJECTS AND SUMMARY OF THE INVENTION

An object of the present invention is to provide an optical disk apparatus capable of recording a relatively large capacity of data onto an optical disk device.

More specifically, it is an object of the present invention to provide an optical disk apparatus in which user data may be recorded onto an optical disk by utilizing an optical head for irradiating a laser beam having a wavelength of approximately 680 (nm) or less to the optical disk and having a lens with a numerical aperture (NA) of approximately 0.7 or more and a working distance of approximately 560 (μm) or less.

Another object of the present invention is to provide an optical disk apparatus wherein the user data is recorded onto the optical disk as a number of pits or marks in which the shortest pit length or shortest mark length is approximately 0.3 (μm) or less or in which a line record density is approximately 0.23 (μm/bit) or less.

A still further object of the present invention is to provide an optical disk apparatus wherein the user data is recorded onto the optical disk with a track pitch of 0.6 (μm) or less.

A yet further object of the present invention is to provide an optical disk apparatus wherein the user data may be transmitted for recording onto the optical disk and for reproduction therefrom with a data transmitting speed of approximately 11.08 Mbps or more.

A still further object of the present invention is to provide an optical disk wherein redundant data is added to the user data and recorded thereto so as to provide a redundancy of approximately 23% or less.

Another object of the present invention is to provide an optical disk which includes a light transmitting layer having a thickness value within a range of 10 through 177 (μm) with a discrepancy of +/− Δt in which Δt is defined by Δt5.26(λ/$NA^4$) (μm) wherein NA is numerical aperture and λ is wavelength.

A still further object of the present invention is to provide an optical disk rotatably arranged in a cartridge which provides access to the optical disk.

Meandering of a groove carrying a guide groove of laser beam is varied successively in steps and a rotational speed of an optical disk is switched successively in steps in correspondence with the period of meandering.

A further object of the present invention is to provide an optical disk apparatus wherein one revolution of the optical disk is divided into a plurality of sectors based on address information which is recorded in a track, and wherein the user data is recorded in the sectors.

A further object of the present invention is to provide an optical disk apparatus wherein user data is recorded on grooves and lands of the optical disk.

A still further object of the present invention is to provide an optical disk apparatus having a buffer memory wherein a speed of transmitting the user data for recording onto the optical disk is greater than a speed at which the data is supplied to the buffer memory and/or wherein a speed of transmitting the user data reproduced from the optical disk is greater than a speed at which the data is supplied from the buffer memory.

A further object of the present invention is to provide an optical disk apparatus wherein user data is arranged in predetermined blocks and an error correction code is added thereto, and wherein the user data is recorded to or reproduced from an optical disk in one or more blocks in which a block has 32 or more KB.

In accordance with an aspect of the present invention, an optical disk apparatus for recording and/or reproducing user data onto and/or from an optical disk is provided which has an optical head for irradiating a laser beam having a wavelength of approximately 680 (nm) or less to the optical disk and having a lens with a numerical aperture (NA) of approximately 0.7 or more and a working distance of approximately 560 ($\mu$m) or less.

The present optical disk apparatus may record user data having a spot size approximately one half that of a DVD so as to provide relatively high recording density. As a result, such optical disk apparatus, when utilizing a Partial-Response Maximum-Likelihood (PRML) technique or the like or when the redundancy is reduced by using premastered address having relatively high efficiency and the like, may provide a recording capacity of approximately 8 GB on an optical disk. By setting the working distance to a relatively small value, an optical system may be formed by a lens having a small aperture and a relatively high numerical aperture of 0.7 or more. Further, in this situation, allowable center eccentricity between the lens faces and allowable face angle may be set to practical ranges. As an example, in this situation, when the working distance is set to 560 $\mu$m or less, a laser beam may be incident on an object lens with a beam diameter of 4.5 (mm) or less which is similar to a value utilized with a DVD.

The shortest pit length associated with a DVD may be 0.4 $\mu$m. However, by utilizing the present optical disk apparatus with its numerical aperture, the shortest pit length or the shortest mark length may have a value of approximately 0.3 $\mu$m. By using a shortest pit length or shortest mark length of 0.3 $\mu$m or less, a recording capacity of approximately 8 GB on an optical disk may be obtained. Further, when a so-called (1, 7) RLL modulation technique is applied thereto, a line density of approximately 0.23 $\mu$m/bit may be obtained, and when a PRML technique or the like is applied, a line density of approximately 0.23 $\mu$m/bit or less may be achieved. With a line density of 0.23 $\mu$m/bit, a recording capacity of approximately 8 GB on an optical disk may be obtained.

When the above relationships are used, a track pitch may be determined having a value of 0.6 ($\mu$m) which still provides a recording capacity of 8 GB.

Further, when the data transmitting speed is set to 11.08 (Mbps) or more, a continuous video signal may be recorded and/or reproduced while maintaining sufficient time period in seeking or the like even wherein the recording involves multiplexing an audio signal and a video signal which has been subjected to data compression by a MPEG2 technique in which a rate of 6 Mbps or more is needed for images.

Furthermore, user data may be efficiently recorded by adding redundant data so as to perform a recording operation with a redundancy of 23% or less.

When an optical disk is accessed by an optical system having a relatively high numerical aperture, a skew margin of the optical disk may be reduced or compensated for by reducing the thickness of a light transmitting layer. In this situation, stable access may be provided to an optical disk by providing a light transmitting layer with a thickness value within a range of 10 through 177 ($\mu$m) with a discrepancy of +/- $\Delta$t in which $\Delta$t is defined by $\Delta t \leq 5.26$ ($\lambda/NA^4$) $\mu$m wherein NA is numerical aperture and $\lambda$ is wavelength.

Further, dust or a defect on the surface of the optical disk may have an adverse affect or influence on the data recorded thereon. For example, dust having a size of 100 $\mu$m or more may produce a so-called burst error. However, storing such optical disk in a cartridge which enables access to the optical disk for an optical system may prevent or reduce the exposure of the optical disk to dust and the like so as to prevent or reduce adverse affects which may be otherwise caused by dust and the like. Additionally, such cartridge may protect the optical disk from scratches and other types of damage.

Furthermore, when meandering of a groove varies successively in steps and a rotational speed of an optical disk switches successively in steps in correspondence with the period of meandering, access may be provided to an optical disk by a so-called Zoned Constant Linear Velocity (ZCLV) technique. As a result, desired data may be efficiently recorded using an information recording face of the optical disk and lowering of access speed may be effectively avoided.

Additionally, when one revolution of an optical disk is divided into a plurality of sectors and user data is recorded in the sectors, access speed thereto may be improved.

Further, by recording information on both lands and grooves, an optical disk having a relatively narrow track pitch may be simply fabricated and a tracking error signal may be detected with a satisfactory signal-to-noise (SN) ratio.

Furthermore, when the speed of transmitting user data for recording onto an optical disk or the speed of transmitting data reproduced from an optical disk and inputting to a buffer memory is greater than a speed at which the data is supplied to a buffer memory or the speed at which the data is outputted from the buffer memory, processing of a substitution(s) of a defect sector may be executed and functions such as simultaneous recording and reproducing, postrecording and the like may be performed.

Additionally, error correction processing may be improved by performing such processing with a block having a size of 32 KB or more.

BRIEF DESCRIPTION OF THE DRAWINGS

FIG. 3 is a plane view to which reference will be made in explaining zoning by the mastering device of FIG. 2;

FIGS. 4A, 4B, 4C1, and 4C2 are diagrams showing a constitution of a sector in the zoning of FIG. 3;

FIG. 11 is a flowchart of the processing procedure of a system control circuit in the optical disk apparatus of FIG. 6;

FIGS. 16A, 16B, 16C1 and 16C2 are diagrams for explaining a normal recording and reproducing operation of the optical disk apparatus of FIG. 1;

FIGS. 17A, 17B, 17C, 17D1, 17D2, 17D3 and 17D4 are diagrams for explaining a follow-up reproduction operation of the optical disk apparatus of FIG. 1;

FIGS. 18A, 18B, 18C and 18D are diagrams for explaining the driving of an optical disk when 2 channels of video signal and audio signal are processed in the optical disk apparatus of FIG. 1;

FIGS. 19A, 19B, 19C, 19D1, 19D2, 19D3 and 19D4 are diagrams for explaining a multichannel mode operation of the optical disk apparatus of FIG. 1;

FIGS. 20A, 20B, 20C, 20D1, 20D2, 20D3 and 20D4 are diagrams for explaining a postrecording operation of the optical disk apparatus of FIG. 1;

FIG. 21 is a diagram showing external devices which may be used in postrecording;

FIGS. 22A1, 22A2, 22A3, 22B and 22C are diagrams for explaining a pointer reproduction operation of the optical disk apparatus of FIG. 1;

FIG. 24 is a diagram of a relationship between dust and burst error;

FIG. 25 is a disassembled perspective view of a cartridge for an optical disk which may be utilized by the optical disk apparatus of FIG. 1 in which a shutter is omitted;

FIG. 35 is a plane view showing a state in which the shutter is made movable in comparison with FIG. 34;

FIGS. 40A, 40B, 40C, 40D, 40E and 40F are signal waveform diagrams for explaining the forming of a wobble signal;

FIGS. 48A, 48B1, 48B2, 48C, 48D and 48E are diagrams for explaining wobble data by the mastering device of FIG. 47;

FIGS. 52A, 52B, 52C, 52D, 52E, 52F, 52G, 52H and 52I are signal waveform diagrams for explaining an operation of the wobble signal processing circuit of FIG. 51;

FIGS. 54A, 54B, 54C, 54D1, 54D2 and 54D3 are diagrams for explaining a multichannel mode operation of the optical disk apparatus;

FIG. 59 illustrates an optical disk device to which reference will be made in explaining data transmission rates.

DETAILED DESCRIPTION OF THE PREFERRED EMBODIMENTS

A detailed explanation will now be provided of embodiments of the present invention with reference to the accompanying drawings.

Figure 2:
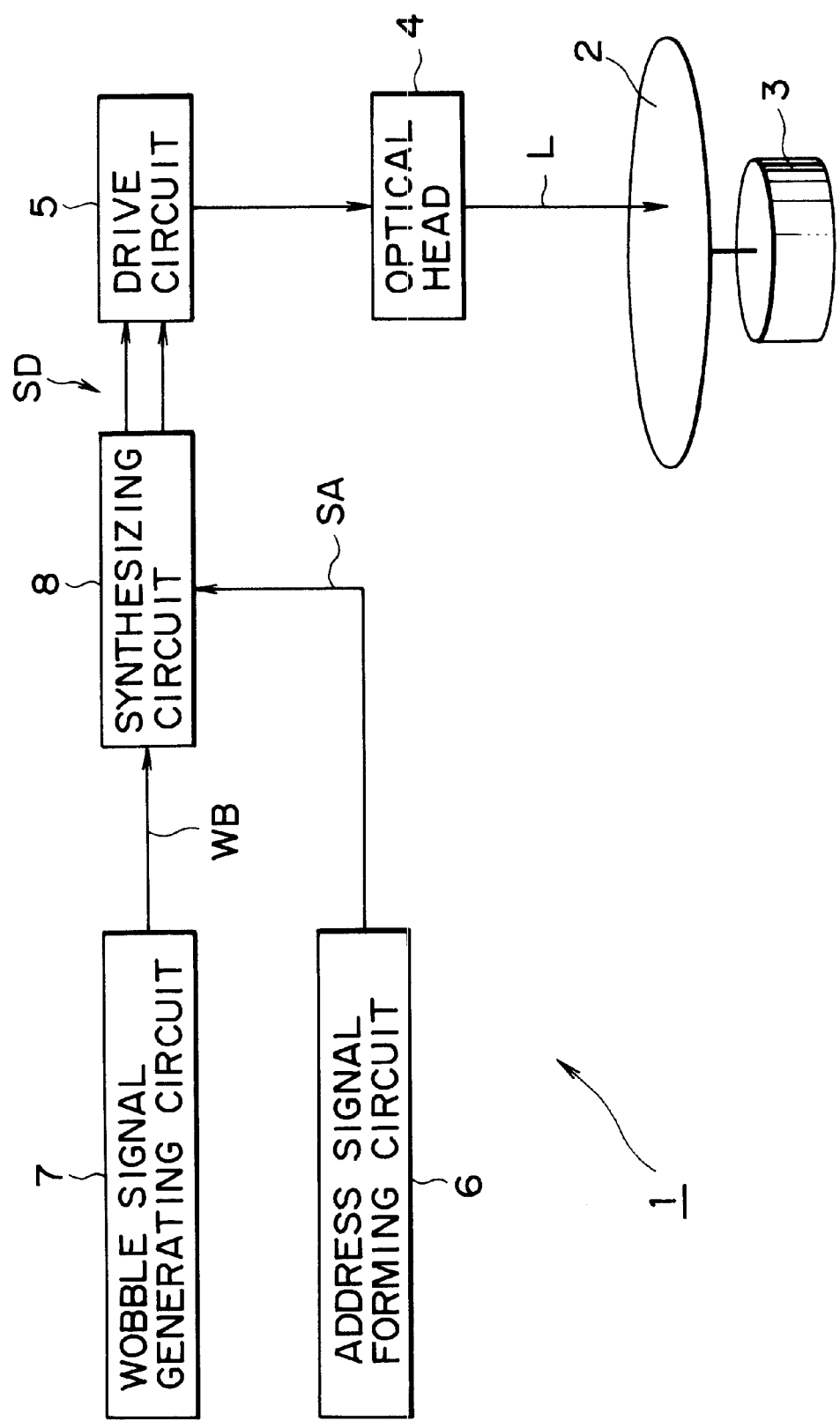
FIG. 2 is a diagram of a mastering device which may be applied to the optical disk apparatus of FIG. 1.

FIG. 2 is a diagram of a mastering device 1 according to a first embodiment of the present invention. As hereinbelow more fully described, an optical disk may be fabricated by use of an original disk 2 which may be formed by exposing a laser beam thereon with the use of the mastering device 1.

The original disk 2 may have a coating resist on the surface of, for example, a glass substrate. Such disk may be rotated by a spindle motor 3 with a constant angular velocity, in accordance with the mastering device 1.

An optical head 4 may irradiate a laser beam L to the original disk 2 in such a manner so as to be displaced successively from an inner peripheral side to an outer peripheral side of the original disk in synchronism with the rotation of the original disk by a predetermined threading mechanism. As a result, the optical head 4 may form a track in a spiral shape from the inner peripheral side to the outer peripheral side of the original disk 2. In this case, the optical head 4 is controlled by the threading mechanism to move or displace the beam approximately 1.0 ($\mu$m) in a period in which the original disk 2 is rotated one rotation. As such, in the case of socalled land and groove recording, a track may be formed having a track pitch of approximately 0.5 ($\mu$m). Incidentally, such track pitch in the case of land and groove recording is 1.48 times as much as the track pitch used in a DVD (which may be 0.74 $\mu$m).

By utilizing the mastering device 1, desired data may be recorded on an optical disk formed from the original disk 2 with a line record density of about 0.21 ($\mu$m/bit). As a result, 8 (GB) or more of data may be recorded on an optical disk by the following relationship.

$$4.7 \times ((0.74 \times 0.267)/(0.5 \times 0.21)) \geq 8 \quad (1)$$

Incidentally, in Equation (1), numeral 4.7 indicates recording capacity (GB) of a DVD ROM or read only type DVD and numeral 0.74 and numeral 0.267 indicate a track pitch ($\mu$m) and a line record density ($\mu$m/bit) of DVD. Accordingly, a recording capacity by data processing the same as that of DVD is shown in Equation (1).

Further, in forming an optical disk, the optical head 4 may set the spot diameter of the laser beam L such that the width of a groove formed by exposure of the laser beam L and the width of a land between contiguous grooves are substantially equal. Further, the spot shape and the amount of light of the laser beam are set such that an effective exposure range by the laser beam may be increased by about 120 (%) with regard to the width of the groove of a final target. Therefore, the optical head 4 may expose the original disk 2 to the laser beam such that an optical disk fabricated therefrom may have land and groove recording.

Further, the optical system or the optical head 4 may be movable along a radial direction of the original disk 2.

A drive circuit 5 may drive the optical head 4 in accordance with a drive signal SD received from a synthesizing circuit 8. In such situation, the drive circuit 5 may switch the condition in which the optical head 4 is driven in accordance with a position in which the laser beam is irradiated with a timing synchronized to the rotation of the original disk 2, in which the original disk 2 may be arranged or zoned as illustrated by FIG. 3. Incidentally, grooves and lands of the disk 2 are also illustrated in FIG. 3. That is, the mastering device 1 may successively form a track on the original disk 2 such that a region having a radius of 24 (mm) through 58 (mm) may be set to an information recording face of an optical disk having a diameter of 120 (mm) which is substantially equal to that of a compact disk. In this case, the drive circuit 5 may switch the condition in which the optical head 4 is driven such that a sector structure may be formed by dividing the information recording face into radially shaped regions. Further, by successively changing in steps the timing of the switching from the inner peripheral side to the outer peripheral side, a number of zones Z0 through Zn may be formed by dividing the information recording face in shapes of concentric circles.

Thereby, the drive circuit 5 forms a number of sectors on one track in the zone Z0 at the innermost periphery and the number of sectors on one track is increased by 1 in accordance with successive displacement to zone Z1 . . . on the outer peripheral side.

Marks A and B indicate boundaries of sectors which are magnified in FIG. 3. At such sector boundaries, the front of each sector is allocated to an address area AR2 and a successive remaining area AR1 is allocated to a user area. The drive circuit 5 under control of a system control circuit (not shown) may move or displace the position of the irradiating laser beam in the user area AR1 in accordance with the drive signal SD such that grooves are formed to meander in the user area AR1.

Further, in an initial portion of the address area AR2, the displacement of the position of the irradiating laser beam may be interrupted and the light amount of the laser beam may be intermittently increased by the drive signal SD whereby a pit row may be formed on a track center formed by a groove. Further, at a later portion of the address area AR2, the position of the irradiating laser beam may be displaced onto the track center formed by a land on the inner peripheral side and the light amount of the laser beam may be intermittently increased by the drive signal SD by which a pit row is formed on the track center formed by the land. Therefore, the drive circuit 5 may perform a recording operation by forming a pit row on a track center in correspondence with the address data of the sector formed by a succeeding groove at the earlier or initial half of the address area AR2 and may perform a recording operation by forming a pit row on a track center in correspondence with the address data of the sector formed by a succeeding land on the inner peripheral side at the later half of the address area AR2.

Furthermore, when an optical disk is to be fabricated from the original disk 2, the drive circuit 5 may control the light amount of the irradiating laser beam such that the depths of the pits and grooves have a value or values which are approximately equal to ⅙ through ⅕ wavelength of the laser beam (which may have a wavelength of 650 (nm)). Additionally, the groove may have an amplitude or width of approximately 15 through 30 (nm).

A wobble signal generating circuit 7 may generate a sine wave signal having a predetermined frequency in synchronism with the rotation of the original disk 2 as a wobble signal (WB) and may supply the same to the synthesizing circuit 8. Moreover, the wobble signal WB may be obtained by increasing the frequency successively in steps in correspondence with the zoning arrangement described above with regard to FIG. 3. As a result, the wobble signal WB from the wobble signal generating circuit 7 may cause the position of the irradiating laser beam to be displaced such that the groove may meander or vary for 397 periods per one sector.

In this way, a length corresponding to 5 periods of the groove may be allocated to the address area (header area) AR2, the groove may be formed to meander or vary for 3573 periods at the track of the zone Z0 on the innermost periphery and the meandering of the groove may successively increase by 397 periods per one track in accordance with a shift of the zone on the outer peripheral side. Further, 25 bytes of data may be allocated to the user area AR1 in one meandering period of the groove and such one period may have a length of about 42 ($\mu$m).

An address signal forming circuit 6 may form an address signal SA whose value may change successively in accordance with the displacement of the optical head 4 as controlled by the system control circuit and may supply the formed address signal SA to the synthesizing circuit 8. More particularly, the address signal forming circuit 6 may receive a timing signal (such as a frequency generating (FG) signal or the like) in synchronism with the rotation of the original disk 2 by the spindle motor 3 or the like and may perform a counting operation on the timing signal by a predetermined counter.

The address signal forming circuit 6 may form a sector header in a first or an earlier half and in a second or later half of the address area AR2, as shown in FIGS. 4A, 4B, 4C1 and 4C2. As shown therein, the header may include sector marks SM, timing data for synchronization VFO, address marks AM, address data ID, and a postamble PA. Each sector header may have 61 bytes of data and the address area AR2 may have 8 Kbytes. (The numbers shown in FIGS. 4B, 4C1 and 4C2 indicate numbers of bytes.) The sector mark SM may indicate the start of the sector head and may have 4 bytes of data. The synchronization timing data VFO areas may be utilized in locking a phase-locked loop (PLL) circuit in the optical disk device and may have 26 bytes and 16 bytes, respectively, from the front side. The address mark AM is a synchronization signal of address and may have 1 byte. The address data ID may provide an indication of the position of the irradiating laser beam and may have 6 bytes, 2 bytes of which constitute an error detection code. The same data may be recorded twice for the address data ID so as to improve the reliability thereof. The postamble PA may be arranged or utilized in setting the polarity of a signal and may have one byte.

The address signal forming circuit 6 may convert the sector header formed as mentioned above into a serial data row and may modulate the serial data row in a predetermined manner and may output the modulated signal as the address signal SA. The address signal forming circuit 6 may output the address signal SA with a timing corresponding to the scanning of the laser beam L.

The synthesizing circuit 8 may receive the wobble signal WB and the address signal SA and may synthesize the same to form the drive signal SD comprising a displacement signal for displacing the optical system of the optical head 4 and a light amount control signal for controlling the light amount of the laser beam and may output such signal or signals to the drive circuit 5.

Therefore, in an optical disk formed by the original disk 2, the information recording face may be divided into shapes of concentric circles and preformatted such that the number of sectors is gradually increased from zones on the inner peripheral side toward zones on the outer peripheral side. Further, the address area AR2 may be formed at the front of each sector, in which the address of the sector of a succeeding groove and the address of the sector of a succeeding land are recorded in the address area AR2, and desired data may be recorded in the succeeding user area AR1.

Figures 4A, 4B:
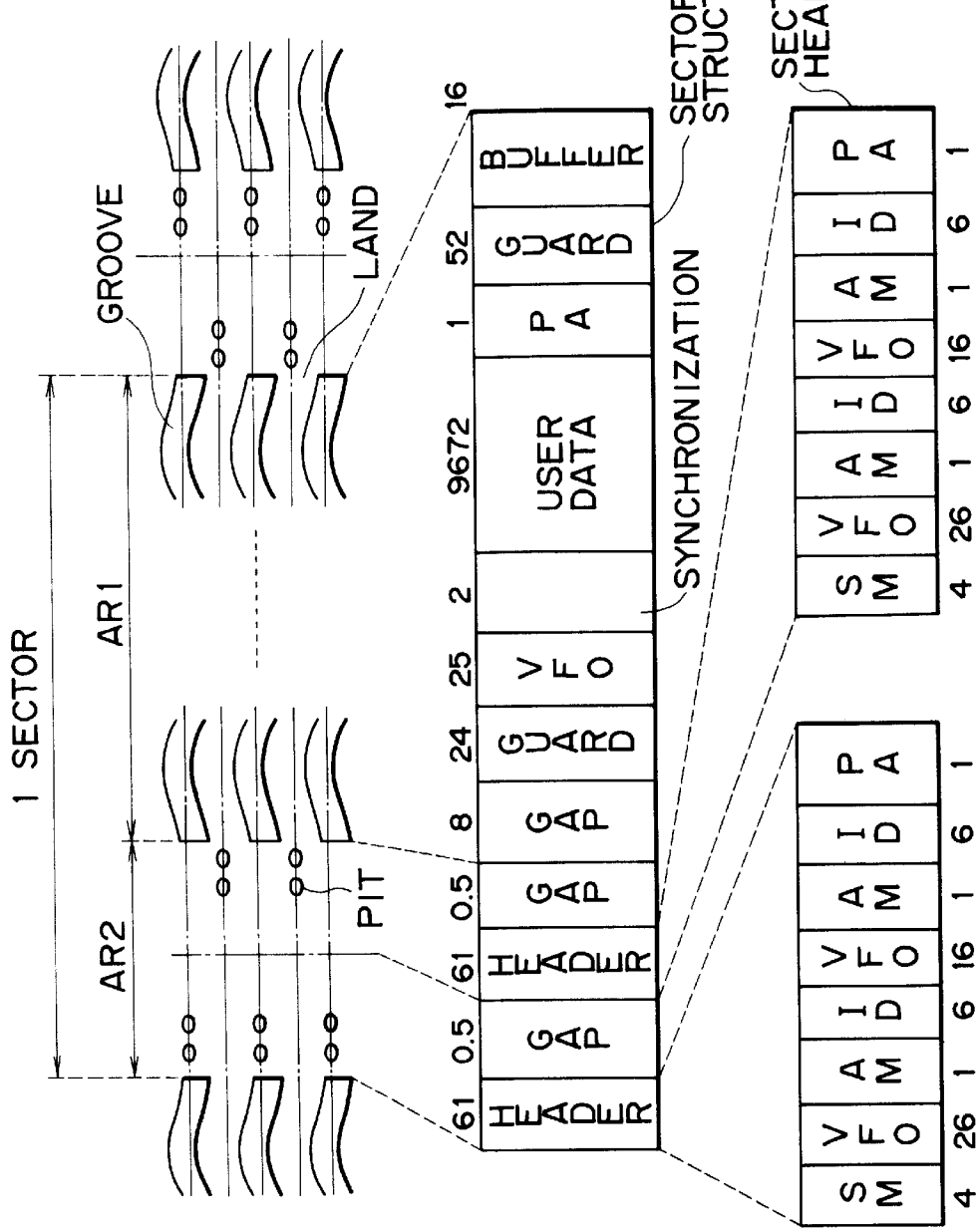

As shown in FIG. 4B, the user area AR1 includes an interposing gap of 8 byte, a guard of 24 bytes, a VFO of 25 bytes, 2 synchronization bytes, 9672 bytes of user data, a postamble (PA) of 1 byte, a guard of 52 bytes, and a buffer of 16 bytes which may be arranged successively as shown therein. The gap is a region which may be utilized for switching lands and grooves and/or for switching the amount of laser beam. The guard may be used to restrain fluidity of record material by overwriting and promote overwriting cycle of the record area when a so-called phase change media are used as record media. The synchronization byte may be used to lock a PLL circuit in the optical disk device, the postamble may be used in setting the polarity, and the buffer is a redundant area of the record area for absorbing jitter by eccentricity or the like.

Figure 5:
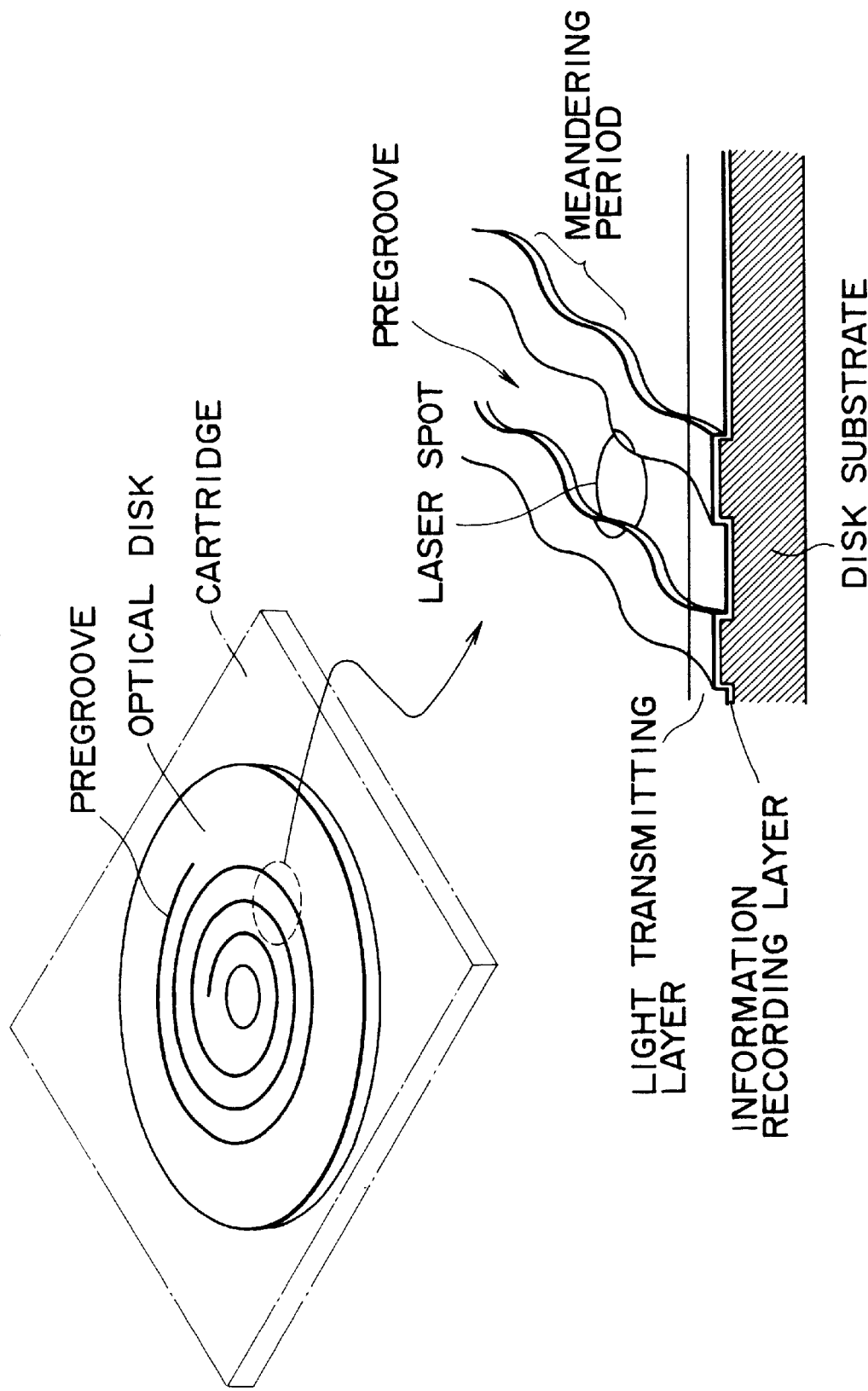
FIG. 5 illustrates an optical disk formed by the mastering device of FIG. 3.

FIG. 5 illustrates a perspective view of an optical disk formed by the original disk 2 and a sectional view showing a section of the optical disk obtained by cutting the optical disk at a portion of a groove. The optical disk may have a thickness of 1.2 (mm) and with the phase change type optical disk, an information recording face may be formed by successively forming an aluminum film, a ZnS—SiO$_2$ film, a GeSbTe film and a ZnS—SiO$_2$ film on a disk substrate. In the case of a magneto-optical disk, an information recording face may be formed by successively forming an aluminum film, a SiN film, a TbFeCo film and an SiN film on a disk substrate. In the case of a write once type disk, an information recording face may be formed by successively forming a film sputtered with aluminum or gold and a predetermined organic pigment film on a disk substrate.

Further, a light transmitting face for transmitting a laser beam and leading the laser beam to the information recording face may be formed on the information recording face and may have a thickness of about 0.1 (mm). Thereby, with such optical disk, even when a laser beam is irradiated from an optical system having a high numerical aperture via the light transmitting face, desired data may be recorded to or reproduced from the information recording face so as to effectively avoid an influence due to skew.

Incidentally, such optical disk may have a diameter of 120 (mm) and may be arranged such that a region having a radius of from 24 (mm) through 58 (mm) is allocated as a recording region.

Further, the optical disk may be stored and held in a predetermined cartridge formed to enable the kind of the optical disk contained therein to be identified and formed to be usable with an optical disk device such that when access is made by the optical system having a high numerical aperture dust or the like may be effectively avoided.

A phase change type optical disk may be formed so as to enable desired data to be recorded by locally changing the crystal structure of the information recording face by irradiating a laser beam or may be formed to enable recorded data to be reproduced by detecting a change in an amount of return light.

Further, in the case of a magneto-optical disk, such disk may be formed such that desired data can be thermomagnetically recorded by applying a magnetic field at the position of irradiating laser beam and such that recorded data can be reproduced by utilizing a magnetic Kerr effect by detecting a plane of polarization of return light. In the case of a write once type disk, such disk may be formed such that desired data can be recorded by locally destructing the information recording face by irradiating a laser beam and such that recorded data can be reproduced by detecting a change in the amount of return light.

In these cases, with respect to the optical disk, in respective zones, the original disk 2 may be driven to rotate under a condition of constant angular velocity, the frequency of the wobble signal may be switched successively in steps and the groove may be formed by the wobble signal WB. As a result, the optical disk is zoned and in each zone, the period of meandering the groove converted into a rotational angle of the optical disk may be formed constant.

Further, two kinds of optical disks may be fabricated, one where the information recording face is formed only on one face thereof and another where an information recording face is formed on both faces. The optical disk where the information recording face is formed on both faces thereof may be fabricated by pasting together optical disks which are fabricated from thin disk substrates with a thickness of 1.2 (mm) and a thickness of each light transmitting layer of 0.1 (mm).

Figure 6:
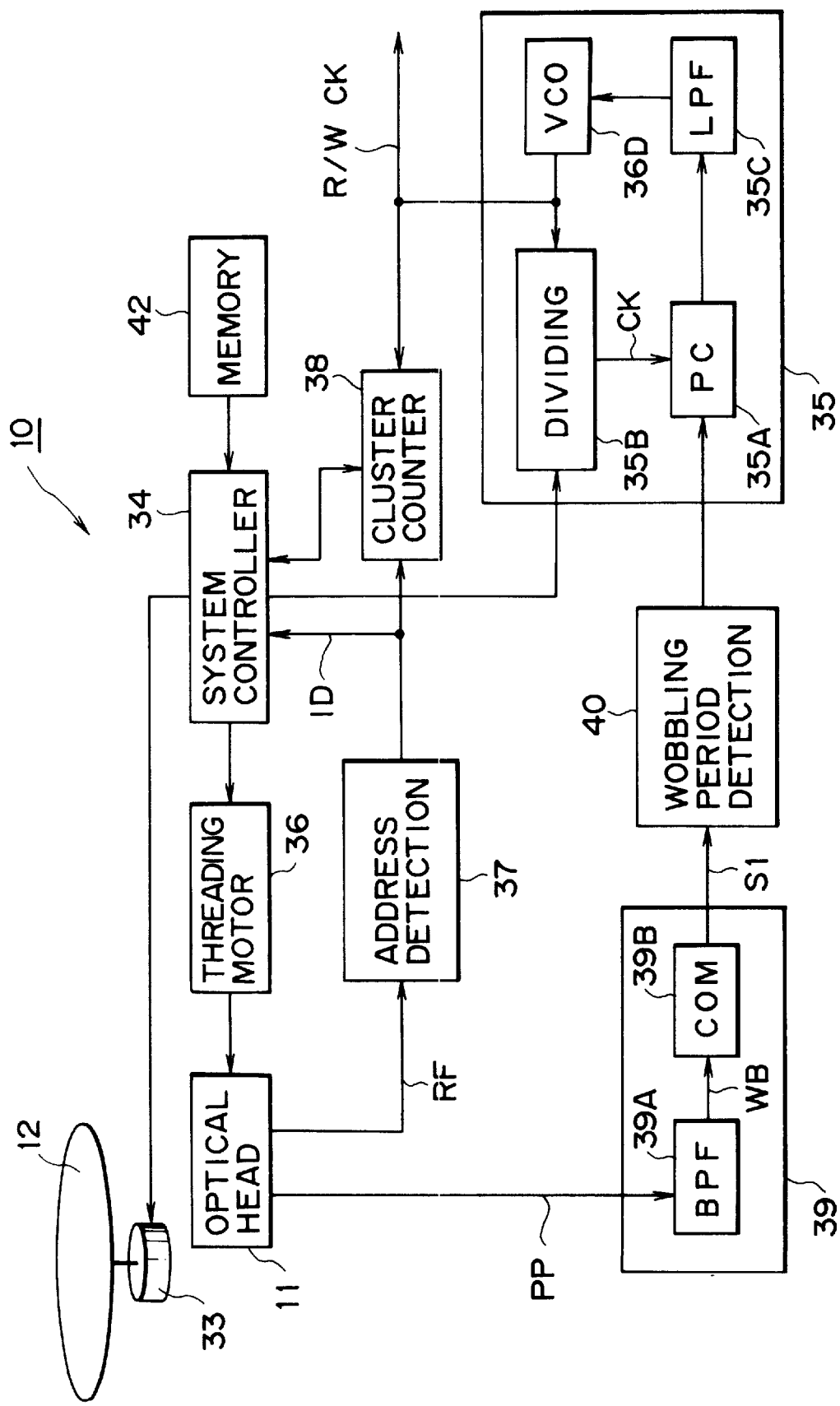
FIG. 6 is a diagram illustrating a drive system of the optical disk apparatus of FIG. 1.

FIG. 6 is a diagram of a processing system of a wobble signal for an optical disk device for making an optical disk mentioned above. According to the optical disk device 10, a laser beam may be irradiated from an optical head 11 to an optical disk 12 and return light may be received.

Figure 7:
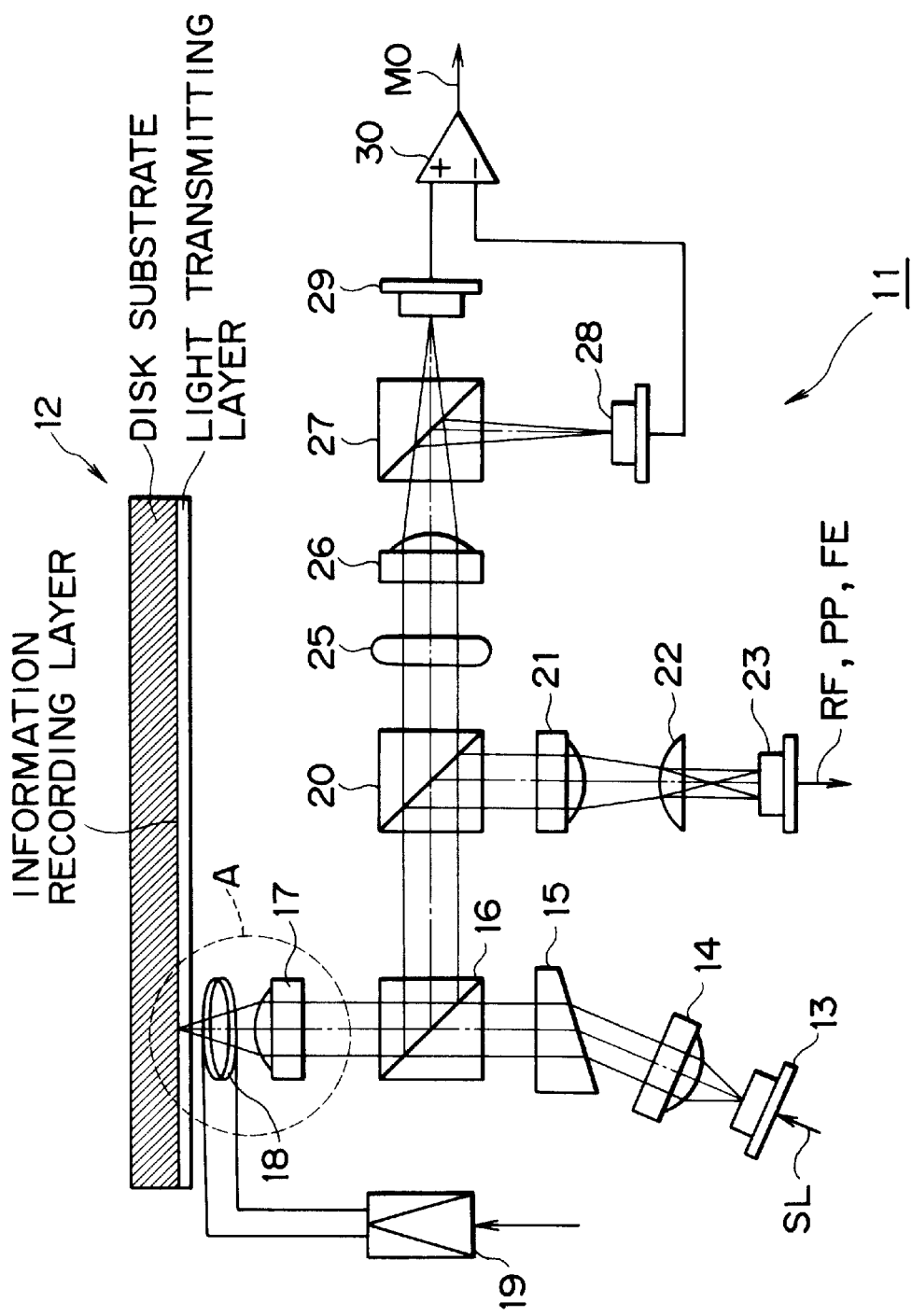
FIG. 7 is a diagram of an optical head of the optical disk apparatus of FIG. 1.

That is, as shown by FIG. 7, in the optical head 11, a semiconductor laser 13 may emit a laser beam having a wavelength of 650 (nm) in accordance with a predetermined drive or control signal SL. In a reproducing operation, the semiconductor laser 13 may emit a laser beam with a constant light amount. By contrast, in a recording operation, a laser beam may be emitted while intermittently increasing the light amount and pits or marks may be formed on an information recording device of the optical disk 12 by increasing the light amount of laser beam. A collimator lens 14 successive thereto converts the laser beam emitted by the semiconductor laser 13 into a parallel ray, a shaping lens 15 successive thereto corrects astigmatism of the laser beam and the laser beam is emitted to an object lens 17 after being transmitted through a beam splitter 16. The object lens 17 may converge the laser beam onto the information recording face of the optical disk 12 and may receive return light therefrom.

In the optical disk device 10, when the optical disk 12 is an optical disk exclusively for reproduction, data recorded on the optical disk 12 can be reproduced in accordance with a change in an amount of return light. Further, when the optical disk 12 is a phase change type optical disk, desired data may be recorded by locally changing the crystal structure at the position of irradiating laser beam and recorded data can be reproduced in accordance with a change in the amount of return light. Further, when the optical disk 12 is a write once type optical disk, desired data may be recorded by locally destructing the position of irradiating the laser beam and recorded data can be reproduced in accordance with a change in the amount of return light. By contrast, when the optical disk 12 is a magneto-optical disk, a modulation coil 18 arranged at the proximity of the object lens 17 may be driven by a predetermined drive circuit 19 and a predetermined modulation magnetic field may be applied at the position of irradiating laser beam by which desired data is recorded by applying a method of thermo-magnetic recording and recorded data can be reproduced by detecting a change in a plane of polarization of the return light.

The beam splitter 16 may transmit a laser beam incident from the shaping lens 15 and may emit a laser beam to the object lens and, additionally, the beam splitter 16 may reflect return light incident from the object lens 17 and may separate the optical path and emit return light to a beam splitter 20. The beam splitter 20 may separate the return light into two streaks of light fluxes by transmitting and reflecting the return light.

Return light reflected by the beam splitter 20 is incident on a lens 21 which converts the return light into a converging light flux. A cylindrical lens 22 provides astigmatism to the return light emitted from the lens 21. An optical detector 23 receives return light emitted from the cylindrical lens 22. The optical detector 23 can divide a light receiving face into predetermined shapes and can output light receiving results of divided respective receiving faces. Thereby, the optical detector 23 may detect a reproducing signal RF where the signal level is changed in accordance with the amount of return light, a push pull signal PP where the signal level is changed in accordance with a displacement of the position of irradiating laser beam in respect of a groove or pit row and a focus error signal FE where the signal level is changed in accordance with a defocus amount by converting light receiving results of the respective light receiving faces in current to voltage by a current to voltage converting circuit and thereafter performing addition and subtraction operation by a matrix circuit.

Additionally, return light which has been transmitted through the beam splitter 20 may be incident on a ½ wavelength plate 25 which may change the plane of polarization of the return light. A lens 26 converts the return light emitted from the ½ wavelength plate into converging light flux. A polarized beam splitter 27 reflects a predetermined polarization component and transmits the remaining component by which the light is separated into two streaks of light fluxes where the light amounts are changed complimentarily in accordance with the plane of polarization.

Optical detectors 28 and 29 respectively receive the two streaks of light fluxes separated by the polarized beam splitter 27 and output light receiving results or signals in which the signal levels are changed in accordance with the amounts of receiving light. A differential amplifier 30 outputs a reproducing signal MO having a signal level which may be changed in accordance with the plane of polarization of return light by providing a result of differential amplification by the light receiving results of the two optical detectors 28 and 29 via a current to voltage converting circuit.

Thereby, the optical head 11 can record desired data and reproduce recorded data with various kinds of the optical disks 12.

Figure 8:
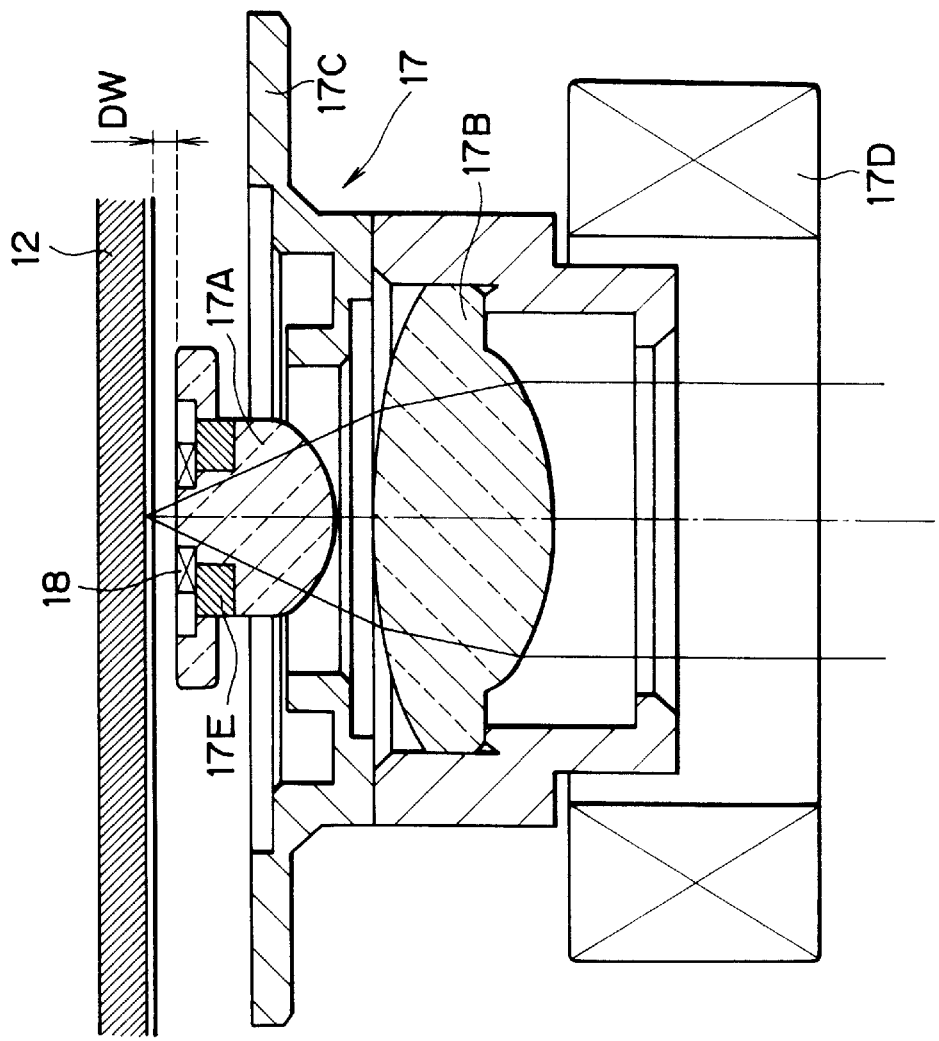
FIG. 8 is a sectional view of an object lens of the optical head of FIG. 7.

FIG. 8 is a sectional view of the object lens 17 in the optical head 11. As shown therein, the object lens 17 may include a first lens 17A and a second lens 17B, in which the first lens 17A and the second lens 17B may be formed by nonspherical plastic lenses or glass molds and may be movable by a drive actuator 17D upwardly, downwardly, leftwardly and rightwardly as viewed onto FIG. 8. Thereby, in the optical disk device 10, tracking control and focus control can be carried out by integrally moving the first lens 17A and the second lens 17B. Further, the second lens 17B on the incident side of a laser beam may be formed with a comparatively large aperture whereas the first lens 17A on the side of the optical disk 12 may be formed with a small aperture and respective focal lengths and an interval therebetween may be set to provide a total numerical aperture of 0.78 of the object lens 17.

The object lens 17 may satisfy the following relationships in which λ designates a wavelength of a laser beam, NA designates a numerical aperture of the object lens 17, t designates a thickness of the light transmitting layer of the optical disk 12, Δt designates dispersion of t, and θ designates a skew margin of the optical disk 12:

$$\theta \le \pm 84.115 \times (\lambda/NA^3/t) \quad (2)$$

$$\Delta t \le \pm 5.26 \times (\lambda/NA^4) \text{ (μm)} \quad (3)$$

Here, Equation (2) shows a relationship between the skew margin capable of stably providing access to an optical disk and an optical system (Japanese Unexamined Patent Publication No. JP-A-3-225650). A compact disk or the like may have a skew margin θ of about 0.6°. Further, the skew margin θ may be set to 0.4° for a DVD. In the optical disk 12, even when the thickness of the light transmitting layer is set to 0.1 (mm) and the numerical aperture NA of an optical system is set to a large value, sufficiently stably access can be made to the optical disk 12.

Further, Equation (3) shows a dispersion of the thickness t of the light transmitting layer allowable to an optical system in which the constant 0.526 is a value calculated in reference to a compact disk. At may have a value of ±100 (μm) for a compact disk and ±30 (μm) for a DVD. Thereby, in the optical disk device 10, even when the thickness of the light transmitting layer is dispersed, access can be stably made to the optical disk 12.

The optical head 11 may satisfy the following relationship by irradiating a laser beam having a wavelength of 650 (nm) to the optical disk 12 via an optical system having a numerical aperture of 0.78:

$$8 = 4.7 \times ([(0.65/0.60)(NA/\lambda)])^2 \quad (4)$$

Incidentally, in the above equation, numeral 4.7 indicates the recording capacity (GB) of DVD and numeral 0.65 and numeral 0.6 respectively indicate the wavelength of a laser beam and numerical aperture of an optical system for a DVD. Thereby, by using the optical head 11, a recording capacity of about 8 (GB) can be secured by processing data by a format similar to that of a DVD.

In the object lens 17, the first lens 17A is arranged so as to project to the side of the optical disk 12 and to have a working distance DW for the numerical aperture. Further, characteristics and arrangements of the first lens 17A and the second lens 17B may be selected, the working distance DW may be set to about 560 (μm) by which according to the optical head 11, eccentricity allowance between lens faces, face angle allowance and the radius of curvature of the object lens 17 can be set to ranges whereby mass production can be efficiently carried out, the total shape can be downsized and/or collisions with the optical disk can effectively be avoided.

Figure 9:
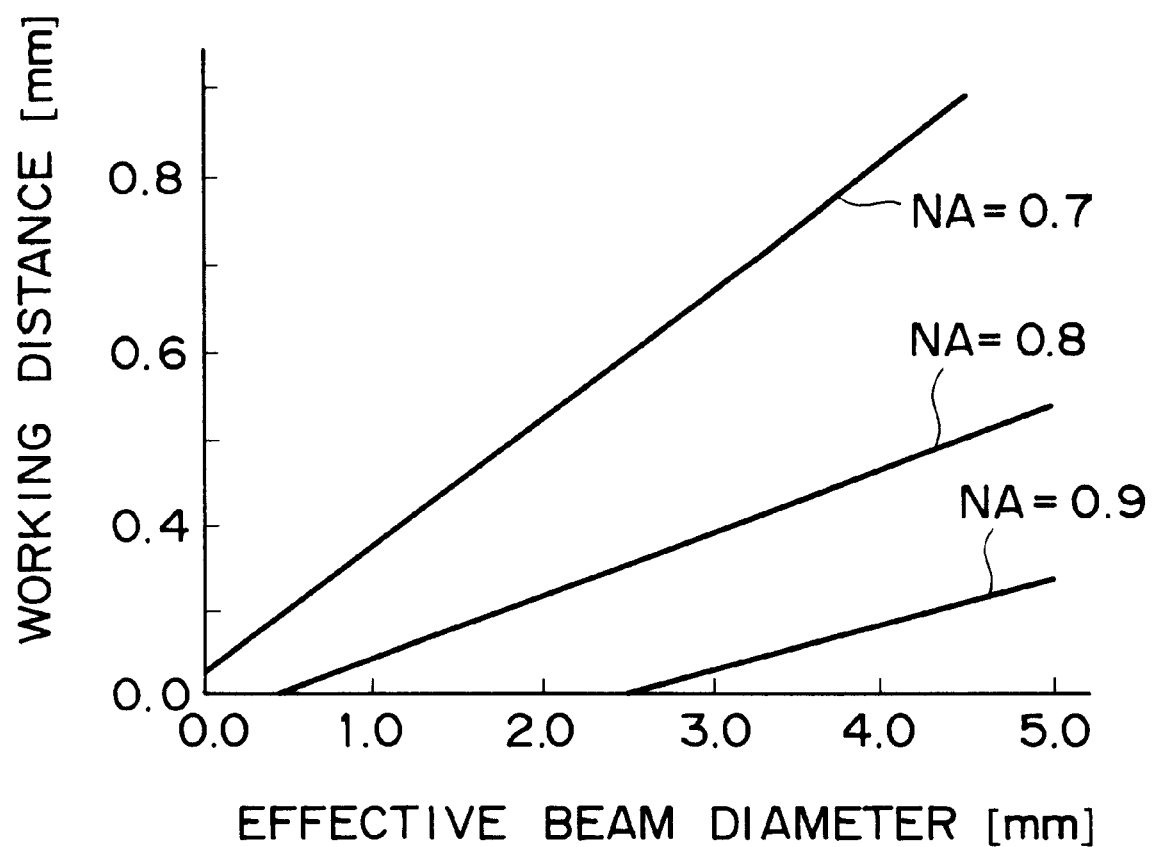
FIG. 9 is a diagram of characteristic curves showing a relationship between working distance and beam diameter.

That is, as shown by FIG. 9, when the numerical aperture is increased in the case where the same beam diameter of a laser beam is maintained, it is necessary to arrange the object lens proximate to the information recording face of the optical disk by that amount. Incidentally, in FIG. 9, the working distance is shown with the thickness of the light transmitting layer as 0. Therefore, if the optical head is arranged to provide a sufficient interval to the optical disk, the beam diameter of laser beam may be increased significantly in comparison with other systems. By contrast, the beam diameter of the laser beam of a DVD system may be about 4.5 (mm), which may be an upper limit value of the present system.

When the optical head is arranged in close proximity to the optical disk, the beam diameter of the laser beam may be reduced by a corresponding amount. In such situation, the shape of the optical system may be reduced. To ensure that high accuracy formation is obtained, the object lens should be accurately fabricated and arranged. Further, the system should be arranged to avoid a collision between the optical head and the optical disk. Therefore, according to the present embodiment, the working distance DW is set to about 560 (μm) and these conditions are satisfied.

The lens face of the first lens 17A on the side of the optical disk 12 may be formed to have a flat shape which enables focus control to be readily carried out and even when the optical disk 12 is skewed, the lens may be prevented from colliding with the surface of the light transmitting layer.

Further, the diameter of the object lens 17 on the side of the optical disk 12 may be reduced in steps and the lens face on the side of the optical disk 12 may have a small diameter sufficient for leading a laser beam to the optical disk 12.

The modulation coil 18 may be arranged to surround the front end side of the first lens 17A and such that the side face on the side of the optical disk 12 is substantially flush with the lens face of the first lens 17A. As such, the modulation coil 18 is arranged as close as possible to the optical disk 12 within a range not projected from the lens face of the first lens 17A and is capable of applying a modulated magnetic field efficiently at the position of irradiating laser beam. Further, temperature rise due to the modulation coil 18 may be reduced by a heat radiating plate 17E arranged on the side of the lens. As a result, various characteristic changes caused by a temperature rise can be restricted to acceptable ranges.

Figure 10A:
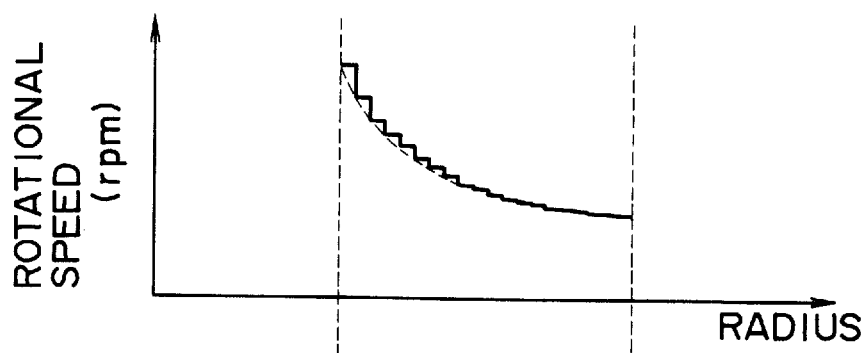
FIGS. 10A, 10B and 10C are diagrams to which reference will be made in explaining driving of an optical disk by the optical disk apparatus of FIG. 6.
Figure 10B:
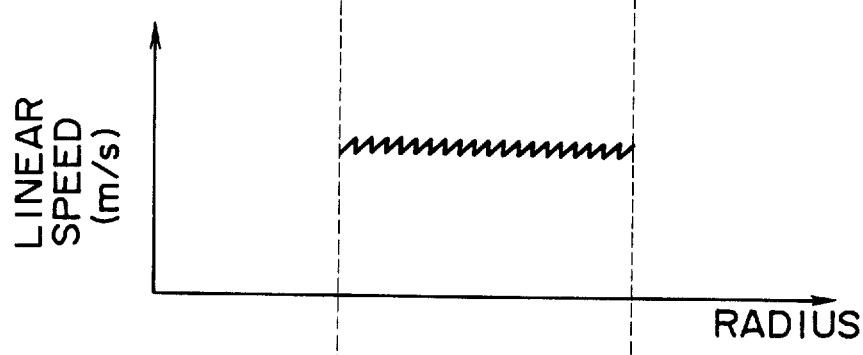
Figure 10C:
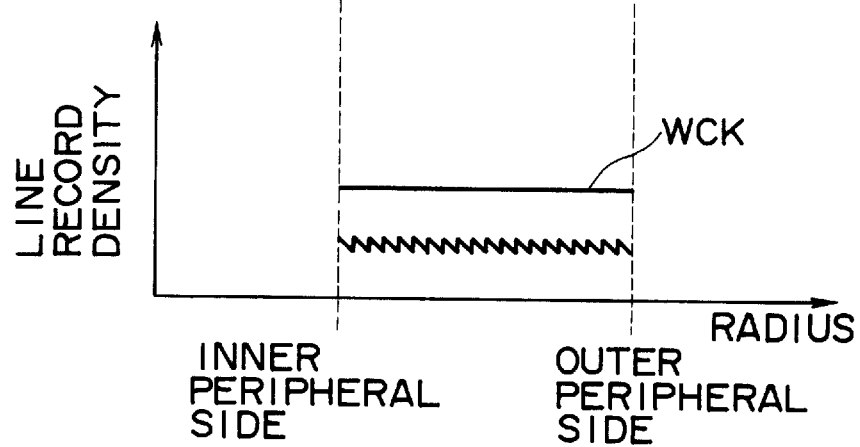

According to the optical disk device 10 (FIG. 6), a spindle motor 33 may drive or rotate the optical disk 12 under the control of a system control circuit 34. In a normal operational mode, the spindle motor 33 may drive or rotate the optical disk 12 such that the frequency of a reading/writing clock R/W CK formed by a phase-locked loop (PLL) circuit 35 becomes constant by which, as shown by FIGS. 10A, 10B and 10C, the optical disk 12 may be driven or rotated by a so-called "Zone Constant Linear Velocity" (ZCLV) method. Further, in this case, the ZCLV zoning may correspond to the zoning explained with reference to FIG. 3. That is, the spindle motor 33 may switch the rotational speed of the optical disk 12 successively in steps in accordance with the position of irradiating laser beam (FIG. 10A), by which according to the optical disk device 10, the linear speed and the line record density are not significantly varied between the inner peripheral side and the outer peripheral side thereby promoting the record density (FIGS. 10B and 10C) and effectively avoiding or preventing a reduction of access speed. By contrast, in a special operational mode such as postrecording or the like, the spindle motor 33 may drive or rotate the optical disk 12 with a predetermined rotational speed under the control of the system control circuit 34.

A threading motor 36 may move the optical head 11 in a radial direction of the optical disk 12 under control of the system control circuit 34. Such motor may enable a seeking operation to be carried out.

An address detecting circuit 37 may receive the reproducing signal RF having a signal level which may change in accordance with the amount of return light from the optical head 11 and may binarize the reproducing signal RF. Further, address data ID may be detected from the binarized signal with a synchronization signal allocated to the sector head as a reference and may be outputted to the system control circuit 34 and the detected timing may also be provided to a cluster counter 38. Thereby, in the optical disk device 10, the position of irradiating laser beam can be specified on the basis of the address data preformatted to the optical disk 12 by the system control circuit 34 and the timing of the sector can be confirmed by the cluster counter 38. Further, the address detecting circuit 37 may perform error detection processing by use of an error detection code allocated to each address data ID and may selectively output the address data ID which is determined to be correct.

A push pull (PP) signal may be supplied from the optical head 11 to a band-pass filter 39A of the wobble signal detecting circuit 39 so as to sample or obtain a wobble signal WB. Further, the wobble signal detecting circuit 39 may binarize the wobble signal WB with 0 level as a reference whereby edge information of the wobble signal WB may be sampled in a comparing circuit (COM) 39B.

A wobbling period detecting circuit 40 may receive a binarized signal S1 and may determine whether the wobble signal WB has changed by a correct period by determining or comparing timing of a corresponding edge with the timing of each edge of the binarized signal S1 as a reference. Further, the wobbling period detecting circuit 40 may output edge information which has been selectively determined to have a correct period to the PLL circuit 35. Thereby, the wobbling period detecting circuit 40 may prevent the clock CK from being displaced or adversely affected by dust or the like which may be on the optical disk 12.

The binarized signal outputted from the wobbling period detecting circuit 40 may be supplied to a phase comparing circuit (PC) 35A of the PLL circuit 35 so as to compare the phase of the binarized signal with the phase of the clock CK outputted from a divider 35B. The predetermined clock CK may be obtained and/or outputted from the divider 35B by switching a dividing ratio set by the system control circuit 34.

A low frequency component obtained as a result of the phase comparison outputted from the phase comparing circuit 35A may be sampled by a low pass filter (LPF) 35C and an output therefrom may be supplied to a voltage control type oscillating (VCO) circuit 36D so as to control the oscillation frequency thereof. Further, an oscillating output of the voltage control type oscillating circuit 36D may be divided by the divider 35B so as to form the high accuracy clock CK. With regard to the divider 35B, by setting the system control circuit 34 in correspondence with zoning which has been explained in reference to FIG. 3, the dividing ratio may be set to successively increase in accordance with the displacement of the position of irradiating laser beam to the outer peripheral side of the optical disk 12. Thereby, in the PLL circuit 35, in accordance with the displacement of the position of irradiating laser beam to the outer peripheral side of the optical disk 12, successively in steps, the frequency of the oscillating output of the voltage control type oscillating circuit 36D may be increased compared with the frequency of the wobble signal WB and the oscillating output may be outputted as the clock R/W CK for writing and reading.

In the normal operational mode of the optical disk device 10, by driving or rotating the optical disk 12 with the spindle motor 33 such that the frequency of the clock R/W CK for reading and writing becomes constant and by recording desired data with the clock R/W CK for reading and writing as a reference, the line record density may be prevented from changing significantly between the inner peripheral side and the outer peripheral side and, as a result, the record density may be increased.

The cluster counter 38 counts the clock R/W CK for reading and writing with the detection result from the address detecting circuit 37 as a reference by which the laser beam irradiating position is specified with high accuracy by referring to the clock R/W CK for reading and writing. Further, based on the result of such counting, the cluster counter 38 may obtain and/or output a cluster start pulse to the system control circuit 34. Here, a cluster is a unit for recording and reproducing data to and from the optical disk 12 and the cluster start pulse is a pulse for instructing or identifying the timing or start of the cluster. When the cluster counter 38 cannot detect the timing or starting of the sector from the address detecting circuit 37 due to, for example, dust or the like on the surface of the disk, the cluster counter 38 may interpolate the cluster start pulse by a synchronization processing with the counting result of the clock R/W CK for reading and writing as a reference.

The system control circuit 34 may include a computer for controlling an operation or operations of the optical disk device 10. For example, such control circuit may control the operation of the threading motor 36 or the like on the basis of the successively inputted address data ID and may control an overall operation by switching the operational mode in accordance with the laser beam irradiating position and/or in accordance with an input from an external device. Further, during processing, the system control circuit 34 may switch the dividing ratio of the divider 35B by use of dividing ratio data stored in a memory 42 in accordance with the laser beam irradiating position with the address data ID as a reference.

The system control circuit 34 may reduce the rotational speed of the optical disk successively in steps from zones on the inner peripheral side toward zones on the outer peripheral side to be in correspondence with the zones $Z_0, Z_1, \ldots Z_{n-1}$ and $Z_n$ explained above in reference to FIG. 3 and may cause an equal record density for each sector to be provided in respect of zones on the inner peripheral side and zones on the outer peripheral side.

On the other hand, in a special operational mode such as postrecording or the like where recording and reproducing processings are repeated alternately in respect of user data DU1 and DU2 of 2 channels or where the user data DU1 and DU2 of 2 channels are alternately reproduced from the optical disk 12 and are outputted concurrently, the system control circuit 34 may control the operation of a spindle servo circuit such that the rotational speed of the optical disk 12 is not switched even if zones are switched for reproducing user data.

Thereby, in the case where recording and reproducing processings are alternately repeated, in the reproducing operation, the system control circuit 34 may reproduce user data DU at the rotational speed of the optical disk 12 in a recording operation immediately before the reproducing operation even when zones are switched. Further, in the case where the user data DU1 and DU2 of 2 channels are alternately reproduced from the optical disk 12 and outputted concurrently, one user data may be reproduced from the optical disk 12 in a state where the optical disk 12 is driven to rotate at the rotational speed in reproducing the other user data. Further, in these cases, with regard to a channel on the recording side and a channel on other reproducing side, the system control circuit 34 may record and reproduce the user data by driving the optical disk 12 to rotate at a rotational speed twice that which may be set with respect of the corresponding zones by applying the ZCLV method.

During operation of the optical disk device, a time period may be necessary to stabilize the rotational speed when the rotational speed of the optical disk is switched. Accordingly, the optical disk device 10 may switch a recording and reproducing operation only with await time or the like needed for locking the PLL circuit in a period of time which may be significantly shorter than that in switching the rotational speed by omitting the time period necessary for switching the rotational speed of the optical disk 12. In this case, the rotational speed of the optical disk 12 may be set to about twice the rotational speed in the normal operational mode in the ZCLV control applied to a channel on the recording side and a channel on the other reproducing side. Thereby, in processing user data of 2 channels, the system control circuit 34 may record and reproduce the user data DU to and from the optical disk 12 at high speed and intermittently and a time period sufficient for seeking operation or the like or processing of the other channel can be realized.

FIG. 11 is a flowchart showing a processing involved in the setting of the rotational speed of the optical disk in the system control circuit 34. According to the system control circuit 34, when a user selects the operational mode, the operation proceeds from step SP1 to step SP2 where a determination is made as to whether the operational mode selected by the user is the above-described operational mode of post recording or the like and when a negative result is obtained, the operation proceeds step SP3. Here, according to the system control circuit 34, after setting the operational mode of the spindle servo circuit to a ZCLV operational mode, the operation proceeds to step SP4 and the processing procedure is finished.

On the other hand, when the operational mode selected by the user is the above-described operational mode of postre-cording or the like, as indicated by an affirmative result in step SP2, the operation of the system control circuit 34 proceeds to step SP5. Here, the system control circuit 34 stops switching the rotational speed (that is, sets operational mode to CAV) as, for example, that which may occur with respect to a channel on the reproducing side when 2 channels are respectively recorded and reproduced and with respect to either channel when 2 channels are respectively reproduced. The operation of the system control circuit 34 may then proceed to step SP6 so as to set the ZCLV operational mode at the above-described rotational speed for the spindle control of a remaining channel and thereafter, the operation proceeds to step SP4 whereupon the processing is terminated.

In the state where the rotational speed of the optical disk 12 is controlled as described above, the system control circuit 34 may allocate data of 1 cluster to 4 continuous sectors with the address areas AR2 set to the respective sectors as references by executing control of writing and reading in accordance with the cluster start pulse outputted from the cluster counter 38. Thereby, the system control circuit 34 may increase the numbers of clusters successively allocated to respective zones from zones on the inner peripheral side toward zones on the outer peripheral side. Further, the system control circuit 34 may instruct or control a tracking servo circuit to switch the movable direction of the object lens 17 in respect of the polarity of the tracking error signal by which the scanning of a laser beam is controlled to switch between a groove and a land between grooves. As a result, the optical disk device 10 may perform so-called land and groove recording.

Figure 1:
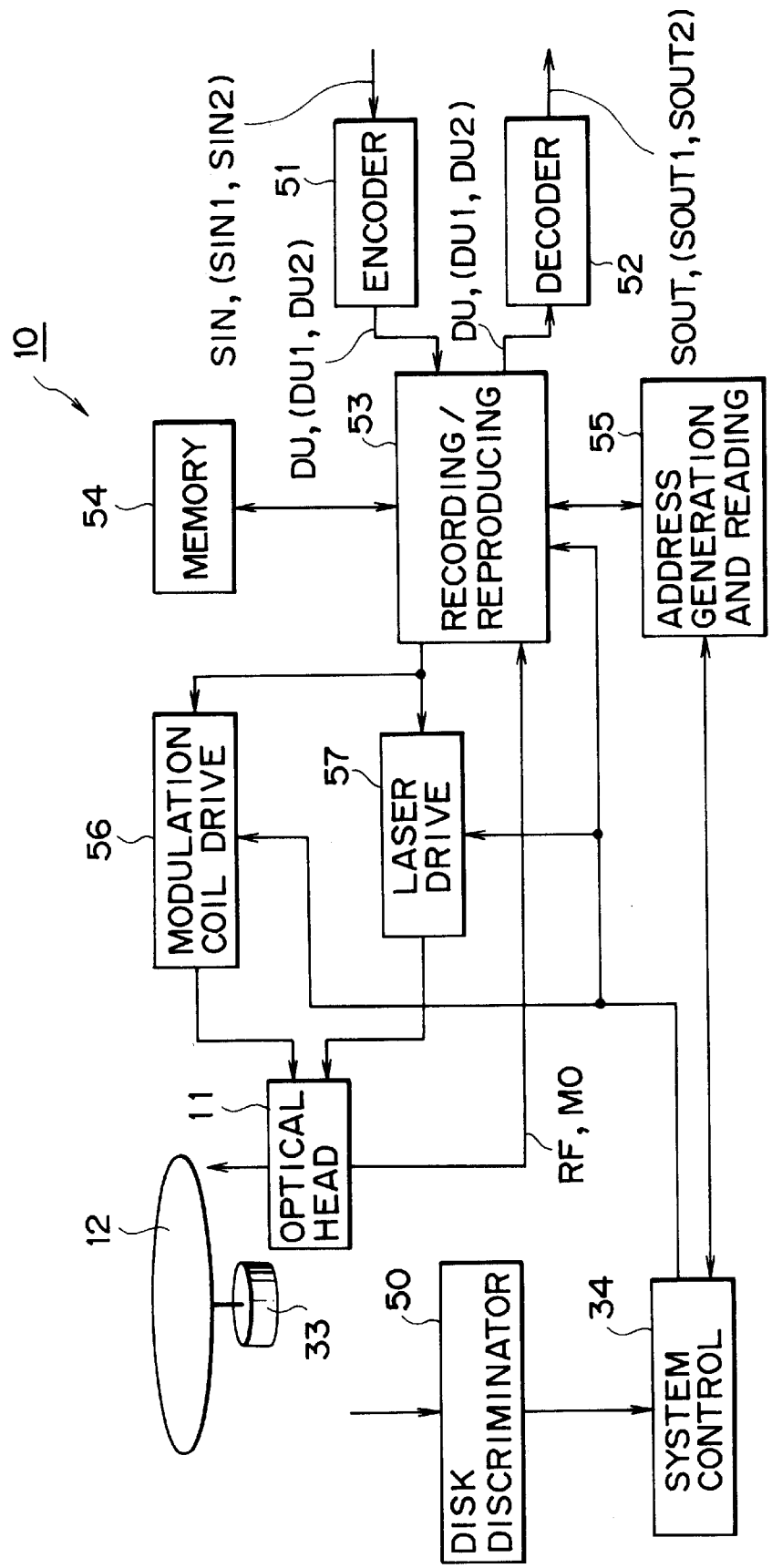
FIG. 1 is a diagram of an optical disk apparatus according to a first embodiment of the present invention.

FIG. 1 is a diagram of a recording and reproducing system of the optical disk device 10. In the optical disk device 10, a disk discriminator 50 identifies the kind or type of optical disk which is being utilized by, for example, recess portions formed in a cartridge and outputs an identification number or result to the system control circuit 34. The optical disk device 10 is adaptable for use with a number of types of optical disks and switches the operation of the recording and reproducing system in accordance with the type of loaded optical disk.

An encoder 51 may receive an input signal SIN which may comprise a video signal and/or an audio signal from an external device in recording, editing or the like and may process the video signal and audio signal in an analog to digital conversion processing and subject them to data compression by a format prescribed in MPEG (Moving Picture Experts Group). Further, the encoder 51 may form the data-compressed video signal and audio signal in buckets and may add a bucket header, control data and the like to each bucket. The encoder 51 may subject the data-compressed video signal and audio signal to time division multiplexing by successively outputting these buckets to form a bit stream user data DU. The encoder 51 may be able to concurrently process 2 channels of video signals and audio signals and concurrently output 2 channels of user data DU1 and DU2 in correspondence with the 2 channels of video signals and audio signals and may concurrently execute the processing of the 2 channels as necessary by control of the system control circuit 34.

In a manner somewhat opposite to that of the encoder 51, a decoder 52 may form a digital video signal and/or a digital audio signal by subjecting the user DU outputted from a recording and reproducing circuit 53 to data expansion by a format prescribed in MPEG in reproducing and editing, and may convert the digital video signal and the digital audio signal into an analog signal SOUT and output the same. Similar to the encoder 51, the decoder 52 may be able to concurrently execute decoding processings of 2 channels of video signals and audio signals SOUT 1 and SOUT2 and may concurrently execute the processing of 2 channels as necessary by switching operation under control of the system control circuit 34.

Figure 12:
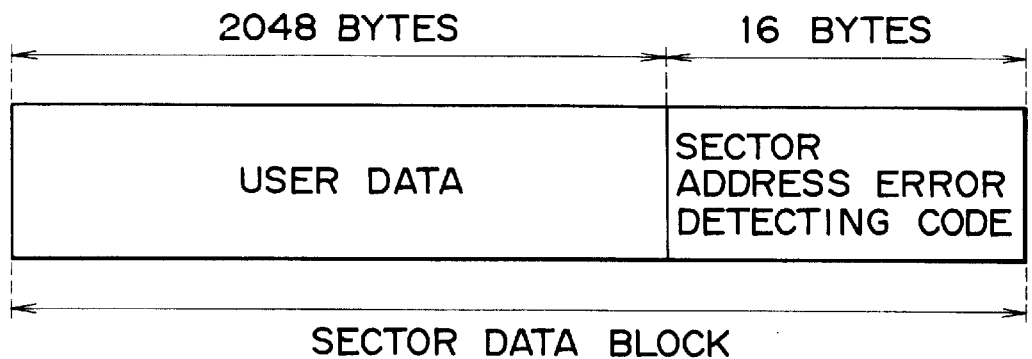
FIG. 12 is a diagram of a sector structure which may be utilized in the optical disk apparatus of FIG. 1.

The recording and reproducing circuit 53 may store the user data DU outputted from the encoder 51 to a memory 54 in recording and editing and may record the user data DU to the optical disk 12 by processing it by a predetermined block unit. That is, as shown by FIG. 12, the recording and reproducing circuit 53 may successively block the user data DU in a unit having 2048 bytes and may add address data and error detection code having 16 bytes to each block. To form a sector data block having 2048 bytes+16 bytes. The address data is address data of the sector data block. Incidentally, the sector of the user data DU differs from the sector by the preformat described above in reference to FIG. 3. Further, the error detection code may be an error detection code of the address data.

Figure 13:
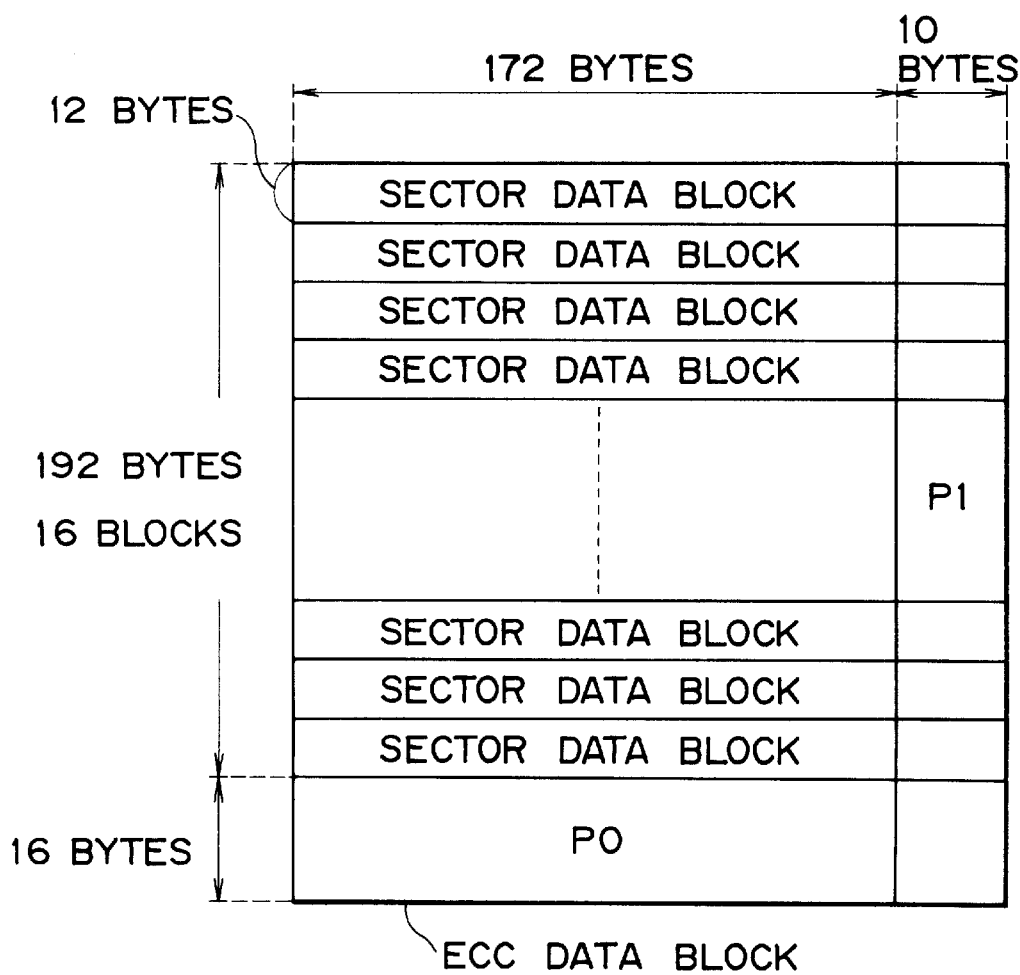
FIG. 13 is a diagram of an ECC block which may be utilized in the optical disk apparatus of FIG. 1.
Figure 14:
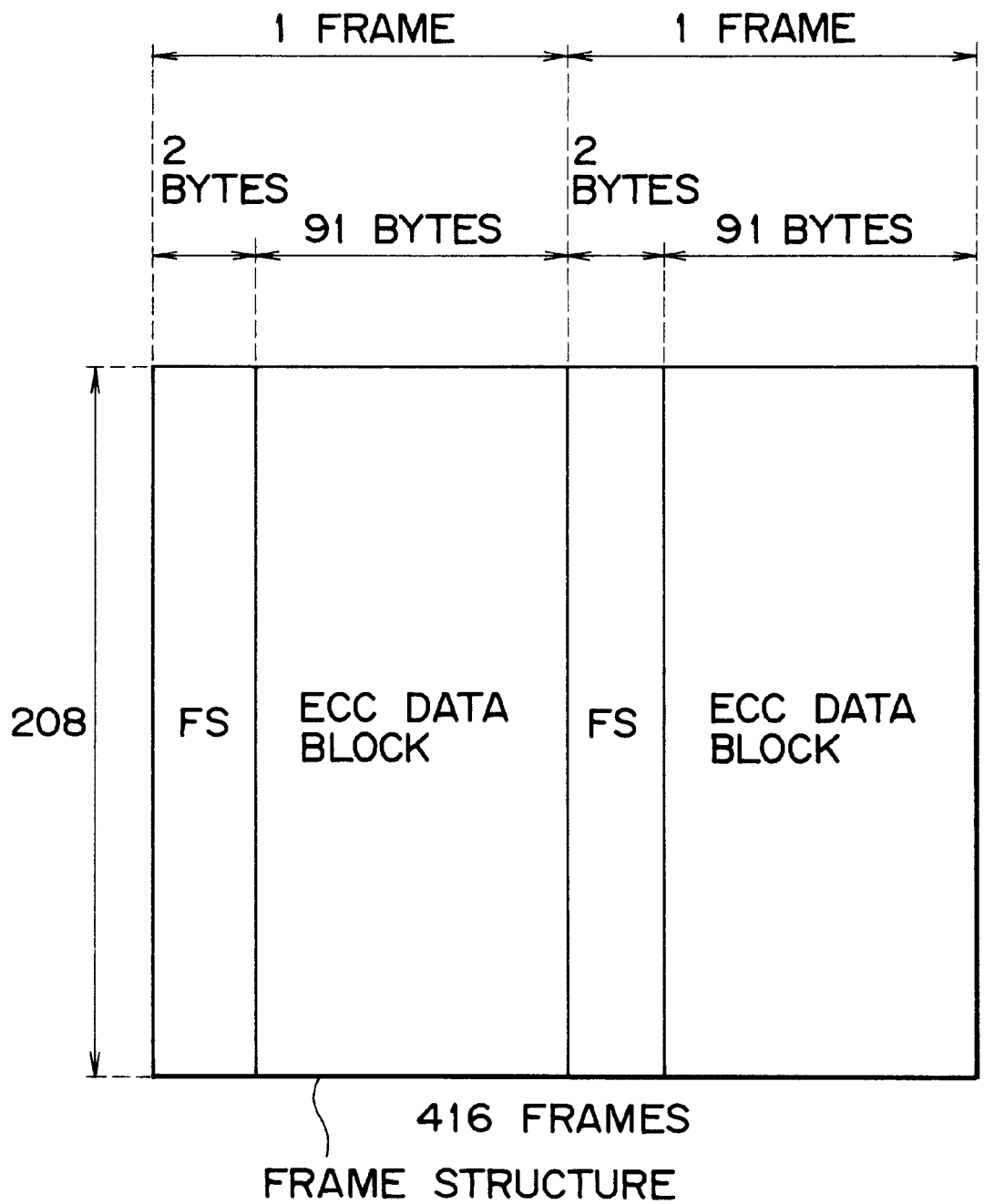
FIG. 14 is a diagram of a frame structure which may be utilized in the optical disk apparatus of FIG. 1.

Further, as shown by FIG. 13, the recording and reproducing circuit 53 may form an ECC data block (182 bytes× 208 bytes) by 16 of the sector data blocks. That is, the recording and reproducing circuit 53 may arrange 16 of the sector data blocks each comprising 2048 bytes+16 bytes by a unit of 172 bytes successively in the order of raster scanning and form error correction code (PI) comprising inner code in the horizontal direction and error correction code (PO) comprising outer code in the vertical direction. Furthermore, the recording and reproducing circuit 53 may interleave the ECC block and form a frame structure shown by FIG. 14. That is, the recording and reproducing circuit 53 may allocate a frame synchronizing signal (FS) of 2 bytes to each 91 bytes of the ECC data block of 182 bytes×208 bytes thereby forming 412 frames by one ECC data block. The recording and reproducing circuit 53 may form data of 1 cluster having the frame structure shown in FIG. 14 and may allocate the one cluster to 4 continuous sectors.

The recording and reproducing circuit 53 may set the redundancy to 23(%) or less and may efficiently record the user data by adding redundant data such as the frame synchronizing signal, error correction code, the frame address and so on to the user data. In this way, a redundancy of 23(%) (which is similar to that in a DVD system) still ensures sufficient recording capacity. Incidentally, increasing the redundancy to more than 23(%) only unnecessarily aid the error correction function.

Further, by forming the ECC data block by the user data of 32 (KB), an interval between codes in the error correction processing can sufficiently be secured and the error correction function can be strengthened by that amount. Additionally, the recording or reproducing processing may be carried out with the ECC data block as a unit and as a whole, the processing of recording or reproducing or processing of postrecording or the like can be executed by simple processings.

The recording and reproducing circuit 53 may allocate data of predetermined fixed values as necessary and may process continuous data by the sector structure described above in reference to FIGS. 4A, 4B and 4C. Further, the recording and reproducing circuit 53 may subject the data row according to such an arrangement to (1, 7) RLL modulation and, thereafter, may perform a calculation among continuous bits and output the data row. Further, the outputting operation may be carried out with the writing/reading clock R/W CK as a reference. In the normal operational mode, the data may be converted into the user data DU and outputted at data transmitting speed of 11.08 (Mbps) by which the user data DU is intermittently outputted at a transmitting speed higher than that of the user data DU inputted from the encoder 51. The recording and reproducing circuit 53 may intermittently record the user data DU and can enable a seek operation involving the optical head 11 to be performed by utilizing extra idle time and can record discretely the continuous user data by the seeking operation.

Further, in a special operational mode such as postrecording or the like, data modulated by a data transmitting speed of about 20 (Mbps) in conversion of the user data DU may be outputted so that 2 channels of the user data DU1 and DU2 can be alternately recorded. In this way, by repeating a recording and reproducing operation with the cluster as a unit, the optical disk device 10 can execute reproduction of data recorded on the optical disk 12, editing processing and recording reproduced data and processing such as postrecording or the like.

In data recording, the recording and reproducing circuit 53 may output data modulated with use of the reading/writing clock R/W CK described above in reference to FIG. 6 and may start outputting data modulated with a timing detected by the cluster counter 38 as a reference under control of the system control circuit 34.

Further, the recording and reproducing circuit 53 may amplify reproducing signals RF and Mo inputted from the optical head 11 and thereafter, may process or binarize the signals to form binarized signals in a reproducing operation. The clock may be reproduced by the reproducing signals RF and MO with the binarized signal as a reference. In this way, the reproduced clock corresponds to the reading/writing clock R/W CK. Further, reproduced data may be detected by successively latching the binarized signal with the reproduced clock as a reference.

The recording and reproducing circuit 53 may form decoded data by decoding the reproduced data by applying a PRLM (Partial-Response Maximum-Likelihood) method. Further, the recording and reproducing circuit 53 may deinterleave the decoded data and, thereafter, may carry out error correction and output the decoded data to the decoder 52.

In a DVD, data modulated in (1, 7) Rll modulation may be recorded by the shortest bit length of 0.4 ($\mu$m) and desired data can be recorded and reproduced by the shortest pit length of 0.3 ($\mu$m) and the line record density of 0.23 ($\mu$m) when a recording and reproducing system is formed by a margin the same as that of DVD by a simple conversion in accordance with the numerical aperture. In contrast thereto, when interference among codes is positively utilized by PRML, a similar margin can be secured with a record density of 0.23 ($\mu$m) or less by that amount.

In the normal operational mode, the recording and reproducing circuit 53 may reproduce data intermittently from the optical disk 12 with a unit of cluster at the data transmitting speed of 11.08 (Mbps) in conversion of the user data DU similar to the recording operation, and may output the reproduced user data DU continuously to the decoder 52 via the memory 54. In contrast thereto, in a special operational mode of postrecording or the like, data may be intermittently reproduced from the optical disk 12 with the unit of cluster at the data transmitting speed of about 20 (Mbps) in conversion of the user data DU in correspondence with the rotational speed of the optical disk 12 and the reproduced user data DU may be continuously outputted to the decoder 52 via the memory 54.

In the series of processings in reproduction, when the optical disk 12 is a magneto-optical disk, the recording and reproducing circuit 53 may reproduce the user data DU by selectively processing the reproducing signal MO where the signal level may be changed in accordance with the plane of polarization under control of the system control circuit 34. When the optical disk 12 is an optical disk exclusively for reproduction, or a write once type optical disk or a phase change type optical disk, the user data DU may be reproduced by selectively processing the reproducing signal RF where the signal level may be changed in accordance with a change in the amount of return light. Further, even when the optical disk 12 is a magneto-optical disk, in the case where a read-in area on the inner peripheral side is reproduced, the user data DU may be reproduced by selectively processing the reproducing signal RF.

In a recording operation, an address reading circuit 55 may form address data to be added to each sector data block (FIG. 12) and may output it to the recording and reproducing circuit 53. In a reproducing operation, the address reading circuit 55 may analyze address data detected by the recording and reproducing circuit 53 and may provide a signal to the system control circuit 34 informing it of the results.

The memory 54 may include a buffer memory having a large capacity for temporarily storing and holding the user data. The memory 54 may switch a recording region successively and circulatingly by address control using a write pointer and a read pointer in a memory control circuit, may input and output continuously the user data DU to and from the encoder 51 and the decoder 52 and may input and output intermittently the user data DU to and from the optical disk 12 via the recording and reproducing circuit 53 with a cluster unit(s).

Figure 15:
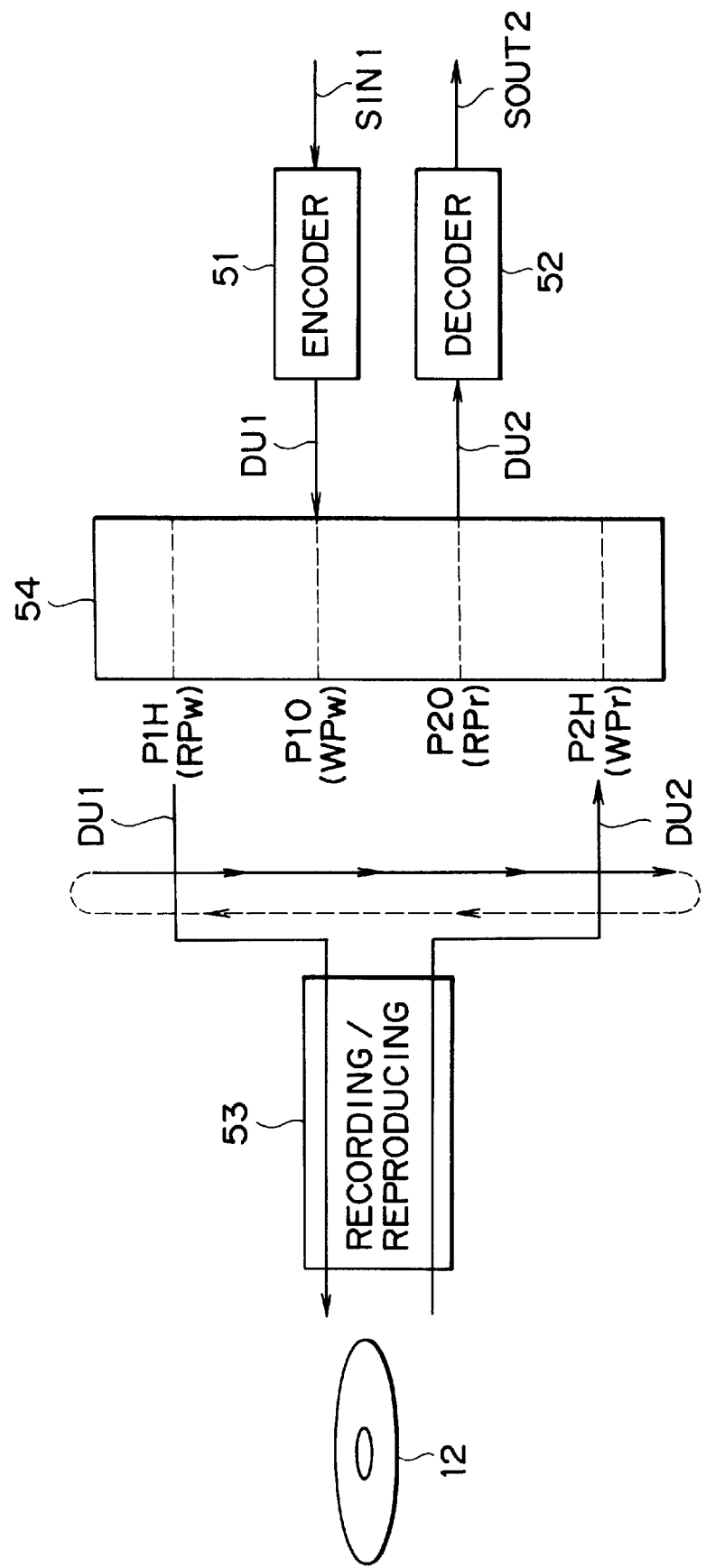
FIG. 15 is a diagram to which reference will be made in explaining the flow of 2 channels of video signal and audio signal in the optical disk apparatus of FIG. 1.

When 2 channels of the user data DU1 and DU2 are concurrently processed in a special operational mode of postrecording or the like, as shown by FIG. 15, in the memory 54, pointers P1H and P2H for inputting and outputting to and from the optical disk 12 and pointers P1O and P2O for inputting and outputting to and from the encoder 51 and the decoder 52 may be set in correspondence with the 2 channels of user data DU1 and DU2. By use of address control involving such pointers, the 2 channels of the user data DU1 and DU2 may be inputted and outputted concurrently and continuously to and from the encoder 51 and decoder 52 and the user data DU1 and DU2 may be alternately inputted and outputted to and from the optical disk 12 in a cluster unit(s). In FIG. 15, the setting of pointers for the case of postrecording is shown. That is, the pointers P1H and P2H for inputting and outputting to and from the optical disk 12 respectively show pointers RPw and WPr for reading and writing to and from the optical disk 12 and pointers P1O and P2O for inputting and outputting to and from the encoder 51 and the decoder 52 respectively show a pointer WPw for inputting from the encoder 51 and a pointer RPr for outputting to the decoder 52.

In this way, when the capacity of the memory 54 is set to about 10 (Mbit) with a data transmitting speed in respect of the encoder 51 and the decoder 52 of 8 (Mbps) and with a time period necessary for a seeking operation of about 200 (msec), at an interval of about 2 seconds, 2 channels of user data may be alternately recorded and reproduced to and from the optical disk 12 so that a video signal and an audio signal of the user data can be recorded and reproduced without an interruption.

When the optical disk 12 is a magneto-optical disk, in a writing operation, a laser drive circuit 57 may drive a semiconductor laser of the optical head 11 with a timing in synchronism with the reading/writing clock R/W CK under control of the system control circuit 34 whereupon the amount of laser beam may be intermittently increased. As a result, the optical disk device 10 may record user data with a line record density of 0.21 ($\mu$m/bit) by forming a mark row or a pit row having a maximum run length 8T and a minimum run length 2T by using the shortest record pit 4/3 bit.

Further, in a writing operation, when the optical disk 12 is of a phase change type or a write once type, the laser drive circuit 57 may intermittently increase the amount of laser beam in accordance with output data of the recording and reproducing circuit 53 to thereby record the user data DU to the optical disk 12 under control of the system control circuit 34. As a result, the optical disk device 10 may record a mark row or pit row having a maximum run length 8T and a minimum run length 2T by using the shortest record mark or the shortest record pit 4/3 bit with a line record density 0.21 ($\mu$m/bit) or the shortest mark length or the shortest pit length 0.3 ($\mu$m).

In contrast thereto, the laser drive circuit 57 may hold the amount of laser beam at a constant low level during a reading operation.

When the optical disk 12 is a magneto-optical disk, a modulation coil drive circuit 56 may start a recording operation under control of the system control circuit 34 and may drive a modulation coil of the optical head 11 in accordance with outputted data of the recording and reproducing circuit 53. For instance, the modulation coil drive circuit 56 may apply a modulation magnetic field to the position for irradiating laser beam where the light amount is increased intermittently by which the user data may be recorded at a line record density 0.21 ($\mu$m/bit) and the shortest mark length 0.3 ($\mu$m) or less by forming marks each having the maximum run length 8T and the minimum run length 2T using the shortest record mark 4/3 bit by applying a thermomagnetic recording method.

FIGS. 16A, 16B, 16C1 and 16C2 are diagrams for explaining the control of the system control circuit 34 in a normal recording and reproducing operation. (In the following explanation, writing and reading operation to and from the optical disk 12 are designated by notations R and W.)

Figures 16A, 16B:
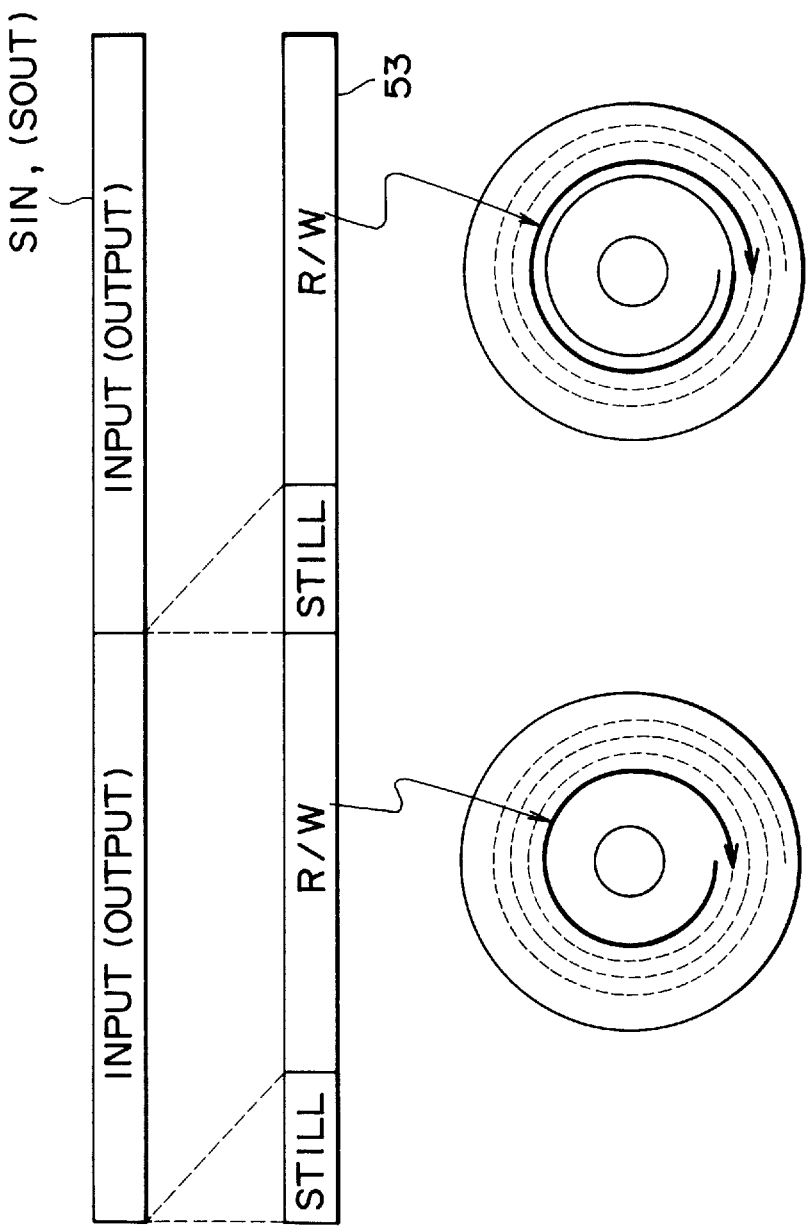

In a recording operation, the system control circuit 34 may cause 1 channel of successively inputted video signal and audio signal SIN (FIG. 16A) to be converted into the user data DU by the encoder 51 and may cause it to be successively inputted to the memory 54. Further, an amount of data of a predetermined record unit may be stored in the memory 54 in a state where the optical head 11 is sought to a sector of an object and held still, and when the memory 54 has a vacant capacity of a predetermined value or less, the user data DU held in the memory 54 may be recorded to the optical disk 12 in a cluster unit(s) (FIGS. 16B and 16Cl). The system control circuit 34 may interrupt recording to the optical disk 12 when the amount of the user data held in the memory 54 is a predetermined value or less.

In such situation, the system control circuit 34 holds the optical head 11 in a still state in respect of a succeeding sector, awaits until an amount of data of a record unit is again stored in the memory 54 and then records data again to the optical disk 12 (FIGS. 16B and 16C2).

Although the system control circuit 34 is described as performing operation(s) such as storing data, outputting data and so forth, the system control circuit may actually generate and/or supply control signals to the appropriate circuit or circuits so as to cause such circuit or circuits to perform the designated operation(s).

The system control circuit 34 may compress the user data DU over time via the memory 54 and may intermittently record the continuous user data DU by allocating it to continuous sectors. When a continuous region cannot be secured on the optical disk 12 by determining from file control data recorded in a read-in area of the optical disk 12, the system control circuit 34 may discretely record the user data DU and, in this case, when the user data DU is recorded to the optical disk 12, not only still but also seek processings may be executed and the rotational speed of the optical disk 12 may be switched as necessary.

In contrast thereto, when the user selects a reproduction operation, the system control circuit 34 may start reproduction after making the optical head 11 seek to an object sector, store the user data DU recorded by the recording and reproducing circuit 53 to the memory 54 and successively output the user data DU stored in the memory 54 to the decoder 52. Under this state, when an amount of data of the user data DU stored in the memory 54 is a predetermined recording and reproducing unit and the vacant or available capacity of the memory 54 is a predetermined value or less, the system control circuit 34 may hold the optical head 11 in a still state in respect of a succeeding sector and may interrupt reproduction of the user data DU from the optical disk 12. When the amount of data held in the memory 54 is reduced to a predetermined value or less, the system control circuit 34 may instruct the start of reproduction of the optical disk 12. Thereby, the system control circuit 34 may reproduce the user data DU intermittently from the optical disk 12 and output continuous video signal and audio signal SOUT without interruption.

FIGS. 17A, 17B, 17C, 17D1, 17D2, 17D3 and 17D4 are diagrams for explaining a so-called follow-up reproduction mode. The follow-up reproduction may be set in the case where, for example, in the midst of recording video signal and audio signal designated by the user, the user wishes to reproduce a program which is being recorded from a starting position of the recording while maintaining record mode.

When the user selects the operational mode in a state where 1 channel of video signal and audio signal are being recorded to the optical disk 12, as explained with reference to FIGS. 16A, 16B, 16C1 and 16C2, the system control circuit 34 may switch the rotational speed of the optical disk 12 to a rotational speed twice a normal rotational speed. Further, in synchronism therewith, the dividing ratio of the divider 35B may be set such that the frequency of the reading/writing clock R/W CK becomes twice a normal frequency (FIG. 6). The system control circuit 34 may intermittently record the user data DU to the optical disk 12 by increasing the data transmitting speed in respect of the optical disk 12 so as to be substantially twice the data transmitting speed until then. The operation may be carried out at doubled speed from the start. After switching the data transmitting speed in this way, the system control circuit 34 may reproduce user data recorded to the optical disk 12 by utilizing idle time at an intermediary of recording the user data DU by setting the four pointers explained above in reference to FIG. 15 (FIGS. 17A, 17B and 17C).

That is, the system control circuit 34 may record the user data DU stored in the memory 54 to the optical disk 12 and when the amount of user data for recording stored to the memory 54 is reduced to a predetermined value or less, the system control circuit 34 may interrupt recording to the optical disk 12 and may make the optical head 11 seek to a record start position (FIG. 17D1).

Successively, the system control circuit 34 may start reproduction of the user data DU from the record start position (FIG. 17D2), may store the user data DU reproduced from the optical disk 12 successively to the memory 54 and output the user data DU stored in the memory 54 to the decoder 52. In this case, when a predetermined amount of the user data DU is stored to the memory 54 and the amount of user data on the record side held in the memory 54 is a predetermined value or less, reproduction from the optical disk 12 may be interrupted while the user data DU is continued to be outputted to the decoder 52.

Further, the system control circuit 34 may make the optical head 11 seek (FIG. 17D3) and record the user data DU stored in the memory 54 during a time period in which the user data DU is being reproduced from the optical disk 12 successively from an interrupted sector (FIG. 17D4).

When the amount of the user data on the record side stored in the memory 54 is a predetermined value or more, and the amount of the user data held in the memory 54 by being reproduced from the optical disk 12 is a predetermined value or less, the record processing may be interrupted and the optical head 11 made to seek again and successive user data reproduced.

In this way, the system control circuit 34 may reproduce and output the video signal and the audio signal recorded to the optical disk 12 with no interruption while recording the continuous video signal and audio signal to the optical disk 12.

In recording and reproducing 2 channels of user data in this way, as shown by FIGS. 18A, 18B, 18C and 18D, when zones of record object are switched, for example, from Zm to $Z_{m+1}$ on the premise of holding the rotational speed of the optical disk 12 twice a normal rotational speed, the system control circuit 34 may switch the rotational speed of the optical disk 12 in correspondence with a rotational speed of each zone with the normal rotational speed constituting a reference of the rotational speed (FIGS. 18A and 18B).

Thereby, in recording to the optical disk 12, the system control circuit 34 may maintain the reading/writing clock R/W CK at a constant frequency and may maintain the linear speed of the position of irradiating laser beam substantially constant along therewith (FIGS. 18C and 18D).

In contrast thereto, in reproduction, switching of the rotational speed of the optical disk 12 may be interrupted and data of the optical disk 12 may be reproduced while maintaining the rotational speed in a recording operation immediately before reproduction. In this case, in the recording and reproducing circuit 53, a reproduction clock may be provided with a frequency in correspondence with the rotational speed of the optical disk 12 and reproduction data provided from the optical disk 12 may be processed with use of the reproduction clock. The reproduction clock may correspond to the reading/writing clock R/W CK formed by the PLL circuit 35 and accordingly, in this case, the frequency of the reading/writing clock R/W CK may be changed in accordance with the position of irradiating laser beam.

Thus, by using the system control circuit 34, the frequency of switching the rotational speed of the optical disk 12 may be reduced and access speed may be improved.

FIGS. 19A, 19B, 19C, 19D1, 19D2, 19D3 and 19D4 are diagrams for explaining a so-called multichannel mode. Here, multichannel processing may be processing involving the simultaneous recording or reproducing of 2 channels of video signals and audio signals. In this case, according to the system control circuit 34, the rotational speed of the optical disk 12 may be set to a rotational speed twice the normal rotational speed and 2 channels of video signals and audio signals may be recorded or reproduced.

When the user selects a multichannel record mode, the system control circuit 34 may process 2 channels of video signals and audio signals by the encoder 51, form 2 channels of continuous user data DU1 and DU2 and successively input the user data DU1 and DU2 to the memory 54 (FIGS. 19A and 19B). Further, when a predetermined amount of either of the user data DU1 and DU2 is stored in the memory 54 in a state where the optical head 11 is made to seek to a predetermined record start position by setting the four pointers described above in reference to FIG. 15 (FIGS. 19C and 19D1), the system control circuit 34 may start recording either the user data DU1 and DU2 to the optical disk 12 (FIG. 19D2). When the amount of data in the memory 54 is a predetermined value or less in respect of the user data which starts recording, recording to the optical disk 12 may be interrupted. Further, the system control circuit 34 may make the optical head 11 seek and wait at a record start position of the other channel (FIG. 19D3) and the user data held in the memory 54 may be similarly recorded in the other channel (FIG. 19D4).

The system control circuit 34 may alternately repeat the series of processings and may alternately carry out a recording operation to the optical disk 12 while inputting 2 channels of the continuous user data to the memory 54. In this case, the system control circuit 34 may grasp a recording time period of the two video signals and audio signals in accordance with an input of the user or the like and may secure previously continuous regions for the respective channels and make the optical head 11 carry out a seeking operation.

In contrast thereto, when the user selects a multichannel reproduction mode, in a manner similar to that of the recording operation, the system control circuit 34 may make the optical head 11 seek, may control access to the optical disk 12 whereby 2 channels of user data are intermittently reproduced from the optical disk 12 and held in the memory 54 and may output the 2 channels of user data held in the memory 54 after decoding it continuously by the decoder 52.

Even in the multichannel reproduction mode, with respect to one of the channels, the system control circuit 34 may maintain the rotational speed of the optical disk 12 at a rotational speed of the other channel by which the frequency of switching the rotational speed of the optical disk 12 may be reduced and the access speed improved.

FIGS. 20A, 20B, 20C, 20D1, 20D2, 20D3 and 20D4 are diagrams for explaining a postrecording selecting mode. In this case, the optical disk device 10 may be utilized with a number of external devices such that, as shown by FIG. 21, successively reproduced video signal and audio signal (FIG. 20A) may be monitored by a monitor 950 and a speaker 952 and audio signal or the like inputted from a microphone 954 or the like may be mixed with the reproduced video signal and audio signal and successively inputted (FIG. 20B).

In this mode, the system control circuit 34 may set the data transmitting speed to the optical disk 12 and the rotational speed of the optical disk 12 to twice those in the normal mode. The optical head 11 may be made to seek to a reproducing start position of a program selected by the user (FIGS. 20C and 20D1) and reproduction of the user data DU may be started from the position. Further, the reproduced user data may be stored in the memory 54 and the stored user data may be outputted via the decoder 52 (FIG. 20D2). When a predetermined amount of the user data is stored in the memory 54, the system control circuit 34 may interrupt reproduction and make the optical head 11 seek to a position of starting reproduction (FIG. 20D3). Here, the reproduced user data may be processed by an external device and successively stored in the memory 54 by which the user data stored in the memory 54 may be recorded to a corresponding portion of the optical disk 12 by, for example, overwriting (FIG. 20D4). Thereby, when the amount of user data on the record side or the amount of user data on the reproduction side stored in the memory 54 is a predetermined value or less, the user data may be reproduced from a portion where the reproduction is interrupted and these control operations are repeated.

Therefore, the system control circuit 34 may reproduce the user data DU intermittently from the optical disk 12 and may again record intermittently the user data processed by an external device to the portion of reproducing the user data DU. Incidentally, even in the postrecording operation, the system control circuit 34 may maintain the rotational speed of the optical disk 12 at a rotational speed of a channel on the record side in respect to a channel on the reproduction side by which the frequency of switching the rotational speed of the optical disk 12 may be reduced and access speed improved.

FIGS. 22A1, 22A2, 22A3, 22B and 22C are diagrams for explaining a so-called pointer reproduction selecting mode. In this case, the system control circuit 34 successively heads out respective programs recorded to the optical disk 12 and reproduces them for predetermined periods through determination by file control data recorded in a read-in area of the optical disk 12. That is, the system control circuit 34 may make the optical head 11 seek to head out in accordance with file control data (FIG. 22B), and start reproduction of the optical disk 12 from the head-out portion (FIGS. 22A1 and 22B). Further, the reproduced user data may be outputted via the memory 54 (FIG. 22C). In this case, when a sufficient amount of user data is stored in the memory 54 after an elapse of a predetermined time period, the system control circuit 34 heads out a succeeding program by making the optical head 11 seek (FIG. 22A2), and reproduces data of the optical disk 12 from the head-out portion after having awaited reduction of the amount of user data in the memory 54 to a predetermined value or less (FIG. 22A3). The system control circuit 34 may repeat these processings and reproduce respective programs recorded on the optical disk 12 by successively heading them out.

Figure 23:
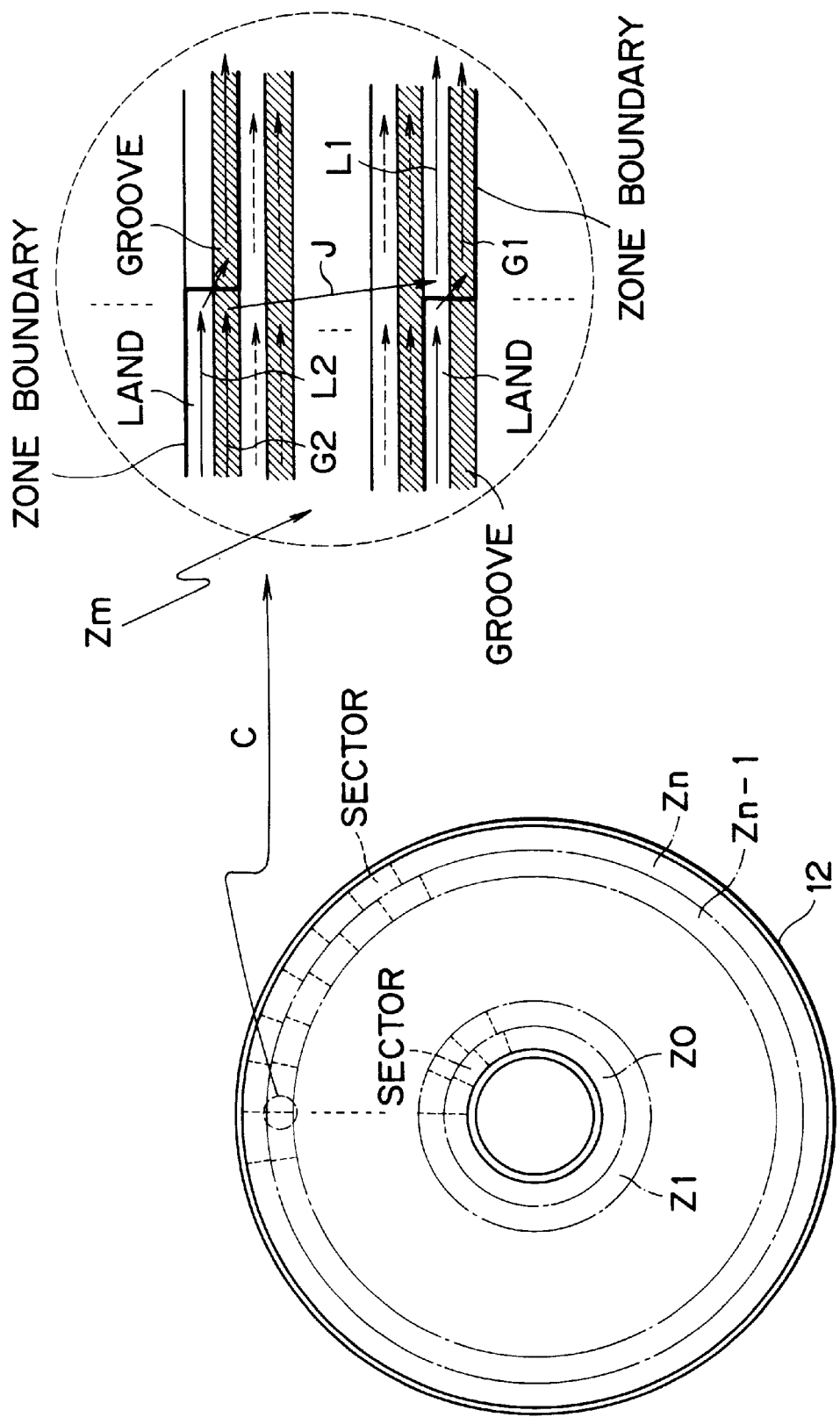
FIG. 23 is a plane view for explaining access to an optical disk in respective zones.

FIG. 23 is a diagram for explaining access to the optical disk 12 in recording and reproducing continuous data under control of the system control circuit 34. The system control circuit 34 may switch object from zones on the inner peripheral side to zones on the outer peripheral side on the basis of the address data ID detected by the address detecting circuit 37 (FIG. 6), and may successively record continuous data or reproduce continuous data.

When the access object is switched from a zone on the inner peripheral side to a zone Zm on the outer peripheral side by controlling the threading motor 36 (FIG. 6), the system control circuit 34 may control the overall operation such that after starting access from a groove on the innermost periphery as designated by notation G1, access is made to a track formed by grooves up to the outermost periphery of the zone Zm as designated by notation G2. Successively, the system control circuit 34 may provide a track jump instruction as designated by notation J, may switch the access object to a track formed by lands on the innermost periphery of the zone Zm and control the operation such that access is made from the track formed by lands on the innermost periphery to the track formed by lands on the outermost periphery of the zone Zm (notation L2).

Thereby, in driving the optical disk 12 by ZCLV in a range where the rotational speed is maintained constant, the system control circuit 34 may record the continuous user data DU with respect to the range and when recording is difficult in respect of the range, the system control circuit 34 may record the user data DU at succeeding regions on the outer peripheral side. Thus, in optical disk device 10, the frequency of switching the rotational speed of the optical disk 12 may be reduced as less as possible and access speed promoted by that amount. In this case, within the range where the rotational speed is maintained constant, the system control circuit 34 may initially record successively the user data DU to the track formed by grooves from the inner peripheral side to the outer peripheral side and, when the recording is finished, the system control circuit 34 may record successively the user data to the track formed by lands whereby the frequency of seeking of the optical head 11 may also be reduced and the access speed is improved thereby.

When the access is finished in respect of one zone as described above, the system control circuit 34 may switch access object to a succeeding zone on the outer peripheral side and start recording the succeeding user data DU from the track formed by grooves of the zone on the outer peripheral side. Thereby, the system control circuit 34 may control the total operation such that access is started from the track formed by grooves.

In the meantime, when access is made to an optical disk by an optical head having a relatively high numerical aperture such as that described in this embodiment, the recording and reproducing characteristic or performance may be deteriorated or adversely affected by dust or the like on the surface of the disk. According to a result of an experiment, as shown by FIG. 24, with a numerical aperture 0.8, a burst error may be caused even by dust having a small particle size (such as by dust of 100 ($\mu$m) or more). As a result, a bit error rate may increase even when small dust particles or the like adhere to the surface of the disk. Therefore, the optical disk 12 may be stored and held in a cartridge as hereinbelow described.

In recording data to an optical disk, data transmitting rates may vary within an optical disk device. For example, and with reference to FIG. 59, the rate at which data is transmitted into and/or from a buffer memory 992 may be less than the rate at which data is transmitted from a modulator 994 for supply to an optical head 996 so as to be recorded onto an optical disk 990. That is, the rate at which data is transmitted into and/or from the buffer memory 992 may be approximately 10 Mbps or 11.08 Mbps and the rate at which data is transmitted from the modulator 994 may be 15 Mbps. A similar arrangement may also apply during a reproduction operation.

FIG. 25 is a disassembled perspective view of a cartridge for storing the optical disk 12. According to this embodiment, the optical disk 12 is stored and held in a cartridge 60 such that the optical disk 12 is difficult to take out and the optical disk 12 is loaded to the optical disk device 10 in such state. Incidentally, in FIG. 25, a shutter has been removed.

As shown in FIG. 25, the optical disk 12 may be arranged with sheet members 61 and 62 on both faces thereof and stored between an upper case 63 and a lower case 64. The sheet members 61 and 62 may be formed by punching out unwoven cloth in a substantially circular disk shape and the unwoven cloth may be formed by fibre the surface of which is formed with very small irregularities. Thereby, when the optical disk 12 is rotated in the cartridge 60, dust or the like on the surface of the optical disk 12 may be adsorbed to or removed by the sheet members 61 and 62 such that both faces of the optical disk 12 may be cleaned by the sheet members 61 and 62.

Further, the sheet members 61 and 62 may be formed with a diameter larger than diameter of the optical disk 12 (designated by hatching in FIG. 25) and the surroundings thereof may be adhered to by an adhesive agent or the like to surround the optical disk 12. Thereby, the sheet members 61 and 62 may be formed in a bag-like shape for storing the optical disk 12 inside thereof so as to protect the optical disk 12 such that dust or the like which may invade the cartridge 60 does not adhere to the optical disk 12 easily. Further, the sheet members 61 and 62 may be formed with notches at the vicinity of the center of rotation of the optical disk 12 and extending therefrom to the outer peripheral side thereof. The optical disk device 10 can chuck the optical disk 12 by way of the notches 61A and 62A at the vicinity of the center of rotation and access can be made to the optical disk 12 by the notches 61B and 62B which extend from the center of rotation.

Figure 26:
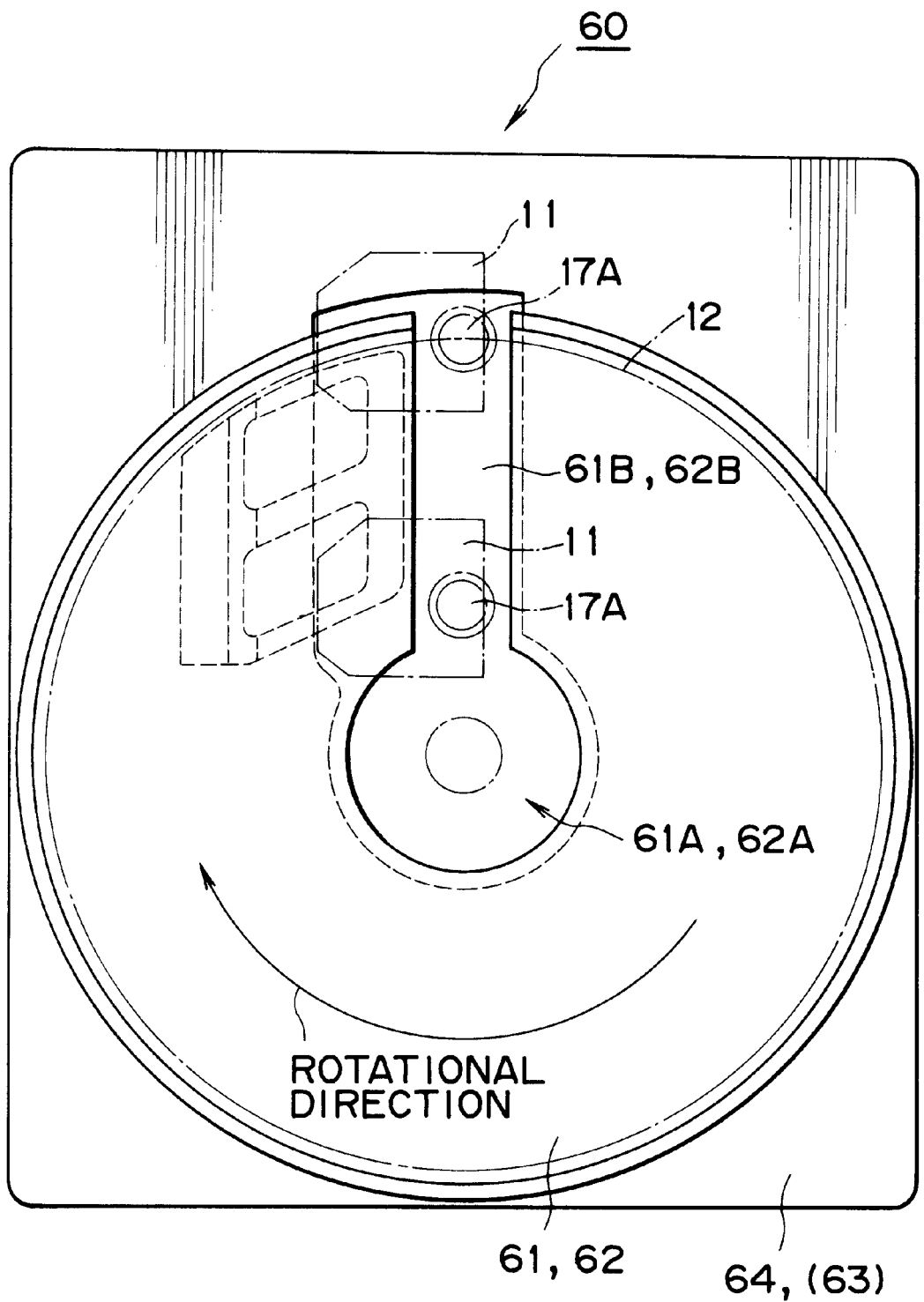
FIG. 26 is a plane view showing a relationship between an opening and a sheet-like member of the cartridge of FIG. 25.

In this case, as shown by FIG. 26, the notches 61A and 62A at the vicinity of the center of rotation may have a size necessary for chucking the optical disk 12. Further, the notches 61B and 62B extending from the vicinity of the center of rotation may have a size necessary for the optical head 11 to have access to the optical disk and the notches may be formed in shapes such that even when the optical head 11 seeks in the case where the optical disk device 10 makes access to the optical disk 12 by a small working distance, the first lens 17A of the optical head 11 and constituent parts of the modulation coil 18 and the like and the optical disk are not brought into contact with each other.

In this way, the sheet members 61 and 62 may cover the surface of the optical disk 12 except in the vicinity of the center of rotation of the optical disk 12 and a range where incidence of laser beam is not hampered whereby the optical disk 12 is prevented from being exposed as much as possible. Further, when the optical disk 12 has only one information recording face, the appropriate one of the sheet member 61 and 62 may be formed with only the notch at the vicinity of the center of rotation.

The upper case 63 and the lower case 64 may be formed by molding resin by injection-molding with openings 63A and 64A formed at the vicinity of the center of rotation of the optical disk 12 and extending from the vicinity of the center of rotation to the outer peripheral direction of the optical disk 12 in correspondence with the notches 61B or 62B of the sheet members 61 or 62. As such, an opening is formed to enable the optical disk 12 to be chucked or properly seated and to allow the optical head 11 to be arranged or to move from the vicinity of the center of rotation to the outer peripheral of the optical disk 12.

Therefore, the openings in the upper and lower cases from the center of rotation to the outer peripheral direction of the optical disk 12 may be formed with a width wider than those of the notches 61B and 62B of the sheet members 61 and 62. Further, when the optical disk 12 has only one information recording face, an opening may be formed only at the vicinity of the center of rotation of the appropriate one of the upper case 63 and the lower case 64.

Further, the upper case 63 and the lower case 64 are arranged with pressing members 65-1 and 65-2 at the vicinity of the openings 63A and 64A and on the sides of the information recording face(s) of the optical disk 12. The sheet members 61 and 62 may be pressed to the optical disk 12 by the pressing member 65-1 and the pressing member 65-2. The pressing members 65-1 and 65-2 may be formed by bending metal plates in a spring-like shape. As a result, the cleaning of the optical disk 12 by the sheet members 61 and 62 is enhanced.

Figure 27:
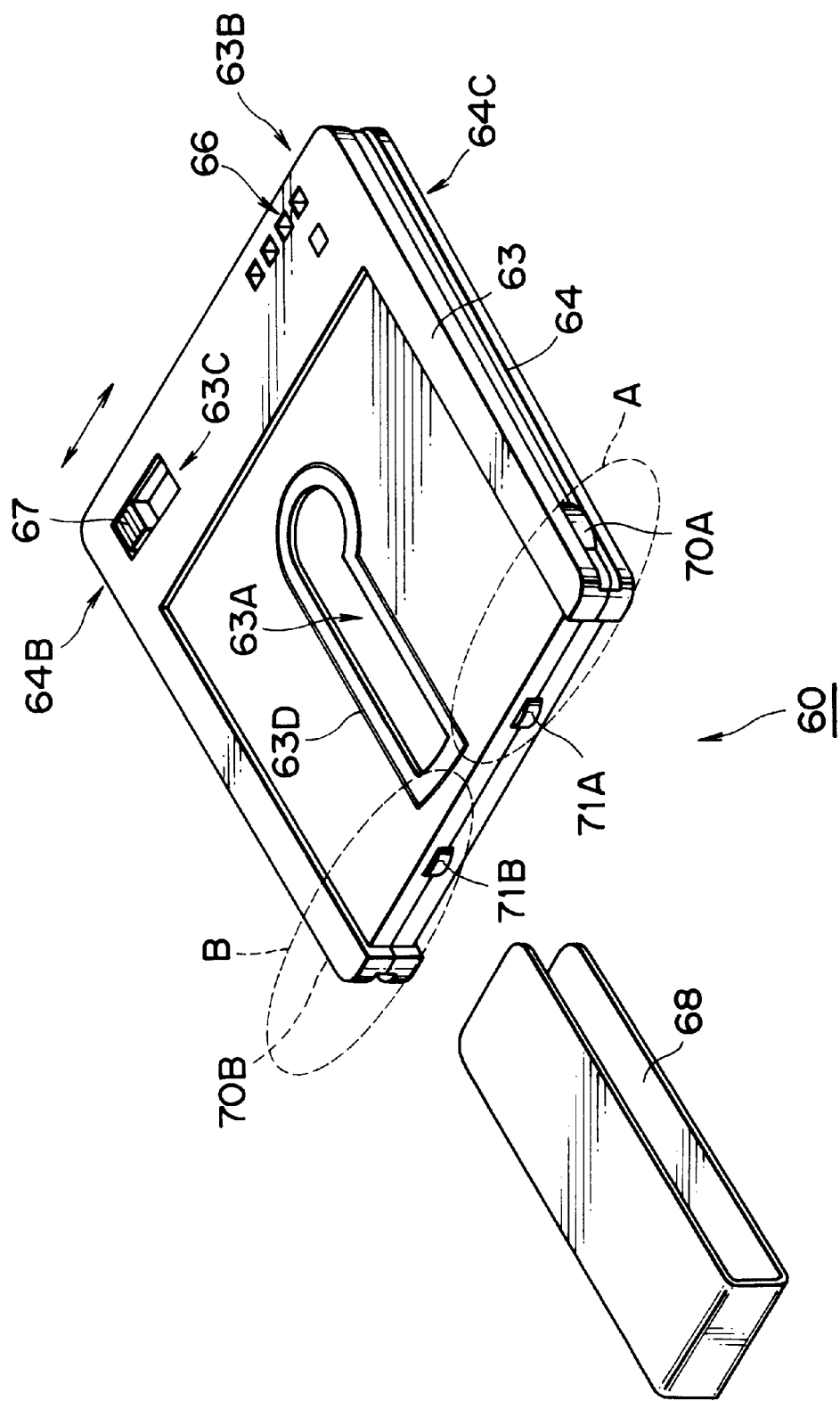
FIG. 27 is a perspective view showing a relationship of a shutter or the like of the cartridge of FIG. 25.

Further, as shown by FIG. 27, the upper case 63 and the lower case 64 may have identification regions 63B and 64B at corners thereof. A number of recess portions 66 each having a rectangular shape may be formed at the identification regions 63B and 64B in accordance with the type or kind of optical disk 12 held inside. Thereby, according to the cartridge 60, the kind of the optical disk 12 can be simply identified. Further, when the optical disk 12 stored inside has an information recording surface on both faces, the upper case 63 and the lower case 64 are respectively formed with identification regions 63B and 64B, whereas when the optical disk 12 has an information recording surface only on one face thereof, the identification region may be formed only in either of the upper case 63 and the lower case 64.

Further, the upper case 63 and the lower case 64 may have regions 63C and 64C with slide switches 67 at corners of the cases for restricting access. The slide switch(es) 67 may be slid in the direction of an arrow mark and may be arranged to enable a through hole to be formed at the setting regions 63C and 64C and to close the through hole. Thereby, according to the cartridge 60, a state in which a write operation is prohibited can be set with respect to each face of the optical disk 12 by operating the slide switch 67. Further, when an information recording surface is provided only on one face of the optical disk 12, the region for setting access restriction is formed only in either of the upper case 63 or the lower case 64.

The cartridge 60 may have a shutter 68 having a channel-like shape which may be formed by bending a metal plate or by molding resin by injection-molding. The shutter 68 may be slidably arranged to enclose the openings 63A and 64A of the upper case 63 and the lower case 64 and to expose the openings 63A and 64A by a loading mechanism of the optical disk device 10.

Figure 28:
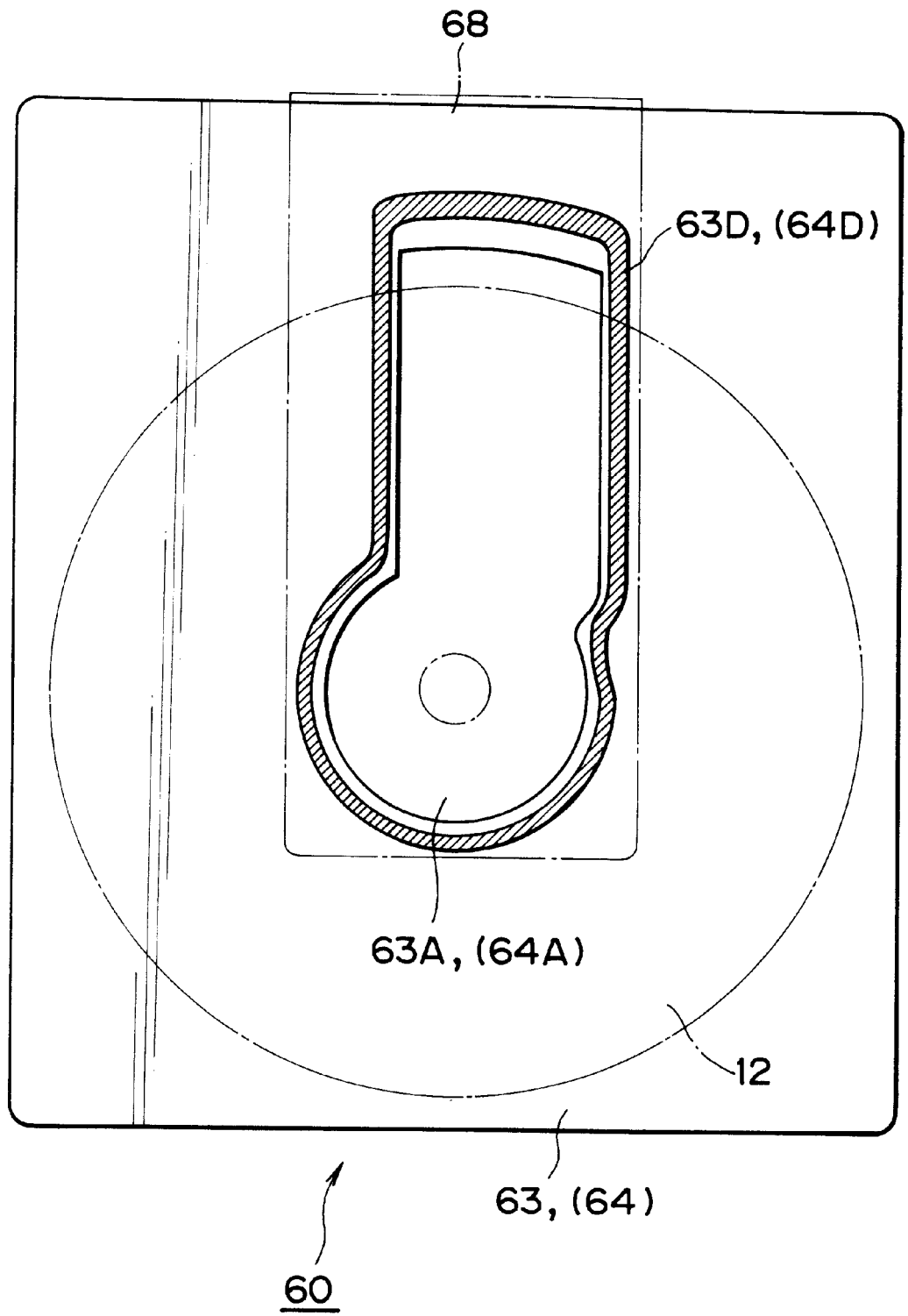
FIG. 28 is a plane view showing a relationship among the shutter, the opening and a damper member of the cartridge of FIG. 25.

The upper case 63 and the lower case 64 may have damping members 63D and 64D which surround the openings 63A and 64A in correspondence with the shutter 68. As shown by FIG. 28, in this case, the damper members 63D and 64D, which may be formed by punching out an elastic sheet material of for example felt in a shape which surrounds the openings 63A and 64A, may be arranged or pasted to the upper case 63 and the lower case 64. Thereby, according to the cartridge 60, when the openings 63A and 64A are enclosed by the shutter 68, clearances between the shutter 68 and the upper case 63 as well as the lower case 64 may be blocked by the damping members 63D and 64D such that dust or the like may not enter the clearances therebetween.

Further, the upper case 63 and the lower case 64 may have movability restricting mechanisms for restricting sliding of the shutter 68 at corners as shown in areas A and B (FIG. 27). According to the movability restricting mechanisms, buttons 70A and 70B may be arranged on side faces of the cartridge 60 such that the shutter does not jump out of grooves formed on the side faces. Further, according to the movability restricting mechanisms, in a state where the openings 63A and 64A are covered with the shutter 68, buttons 71A and 71B may be arranged on the sides of the shutter 68 and on a side face of the cartridge 60.

Figure 29:
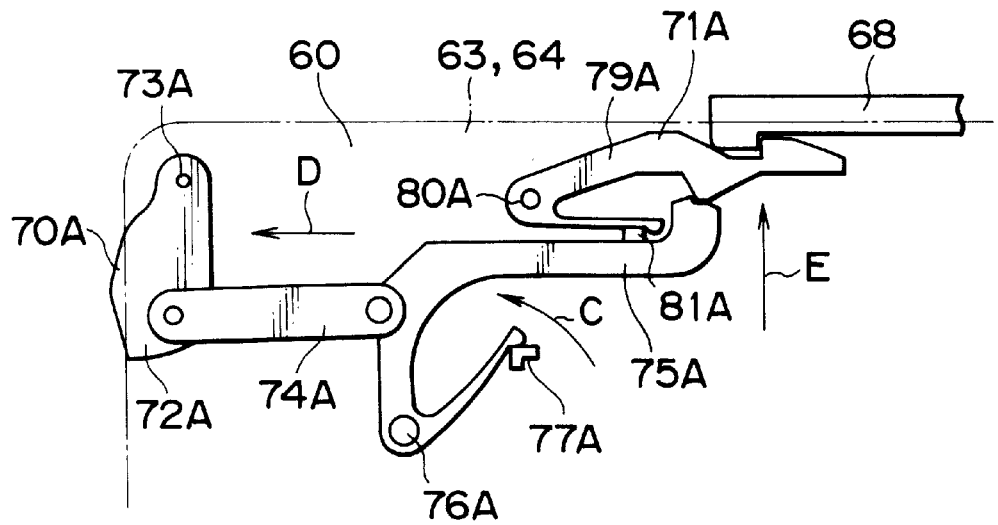
FIG. 29 is a plane view for explaining a movability restricting mechanism of the cartridge of FIG. 25.

FIG. 29 is a plane view of one of the movability restricting mechanisms designated by notation A in FIG. 27. In the movability restricting mechanism, the button 70A may be formed by projecting a portion of a pivoting member 72A from the side face. In this case, the pivoting member 72A may be formed by molding resin by injection-molding and pivotably held with a pivoting shaft 73A arranged at a corner portion of the cartridge 60 as a pivot center. Further, according to the pivoting member 72A, the root side of the button 70A may have a large shape such that only the button 70A is projected from a window formed on the side face of the cartridge 60 and the root side portion is connected to a first stopper 75A via a connecting member 74A.

The first stopper 75A may be formed by molding elastic resin by injection-molding and pivotably supported by a pivoting shaft 76A. The first stopper 75A may have two arms which extend from the vicinity of the pivoting shaft 76A in which one of the arms is caught by a projection 77A formed in the upper case 63 or the lower case 64 and in which the total is pressed in a direction of pivoting to the side of the button 70A as shown by an arrow mark C by the elastic force between the projection 77A and the arm caught by the projection 77A. Further, the remaining arm of the first stopper 75A is connected to the pivoting member 72A via the connecting member 74A. Thereby, as shown by an arrow mark D, the first stopper 75A may press the pivoting member 72A such that the button 70A is projected from the window of the cartridge 60 and the pivoting member 72A may restrict pivoting of the first stopper 75A by bringing the root side of the button 70A in contact with the window of the cartridge 60.

Further, one of the arms of the first stopper 75A may be bent substantially in a right angle from the connecting portion of the connecting member 74A and extended substantially parallel with the side face and the front end of the arm may be bent to the side face on the side of the shutter at the vicinity of an end portion of the shutter 68. The first stopper 75A may restrict the movement of a second stopper 79A by the front end of the arm bent to the side face on the side of the shutter. That is, the second stopper 79A may be formed by molding resin by injection-molding (similar to that of the first stopper 75A) and pivotably supported by a predetermined pivoting shaft 80A. The second stopper 79A may be formed such that two arms are extended from the vicinity of the pivoting shaft 80A and the button 71A is formed at one of the arms. The front end of other arm of the second stopper 79A may be caught by a projection 81A which may be formed on the rear side of the arm of the first stopper 75A to project from the case 63 or 64. Thereby, as shown by an arrow mark E, the second stopper 79A may press the total by being pivoted to the side of the button 71A by the elastic force of the arm caught by the projection 77A.

Further, the front end of the arm on the side of the button 71A may extend to the root portion of the shutter 68 so that the front end portion of the arm is in mesh or contact with the projection of the shutter 68. The second stopper 79A may be formed such that when the front end portion of the arm is in mesh with the projection of the shutter 68 the front end of the arm of the first stopper 75A is brought into contact with the rear portion of the arm.

Thereby, the movement of the stopper 79A may be restricted by the first stopper 75A such that the button 71A is not detached from a meshed state with the shutter 68 by being displaced toward the inner side of the cartridge 60.

Due to the movability restricting mechanism of the cartridge 60, the shutter 68 may be prevented from being slid to expose the openings by erroneous operation or the like of the user so as to effectively avoid dust or the like from entering.

Figure 30:
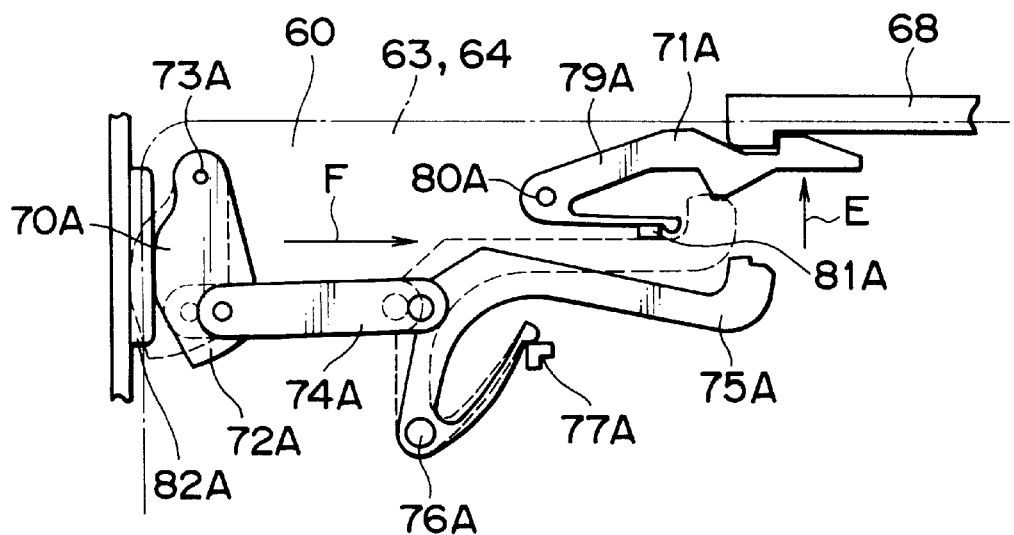
FIG. 30 is a plane view showing a state in which a button 70A is pressed in comparison with FIG. 29.

As shown by FIG. 30, according to the movability restricting mechanism, by pressing the button 70A projected from the side face of the cartridge 60 by a predetermined pressing member 82A, as shown by an arrow mark F, the first stopper 75A may be pivoted via the connection member 74A and the front end portion of the arm of the first stopper 75A made remote from the rear portion of the second stopper 79A whereupon the button 71A arranged at the second stopper 79A is held in a displaceable state.

Figure 31:
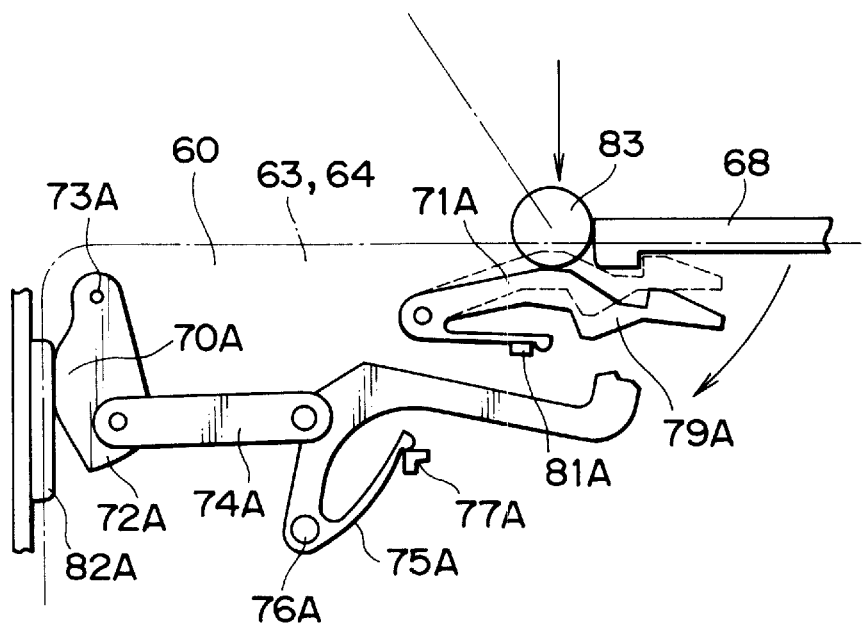
FIG. 31 is a plane view showing a state in which a button 71A is pressed in comparison with FIG. 30.
Figure 32:
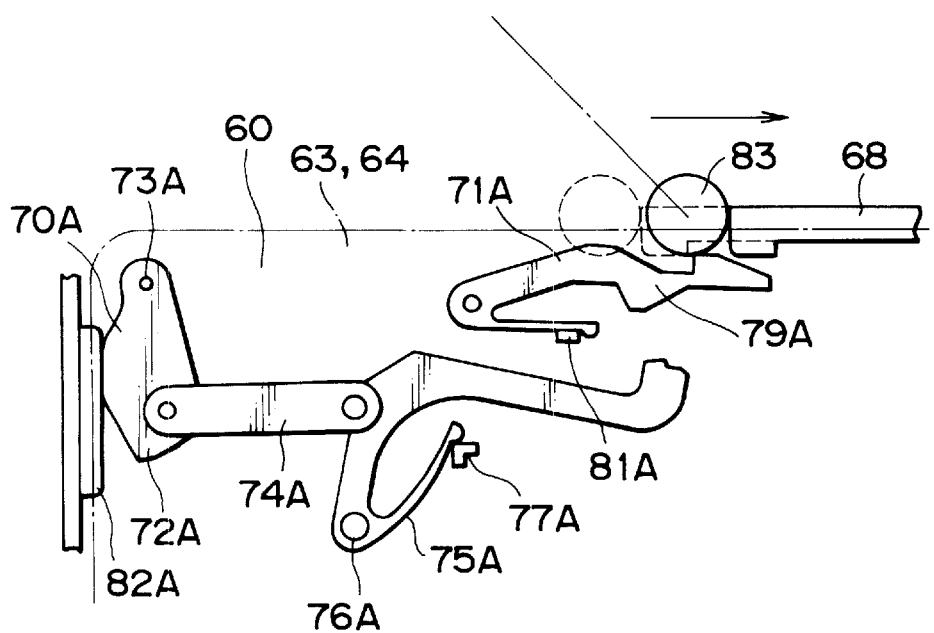
FIG. 32 is a plane view showing a state in which the shutter is made movable in comparison with FIG. 31.

Further, as shown by FIG. 31, by pressing the button 71A arranged at the second stopper 79A, the meshed state between the shutter 68 and the second stopper 79A may be disengaged. Thereafter, as shown by FIG. 32, the shutter 68 may be made movable on the premise that the movability is not restricted by any other movability restricting mechanism. Thereby, with regard to the movability restricting mechanism(s) of the cartridge 60, by successively pressing the buttons 70A and 71B, the shutter 68 can be slid. As is to be appreciated, with such arrangement the openings are prevented from being exposed due to a simple erroneous operation of the user.

Figure 33:
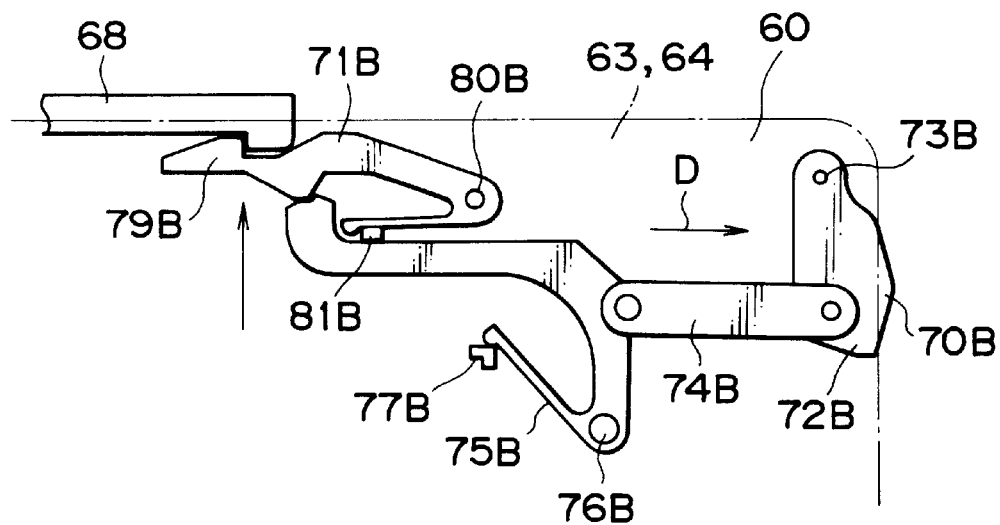
FIG. 33 is a plane view for explaining a movability restricting mechanism of the cartridge of FIG. 25.
Figure 34:
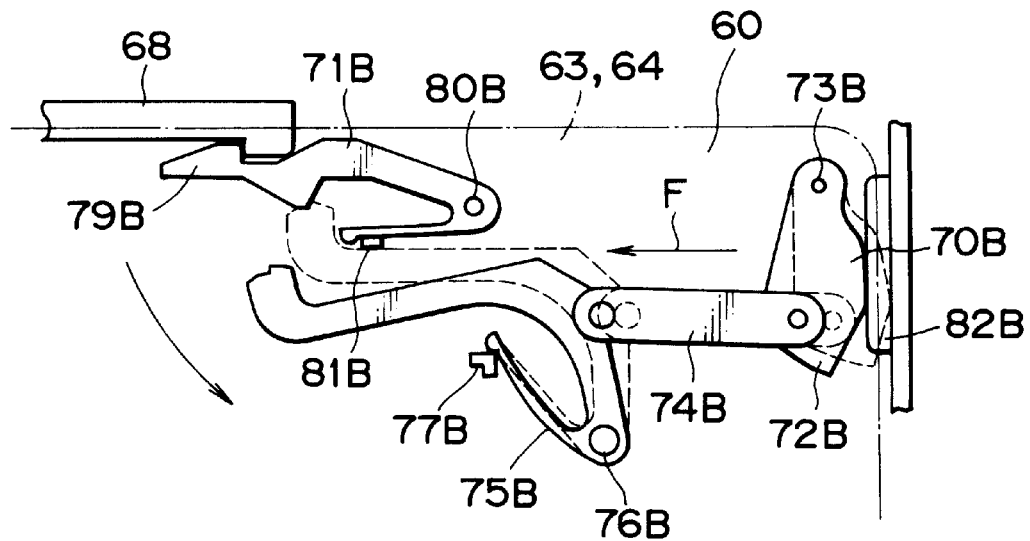
FIG. 34 is a plane view showing a state in which a button 70B is pressed in comparison with FIG. 33.

FIGS. 33 through 35 are plane views of other movability restricting mechanisms. Another movability restricting mechanism may be formed symmetrically with the one movability restricting mechanism explained in reference to FIGS. 29 through 32 as shown by substituting suffixes of corresponding notations. Thereby, when a disk having two recording/reproducing surfaces is stored, the cartridge 60 may be reversed and loaded in the optical disk device 10. Such loading can be carried out simply and similar to that of an optical disk having only of one recording/reproducing surface. Further, either the one or two recording/reproducing surface disk can be loaded by a common loading mechanism into the optical disk device 10. Further, the operation of such movability restricting mechanism may be similar to that of the previously described movability restricting mechanism until restriction on pivoting the second stopper 79B is released. In such situation, as shown by FIG. 35, the button 71B may be pressed by the shutter 68 and the shutter slid or moved.

Thereby, with the cartridge 60, invasion of dust or the like caused by erroneous operation of the shutter 68 can effectively be avoided by the triple safety mechanism.

Figure 36:
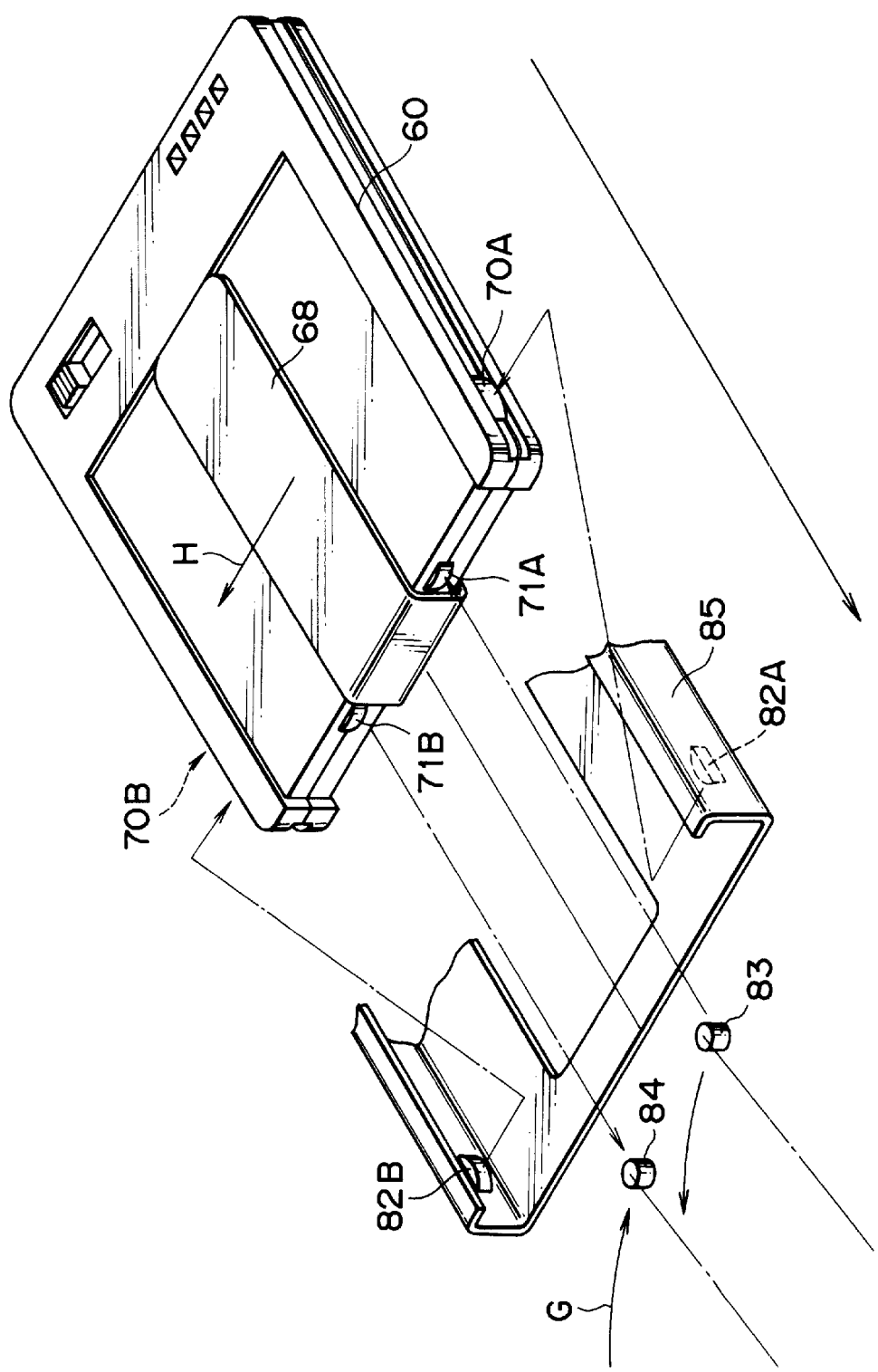
FIG. 36 is a perspective view showing a loading mechanism of an optical disk apparatus.

FIG. 36 is a perspective view showing a relationship between the movability restricting mechanism and the loading mechanism of the optical disk device 10. In the optical disk device 10, the optical disk 12 may be loaded by drawing the cartridge 60 onto a predetermined tray 85. Projections or pressing members 82A and 82B may be arranged on the inner side faces of the tray 85 such that when the cartridge 60 is slid to a predetermined position on the tray 85, the buttons 70A and 70B are pressed by the projections 82A and 82B.

Further, in the optical disk device 10, two rollers 83 and 84 may be arranged at inner portions of the tray 85 and attached to front ends of arms supported by predetermined pivoting shafts and, as shown by an arrow mark G, urged to the side of the tray 85. When the cartridge 60 is slid to a predetermined position, in a state where the buttons 70A and 70B are pressed, the roller 83 is brought into contact with the button 71A and an end portion of the shutter 68 and the roller 84 is brought into contact with the button 71B and the shutter 68. When the cartridge 60 is slid further, the roller 83 presses the button 71A and slides the shutter 68 and the roller 84 is pressed to rotate by the button 71B and the shutter 68 by which, as shown by an arrow mark H, the shutter 68 may be moved such that the openings are exposed. When the shutter 68 is completely opened in this way, the optical head 11 may approach the optical disk 12 from the lower side of the cartridge 60 (as viewed in the drawing) and, thereafter, focus searching and other processing may be carried out.

In contrast thereto, when the cartridge 60 is discharged, the shutter 68 is pressed by the roller 84 which has been pivoted by being pressed by the button 71B and the shutter 68 in a loading operation, by which the shutter 68 returns to the original state. Alternatively, the shutter 68 can be returned to the original state by a spring installed at the inside of the cartridge even with only the roller 83.

Further, when a disk having only a single recording/reproducing surface is arranged in the cartridge 60, the cartridge including the upper case 63 and the lower case 64 may be formed such that sliding of the shutter 68 in one direction is restricted so that erroneous charging can effectively be avoided.

Figure 37:
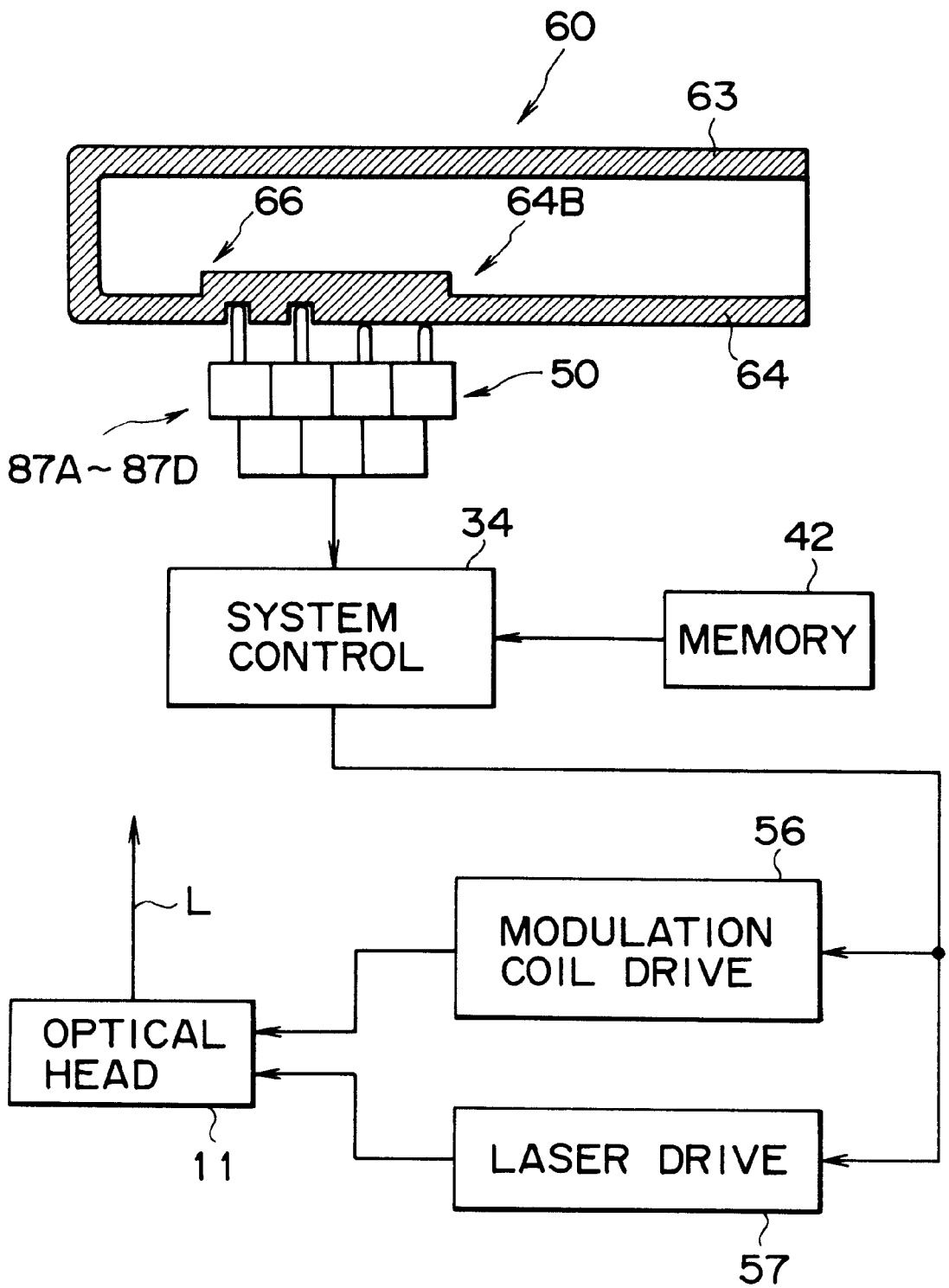
FIG. 37 is a diagram for explaining identification of an optical disk in an optical disk apparatus.

FIG. 37 shows a relationship between the identification region 63B or 64B and the optical disk device 10. The optical disk device 10 may have a disk discriminator 50 formed by a plurality of switches 87A through 87D and arranged in correspondence with the recess portions 66 of the identification region 64B. The switches 87A through 87D may perform ON/OFF operation(s) respectively in accordance with the presence or absence of the recess portions 66 in the identification region 64B and may output 4 values of discrimination signals obtained by the ON/OFF operation(s) to the system control circuit 34.

When the cartridge 60 is inserted into the above-described tray 85, the system control circuit 34 loads the cartridge 60 by driving a predetermined drive mechanism and determines the kind or type of optical disk stored in the cartridge 60 with the discrimination signal of the disk discriminator 50 as a reference. Further, the system control circuit 34 may load a corresponding reference laser beam amount held in the memory 42 based on the discrimination result and set the drive condition of the laser drive circuit 57 in accordance with the reference laser beam amount. Here, the memory 42 may hold reference laser beam amounts for various kinds of the optical disks in addition to the above-described dividing ratio of the divider 35B.

Accordingly, in a writing operation, the system control circuit 34 may irradiate the laser beam L to the optical disk 12 by the reference beam amount in correspondence with the kind of optical disk, set the final laser beam amount for writing from a result of irradiating the laser beam L and apply a modulation magnetic field at the position of irradiating the laser beam by driving the modulation coil drive circuit 56 when the optical disk 12 is a magneto-optical type disk.

In the mastering device 1 (FIG. 2), by irradiating the laser beam L in a spiral shape from the inner peripheral side toward the outer peripheral side by driving the original disk 2 to rotate, the groove may be formed with intervals of about 1.0 ($\mu$m) and its shape may meander in accordance with the wobble signal WB. Further, the spot shape and the light amount of the laser beam L may be set such that intervals between grooves formed by exposure of the laser beam L and contiguous grooves are substantially equal on the optical disk so that lands and grooves can be recorded with grooves as references. A data capacity of 8 (GB) or more can be obtained by recording on lands and grooves with a line record density of about 0.21 ($\mu$m/bit) using the grooves as references. Thereby, the mastering device 1 can record 8 (GB) or more of data to an optical disk fabricated by the original disk 2 by effectively utilizing the information recording face.

In the mastering device 1, the value of the address data ID (FIG. 4A) may be successively varied in accordance with the rotation of the original disk 2 by the address signal forming circuit 6 and data allocated to the address area AR2 may be formed by adding synchronization data or the like to the address data ID. After modulating and synthesizing the data with the wobble signal WB at the synthesizing circuit 8, the data may be supplied to the drive circuit 5. As a result, in the mastering device 1, meandering of the groove may be interrupted at predetermined angular intervals, address data by pit row may be recorded onto the original disk 2 and the sector structure may be arranged by radially dividing the original disk 2 at predetermined angular intervals with the address data at the front.

In this way, in the optical disk formed by the original disk 2, the sector structure may be formed and access can be provided with the address data as a reference and with each sector as a unit and the access speed may be promoted accordingly. Further, even when the address data cannot be reproduced correctly due to dust or the like, access may be correctly provided to each sector by interpolation with the meandering of groove as a reference. Accordingly, even when information is recorded with high density, the redundancy can be set low and the address recorded on the optical disk can be detected by effectively utilizing the information recording face.

When the sector structure is formed in this way, according to the mastering device 1, by switching the frequency of the wobble signal WB, the original disk 2 may have zones in shapes of concentric circles and pit rows may be formed such that the number of sectors is successively increased from zones on the inner peripheral side to zones on the outer peripheral side. As a result, access may be provided to the optical disk by applying the zone CLV method in correspondence with the zoning, the information recording face can be utilized efficiently and the access speed can be promoted.

Further, in this case, the land area AR2 may be divided into front and rear regions and address data of a sector formed by succeeding grooves and a sector formed by succeeding lands may be respectively allocated thereto whereby even when data is recorded with high density by land and groove recording, address data can be reproduced so as to effectively avoid cross talk from a contiguous track.

In this way, an optical disk may be fabricated by the sector structure from the original disk 2 fabricated by the mastering device 1.

In the optical disk (FIG. 5), the light transmitting layer for transmitting a laser beam and leading the laser beam to the information recording face may be formed on the information recording face with a thickness of about 0.1 (mm). As such, even when the laser beam is irradiated from an optical system having a relatively high numerical aperture via the light transmitting layer, the relationships of Equation (2) and Equation (3) may be satisfied and desired data may be recorded and reproduced to and from the information recording face so as to effectively avoid an influence due to skew.

With regard to the optical disk 12, processing of spindle control or the like may be executed with meandering of a groove formed as previously described as a reference in the optical disk device. In the PLL circuit 35, the clock CK with high accuracy with the meandering of a groove as a reference may be formed and the timing of a sector(s) may be detected by the cluster counter 38 (FIG. 6). In the optical disk device 10 (see also FIGS. 7 and 8), a laser beam may be irradiated from the optical head 11, return light may be received by the optical head 11 and the reproducing signal RF in which the signal level thereof may be changed in accordance with the amount of return light, the reproducing signal MO in which the signal level thereof may be changed in accordance with the plane of polarization of return light, the push pull signal PP in which the signal level thereof may be changed in accordance with the displacement of the laser beam irradiating position in respect of a groove or pit row and the focus error signal FE in which the signal level thereof may be changed in accordance with a defocus amount may be detected.

In this case, by irradiating a laser beam having a wave length of 650 (nm) or less via the object lens 17 having a numerical aperture of 0.70 or more in which the working distance DW is set to 560 ($\mu$m) or less, relatively high density recording can be carried out with a spot size approximately half that of a DVD. In this way, a record capacity of about 8 (GB) or more may be obtained with efficient PRML channel coding and wherein the redundancy may be decreased by use of an efficient premastered address.

Further, in this case by setting the working distance to 560 ($\mu$m) or less, the radius of curvature of lens, the allowance of eccentricity between the lens faces and the allowance of the face angle may be set to practical ranges or values by which an optical system can be formed with a lens having a small aperture and a laser beam can be made incident on the object lens with a beam diameter of approximately 4.5 (mm) or less. Thereby,the head 11 can be fabricated with sufficient accuracy so as to avoid a collision involving the object lens 17 or the like.

The wobble signal WB may be sampled from the push pull signal PP detected as described above in the wobble signal detecting circuit 39 and the edge information may be sampled by binarizing the wobble signal WB. Further, in the PLL circuit 35, the binarized signal S1 having the edge information may be synchronized with the output signal CK of the divider 35B with regard to the phase by which the reading/writing clock R/W CK is formed.

In this case, by forming the wobble signal WB by a carrier signal having a single frequency according to the edge information provided by binarization, each edge information may be provided with correct phase information. Thereby, the reading/writing clock R/W CK having high accuracy may be formed by synchronizing with the edge information with regard to phase.

Further, the reading/writing clock R/W CK may be counted by the cluster counter 38 with the frame synchronization timing detected from the address area AR2 by the address detecting circuit 37 as a reference by which the timing of writing or reading in the recording and reproducing circuit 53 may be set. In this case, by setting the timing with the clock R/W CK having high accuracy as a reference, the timing of writing or the like can be set in the optical disk device 10 by determining the position of irradiating laser beam with high accuracy. Accordingly, user data can be recorded to the optical disk 12 with high density by utilizing the information recording face of the optical disk 12.

In this case, even when correct timing of frame synchronization is difficult to detect by the address detecting circuit 37 due to the influence of dust or the like, by counting the clock R/W CK outputted from the PLL circuit 35 by the cluster counter 38, correct timing can be detected so that desired data may be recorded or reproduced with high density by an optical system having a relatively high numerical aperture.

In processing the wobble signal WB, in the PLL circuit 35, the dividing ratio of the divider 35B may be switched in accordance with the position of the irradiating laser beam whereby the optical disk 12 is driven to rotate by ZCLV.

The period of meandering groove may be constant in each region in conversion to the rotational angle and the synchronization of the PLL circuit 35 may be swiftly formed in each zone and the access speed can be promoted. Further, by forming the meandering of a groove at a constant period in conversion to the rotational speed of the optical disk 12, influence from a contiguous track can effectively be avoided.

In this way, the optical disk device 10 (FIG. 1) may control the timing of recording or reproducing such that in a recording operation video and audio signals may be converted into the user data DU by being subjected to data compression by a format prescribed in MPEG at the encoder 51 and the user data DU may be modulated with the predetermined unit or ECC block.

Further, when the laser disk 12 is a magneto-optical disk and when the amount of laser beam is intermittently increased by timing in synchronism with the reading/writing clock R/W CK by the optical head 11, a modulation magnetic field may be applied at the position of the irradiating laser beam by the modulation coil drive circuit 56 in accordance with modulated data of ECC block whereby the user data DU may be recorded with a line record density of 0.21 ($\mu$m/bit) by successively forming marks having a maximum run length of 8T and a minimum run length of 2T by the shortest record mark 4/3 bit by use of a thermomagnetic recording method such that approximately 3 hours of video and audio signals may be continuously recorded.

Additionally, the video and audio signals may be recorded efficiently with a redundancy of 23 (%) or less.

Further, by successively recording video and audio signals to the optical disk with a unit of ECC data block of 32 (KB), an interval between codes in error correction processing can sufficiently be secured and the bit error rate may be improved. Further, by recording and reproducing with the unit of ECC data block, data processing may be simplified in a special reproduction mode as in alternately exchanging recording and reproducing processings and in the case where data is recorded discretely by interposing seeking operation.

In these cases, when the optical disk 12 is of a phase change type or a write once type, the amount of laser beam may be switched intermittently by the laser drive circuit 57 at the timing in synchronism with the reading/writing clock R/W CK and in accordance with ECC block data modulated by (1, 7) RLL modulation whereby similar pit row is formed and the user data DU is recorded with line record density of 0.21 ($\mu$m/bit) or with the shortest mark length or the shortest pit length 0.3 ($\mu$m) or less and video and audio signals are recorded continuously for 3 hours. Thereby, the optical disk device 10 may provide a recording time period similar to that of a video tape recorder.

Further, data may be recorded to the optical disk by land and groove recording by which video and audio signals can efficiently be recorded by effectively utilizing the information recording face. Such recording may be carried out with a track pitch of approximately 0.5 ($\mu$m). Video and audio signals of 3 hours may be recorded on one side of the optical disk 12.

In the optical disk device 10, the user data DU of 1 ECC block may be successively allocated and recorded to 4 sectors and the record start timing can be accurately detected by the clock having high accuracy and correct timing can be detected by interpolation even with the presence of dust or the like so that high density recording may be performed even by an optical system having a high numerical aperture.

In contrast thereto, in a reproducing operation, the optical disk device 10 may detect a corresponding sector as in a recording operation. After binarizing the reproducing signal RF or MO obtained from the optical head 11, the reproduction clock may be formed, the reproducing data may be obtained with the reproduction clock as a reference and the reproducing data may be decoded and outputted. The reproducing signal MO obtained from the magneto-optical disk 12 may have a signal-to-noise (S/N) ratio smaller than that of the reproducing signal RF obtained from pit row. Meanwhile, the address area AR2 by pit row may be formed radially in each zone and, accordingly, cross talk from pit row to the reproducing signal MO can effectively be avoided.

When access is made to the optical disk 12 by use of the optical disk device 10, the user data may be inputted and outputted to and from the encoder 51 and the decoder 52 via the memory 54 having a relatively large capacity and the user data may be intermittently recorded to the optical disk 12 at a data transmitting speed of 11.08 (Mbps) which is faster than the data transmitting speed in the encoder 51 and the decoder 52. Thereby, the user data may be discretely recorded in a cluster unit(s), sufficient seek time period can be secured, and further, even when detracking may be caused by vibration or the like, continuous video and audio signals can be recorded and reproduced with no interruption.

Further, when follow-up reproduction, multichannel mode and postrecording mode are selected in which 2 channels of video and audio signals are simultaneously processed by the user, the rotational speed of the optical disk 12 may be switched to a rotational speed twice the normal rotational speed. Thereby, in recording and reproducing continuous video and audio signals intermittently to and from the optical disk 12 via the memory 54 by use of the optical disk device 10, sufficient idle time can be secured between accesses to the optical disk device 10. In the optical disk device 10, the idle time may be allocated to recording and reproduction of another channel or a seeking operation involving the optical head 11 whereby 2 channels of video signals and audio signals are simultaneously processed.

In follow-up reproduction, 1 channel of video and audio signals may be intermittently recorded to the optical disk 12 and, during this period, another channel of video and audio signals may be intermittently reproduced from the optical disk 12. Further, the 2 channels of video signals and audio signals to be recorded or reproduced may be continuously inputted and outputted to and from an external device via the memory 54.

In multichannel mode, and in particular in a recording operation thereof, 2 channels of video signals and audio signals may be continuously inputted from external devices via the memory 54, and the 2 channels of video signals and audio signals may be recorded to the optical disk 12 alternately and intermittently. On the other hand, in a reproducing operation thereof, the 2 channels of video signals and audio signals may be reproduced from the optical disk 12 alternately and intermittently and may be outputted continuously to external devices via the memory 54.

In postrecording, 1 channel of video and audio signals may be intermittently reproduced from the optical disk 12 and outputted continuously to an external device via the memory 54. Further, video and audio signals which have been processed by the external device may be continuously inputted to the memory 54 and the video and audio signals may be intermittently recorded to original recording positions.

Thereby, the optical disk device 10 may be as easy to use as a videotape recorder and may have superior performance compared to a tape recorder such as by use of a random access function particular to an optical disk. In providing such access to the optical disk 12, there is a concern that since the thickness of the light transmitting layer is set to 0.1 (mm) by an optical system having a high numerical aperture, the signal levels of the reproducing signals RF and MO may be changed due to small dust or the like piled up on the surface of the optical disk 12 whereby the error rate is adversely affected. As a result, the optical disk 12 (FIG. 25) may be stored in the cartridge 60 such that the optical disk 12 is difficult to take out and is loaded to the optical disk device 10 in the cartridge 60 so as to avoid the adhesion of dust or the like to a surface of the optical disk. Further, in the cartridge 60, the optical disk 12 is stored within sheet members 61 and 62 formed in a bag-like shape in which the sheet members 61 and 62 are pressed by the pressing members 65-1 and 65-2 and wherein, clearances between the shutter 68 and the uppercase 63 and the lower case 64 are blocked by the damping members 63D and 64D whereby adhesion of dust or the like is effectively avoided. Further, the cartridge 60 (as illustrated in FIGS. 29–33) may be constituted such that the shutter 68 is not slid unless after releasing restriction of movement of the second stoppers 79A and 79B by the first stoppers 75A and 75B by pressing the buttons 70A and 70B arranged at side faces, theme shed state between the second stopper 79A or 79B and the shutter 68 is released by pressing the button 71A or 71B whereby the openings 63A and 64A are prevented from being exposed by erroneous operation of the user and invasion of dust or the like dust by such an erroneous operation can effectively be avoided.

As illustrated in FIG. 36, when the optical disk 12 in the cartridge 60 is arranged on the tray 85, the optical disk 12 may be slid on the tray 85 by driving a drive mechanism by the system control circuit 34 and the buttons 70A and 70B of the cartridge 60 may be pressed by the projections 82A and 82B formed at the tray 85. Thereafter, in respect of the cartridge 60, the button 71A may be pressed by the roller 83 and the shutter 68 may be pressed such that the shutter 68 is slid and the openings 63A and 64A are exposed, and the optical head 11 may be advanced to the openings 63A and 64A whereby loading of the optical disk 12 is completed.

In the above state, the optical disk device 10 may detect the presence or absence of the recess portions 66 by the disk discriminator 50 (FIG. 37) in the identification region 63B or 64B formed in the cartridge 60 which may correspond to the information recording face of the optical disk 12 so as to determine the kind of the information recording face. Further, the setting of the switch 67 of the cartridge 60 may provide an indication as to whether a write prohibition or inhibit has been set regarding the information recording face.

Thereby, in the optical disk device 10, when the optical disk 12 is a magneto-optical disk, the operation of the modulation coil drive circuit 56 and the laser drive circuit 57 may be started and the user data DU is thermomagnetically recorded to the optical disk 12. Further, when the optical disk 12 is a phase change type or a write once type, the operation of the laser drive circuit 57 may be started and the user data DU recorded by mark row or pit row.

In the optical disk device 10, the laser beam L may be irradiated to the optical disk 12 by an amount of reference laser beam in accordance with the kind of each optical disk held in the memory 42 and an optimal beam amount may be set on the basis of the result of irradiating the laser beam L. Thereby, in the optical disk device 10, desired data can be recorded to various kinds of the optical disks.

Further, in the optical head 11 (FIG. 8), when access is made to the optical disk 12 by an optical system having a high numerical aperture while applying a modulation magnetic field to the optical disk where the thickness of the light transmitting layer is set to 0.1 (mm) by the modulation coil 18 arranged on the side of the object lens 17, various data can be recorded not only to an optical disk of a phase change type or an optical disk of a write once type but a magneto-optical disk whereby the range of application of the optical disk device 10 is significantly expanded.

Further, when 2 channels of signals are processed with the optical disk device 10, in respect of a channel on the recording side, the rotational speed of the optical disk 12 may be controlled by ZCLV such that the rotational speed is twice the rotational speed in a normal mode, whereas in respect of another channel on the reproducing side, user data may be reproduced at the rotational speed of a channel on the recording side immediately there before. Thereby, in the optical disk device 10, when access is made to the optical disk 12 alternately in respect of a plurality of channels, the frequency of switching the rotational speed of the optical disk 12 may be reduced and the access speed promoted by that amount.

Therefore, according to the above-described device, by recording user data (such as video and audio signals) by irradiating a laser beam having a wavelength of 650 (nm) or less via the object lens 17 having a numerical opening or aperture of 0.70 or more in which the working distance is set to 560 ($\mu$m) or less, 8 (GB) of data can be recorded with selected data processing. Moreover, such device may be relatively easy to use and may provide functions unavailable with a tape recorder/player. Further, the optical head 11 can be fabricated with sufficient accuracy to effectively avoid a collision with the optical disk or the like. Further, user data may be recorded with a line record density of 0.21 ($\mu$m/bit) and at the shortest record mark length or the shortest pit length of 0.3 ($\mu$m) or less and the user data may be recorded by land and groove recording with a track pitch of 0.5 ($\mu$m) whereby 8 (GB) of data can be recorded.

Further, the transmitting speed of the user data between an optical disk and a buffer memory may be set to 11.08 (Mbps) and, as such, may be made faster than the transmitting speed of the user data between the decoder or the encoder and the buffer memory by which a continuous video signal can be recorded and reproduced while securing a time period sufficient for a seeking operation or the like.

Further, user data can efficiently be recorded with a redundancy lower than 23 (%) or that of a DVD system.

Further, by satisfying the relationship $\Delta t \leq \pm 5.26 \times (\lambda/NA^4)$ ($\mu$m) involving the dispersion $\Delta t$ of the thickness of the light transmitting layer, the numerical aperture NA and the wavelength $\lambda$, the video signal and audio signal can be recorded with high density and can be properly recorded and reproduced.

Further, the optical disk 12 may be stored into the cartridge 60 so that the influence of dust can be reduced whereby deterioration in the recording and reproducing characteristic caused by dust or the like can effectively be avoided.

Further, the rotational speed of the optical disk may be switched successively in steps and access provided to the optical disk by ZCLV. Furthermore, a plurality of sectors may be arranged in one turn of a track and address information may be recorded to the front of each sector in which a video signal is recorded by efficiently using the information recording face of the optical disk and deterioration in the access speed can effectively be avoided.

Further, the information recording face of the optical disk may be efficiently used by use of land and groove recording by which the record density can be promoted.

Further, by making the transmitting speed of the user data between the optical disk and the buffer memory twice the transmitting speed of the user data between the decoder or the encoder and the buffer memory, access may be made to the optical disk intermittently and spare idle time may be effectively utilized such that concurrent processing of a plurality of channels or the like can be executed and the easiness of use of the optical disk device can be accordingly promoted.

Further, user data may be recorded and reproduced in a unit or units of ECC data block(s) and the ECC data block may have 32 KB or more in which a sufficient interval between codes can be secured in error correction processing and a sufficient error correction function can be provided. By recording and reproducing the user data to and from the optical disk in a unit(s) of ECC data block(s), concurrent processing of 2 channels or the like can be executed in a simplified manner.

Another embodiment of the present invention will now be described.

Figure 38:
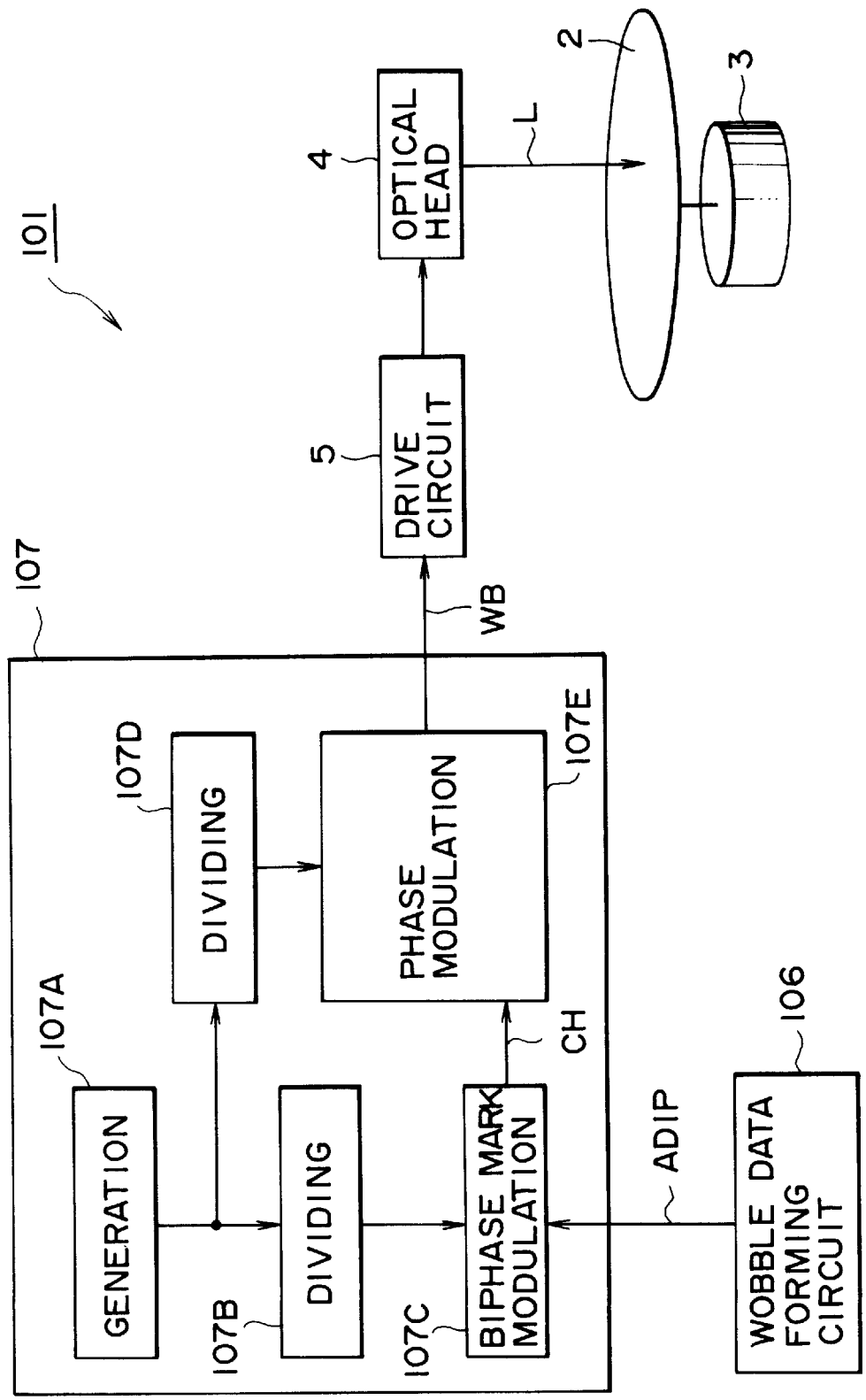
FIG. 38 is a diagram of a mastering device according to another embodiment of the present invention.

FIG. 38 is a diagram of a mastering device 101 according to another embodiment of the present invention. In fabricating an optical disk, an original disk 2 may be exposed by the mastering device 101 and an optical disk fabricated from the original disk 2. Incidentally, this embodiment may utilize a number of elements which may be similar to those used in the previous embodiment. Such similar elements have the same notation and a duplicated explanation thereof will be omitted.

A track constituted by a groove in a spiral shape having a track pitch of 1.0 ($\mu$m) may be formed by the mastering device 101. Further, when an optical disk is fabricated from the original disk 2, the laser beam L may be irradiated such that widths of a groove and a land are substantially equal. Furthermore, the groove may meander due to wobble data ADIP formed by a wobble data forming circuit 106.

Thereby, in this embodiment, in place of pit row, address information may be preformatted by a meandering groove. Further, positional information with high accuracy can be obtained even when the address is preformatted by meandering groove so that a record capacity similar to that of the previous embodiment may be obtained.

According to the wobble data forming circuit 106, a timing signal (which may be a frequency generated FG signal or the like) in synchronism with the rotation of original disk 2 may be received by a spindle motor 3 or the like and the timing signal counted by a predetermined counter by which a frame number sync no the value of which may be varied successively circulatingly at a period of, for example, $\frac{1}{16}$ rotation of the original disk 2, and a track number (track no) the value of which may be varied every time the position of irradiating the laser beam L is displaced by 1 track in correspondence with the change in the frame number sync no may be formed. Thereby, the wobble data forming circuit 106 may form address data constituted by the frame number sync no and the track number (track no) which respectively have 4 bits and 20 bits.

Figure 39:
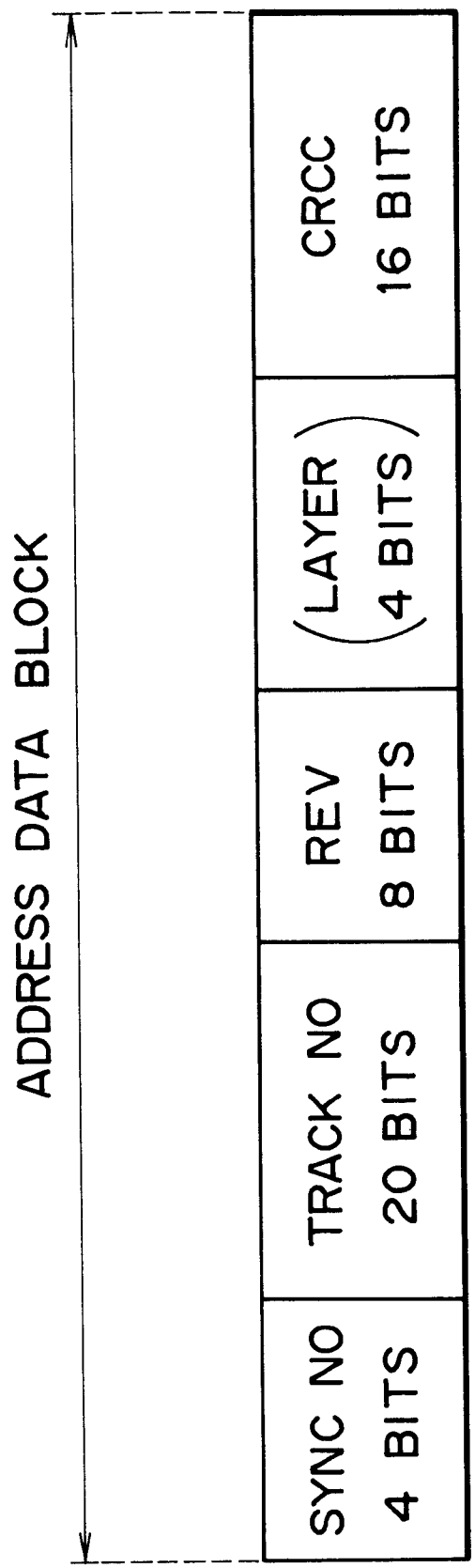
FIG. 39 illustrates a format of wobble data.

Further, the wobble data forming circuit 106 may add up to 8 bits or more of reserve (rev) to the frame number sync no and the track number (track no), execute a predetermined calculation processing by using information word M(x) constituted by the frame number sync no, the track number (track no) and the reserve (rev) and form error detection code CRCC (Cyclic Redundancy Check Code). Thereby, the wobble data forming circuit 106 may successively form an address block having a format shown in FIG. 39. Further, such address data block may have 48 or more bits.

In this case, the wobble data forming circuit 106 may form wobble data ADIP such that bit reversion occurs always once in one address data block by setting a logical level of the error detection code CRCC by reverting it or by operating the reserve (rev) bit(s). Further, 4 bits may be allocated to data of a recording layer (Layer) as necessary. An optical disk fabricated by the original disk 2 may be provided with a plurality of information recording layers which may be specified by the recording layer (Layer) data. Further, when the recording layer (layer) data is set, such data may be used for calculating the error detection code CRCC as the information word M(x).

Therefore, the wobble data forming circuit 106 successively forms address data frame in synchronism with the rotation of the original disk 2, converts the formed address data frame into serial data in synchronism with the rotation of the original disk 2 and outputs the serial data successively to a wobble signal generating circuit 107 as the wobble data ADIP.

The wobble signal generating circuit 107 is adapted to form a wobble signal WB from the wobble data ADIP or the like. In the wobble signal generating circuit 107, a generating circuit 107A may form a reference signal having a frequency of 115.2 (kHz). Further, according to the mastering device 101, the spindle of the spindle motor 3 may be controlled by using the reference signal by which the wobble signal WB in synchronism with rotation of the original disk 2 is formed. A dividing circuit 107B may divide the reference signal having the frequency of 115.2 (kHz) by a factor of $\frac{1}{8}$ so as to form a reference clock having a frequency of 14.4 (kHz).

With reference to FIGS. 40A, 40B, 40C, 40D, 40E and 40F, a biphase mark modulating circuit 107C may successively select a first reference clock in synchronism with the phase of the reference clock having a frequency of 14.4 (kHz) and a second reference clock having a frequency which is set to half that of the first reference clock by which a channel signal ch may be formed by subjecting the wobble data ADIP to biphase mark modulation.

The biphase mark modulating circuit 107C may allocate predetermined synchronization patterns to fronts of respective address data frames by which channel signals ch are formed (FIGS. 40A through 40E). Incidentally, the synchronization pattern may be a unique pattern which is not generated by the biphase mark modulation and which is allocated with a pattern of DSV of 0 and in which the polarity is set such that the signal level of channel signals ch is switched at a boundary between the synchronization pattern and the address data frame. Accordingly, the channel run length of the channel signal ch may be 1 or 2 whereas the synchronization pattern may be allocated with patterns of 3T, 1T, 1T, and 3T by using a maximum run length of 3.

Further, with regard to the channel signal ch, the signal level may be reverted at a timing in correspondence with a bit boundary of the wobble data ADIP and maintained at a constant logical level by being allocated with the second reference clock when the logical level of the wobble data ADIP is 0. Further, when the logical level of the wobble data ADIP is 1, the first reference clock may be allocated and the signal level reverted at a timing in correspondence with the center of the bit.

Returning to FIG. 39, a dividing circuit 107D may divide in half the reference signal having a frequency of 115.2 (kHz) to form a reference clock for phase modulation having a frequency of 57.6 (kHz) formed by setting or increasing the frequency of the clock for phase modulation by 4 times.

A phase modulating circuit 107E may form a first carrier signal the phase of which is in synchronism with the phase of the reference clock and a second carrier signal the phase of which is displaced by 180° from the reference clock from the reference clock having a frequency of 57.6 (kHz) and selectively output the first and the second carrier signals in accordance with the signal level of the channel signal ch (FIG. 40F). Thereby, the phase modulating circuit 107E may modulate the phase of the channel signal ch and output the modulated signal as the wobble signal WB.

Figures 41A, 41B, 41C:
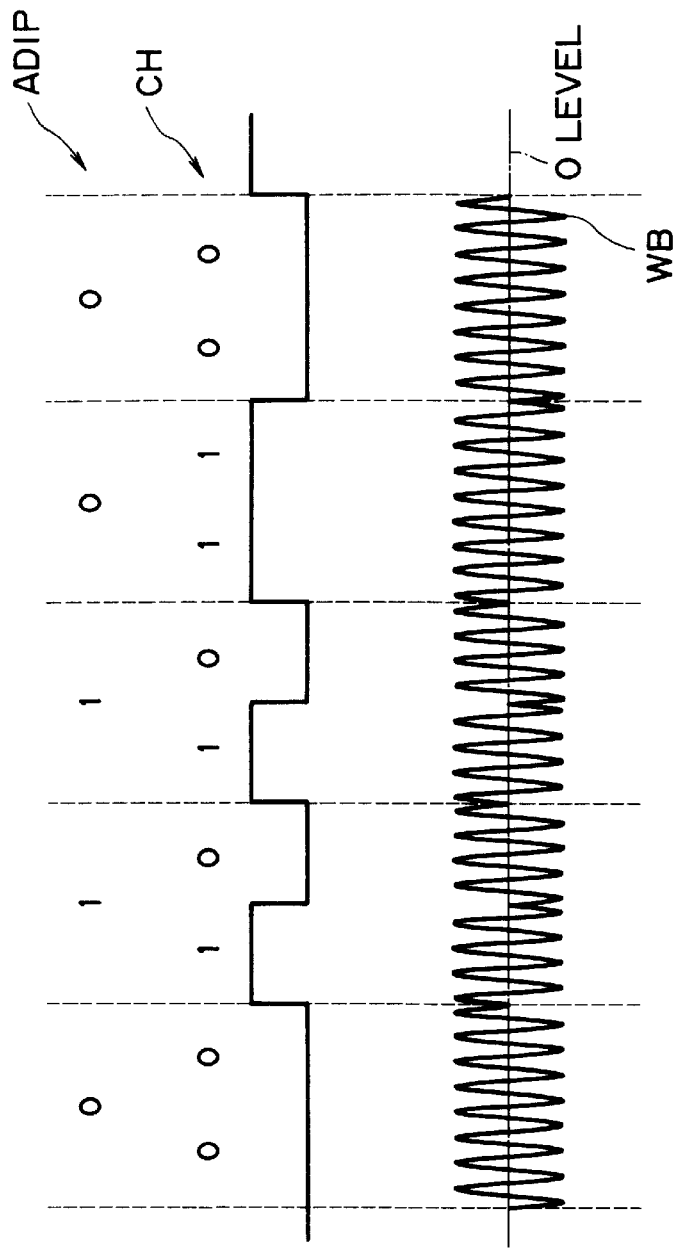
FIGS. 41A, 41B and 41C are signal waveform diagrams to which reference will be made in explaining the formation of a wobble signal.

In the wobble signal generating circuit 107, wobble data ADIP may be subjected to biphase mark modulation (FIGS. 41A and 41B). Thereafter, synchronization patterns may be inserted, the phase modulating signal having a single carrier frequency may be formed and the phase modulating signal may be outputted as the wobble signal WB (FIG. 41C).

According to this embodiment, the position of irradiating laser beam may meander or move in accordance with the wobble signal WB and an optical disk similar to that described in the previous embodiment may be fabricated from the original disk 2.

Figure 42:
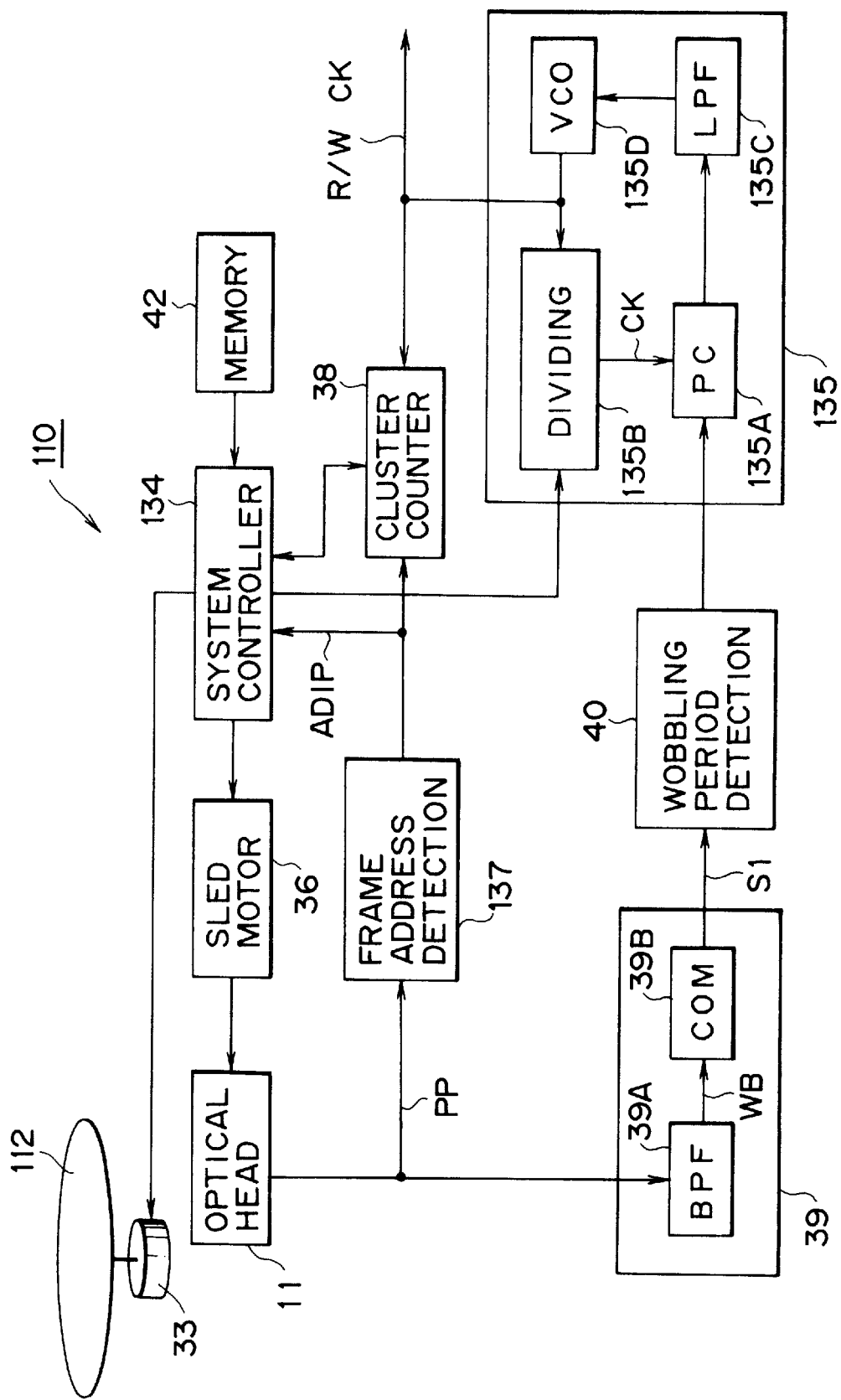
FIG. 42 is a diagram of an optical disk apparatus for use with an optical disk fabricated with the mastering device of FIG. 38.

FIG. 42 illustrates an optical disk device 110 for accessing an optical disk fabricated as described above which may utilize processing involving the wobble signal. As is to be appreciated, the optical disk device 110 is somewhat similar to the optical disk device 10 of FIG. 6.

In the optical disk device 110, the wobble data ADIP may be detected from the push pull signal PP obtained from the optical head 11 by which the position of irradiating laser beam is detected. That is, a frame address detecting circuit 137 may receive the push pull signal PP outputted from the optical head 11 and sample a wobble signal by a built-in band-pass filter. Further, the frame address detecting circuit 137 may decode the wobble data ADIP by detecting a change in the phase of the wobble signal and executing predetermined signal processing and may output the decoded wobble data ADIP to a system control circuit 134 and the cluster counter 138. Based upon the received decoded wobble data ADIP, the system control circuit 134 can specify generally the position of irradiating laser beam and the cluster counter 38 can recognize timing of frame synchronization. Further, in the frame address detecting circuit 137, error detection processing may be carried out by error detection code CRCC allocated to each address data frame and the wobble data ADIP outputted after removing an error detection code and a reserve bit from the wobble data ADIP which has been determined correct.

In a PLL circuit 135, a binarized signal outputted from the wobbling period detecting circuit 40 may be provided to a phase comparing circuit (PC) 135A wherein the binarized signal may be compared with the clock CK outputted from a dividing circuit 135B with regard to the phase.

Figures 43A, 43B:
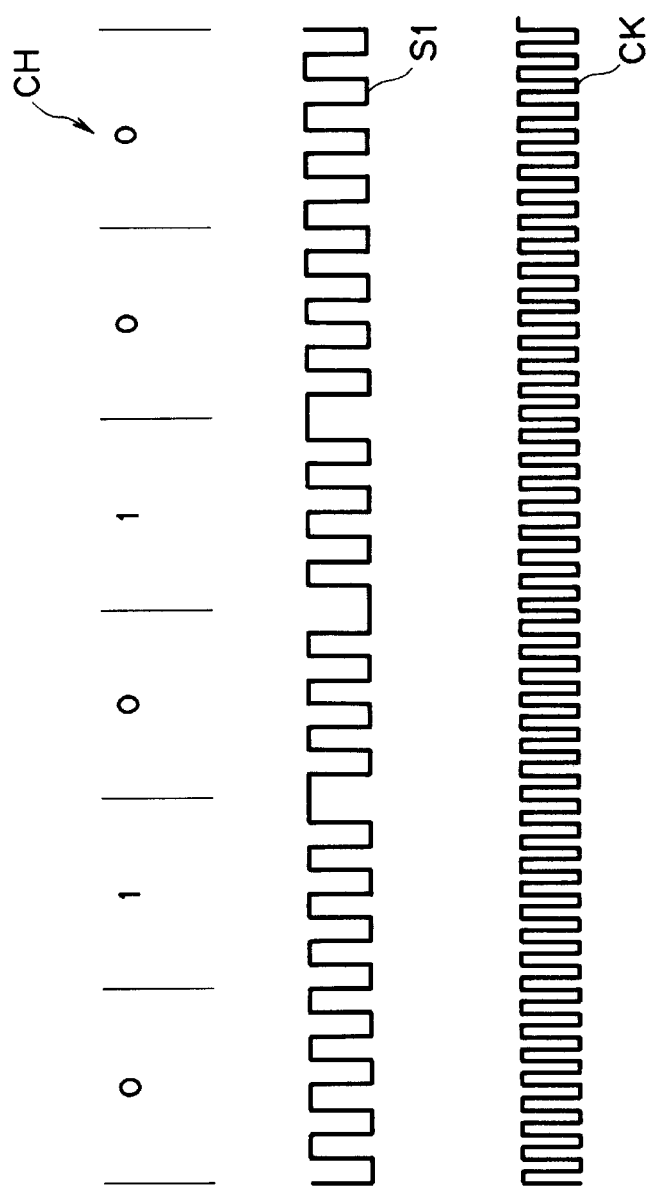
FIGS. 43A and 43B are signal waveform diagrams for explaining the forming of clock by the optical disk apparatus of FIG. 42.

Due to a setting signal from the system control circuit 134, the clock CK (FIG. 43B) having a frequency twice the frequency of the binarized signal S1 (FIG. 43A) may be outputted from the dividing circuit 135B. In contrast thereto, the wobble signal WB may be formed by modulating the phase by the mastering device 101 and, therefore, each edge holds correct phase information.

Thereby, in the PLL circuit 135, the phase of the binarized signal S1 may be compared with the phase of the clock CK having a frequency twice that of the of the binarized signal S1, a low frequency component which is a result of such phase comparison may be sampled by a low-pass filter (LPF) 135C and the oscillation frequency of a voltage control type oscillating circuit (VCO) 135D may be controlled by the low frequency component. Further, the oscillation output from the voltage control type oscillating circuit 135D may be divided by the dividing circuit 135B and utilized informing the clock CK having high accuracy.

According to the PLL circuit 135, the dividing circuit 135B may be set such that the dividing ratio is successively increased in accordance with the displacement of the position of the irradiating laser beam to the outer peripheral side of the optical disk 12 due to setting information from the system control circuit 134. Thereby, in the PLL circuit 135, the frequency of the oscillation output from the voltage control type oscillating circuit 135D may be increased more than the frequency of the wobble signal WB successively in steps in accordance with the displacement of the position of the irradiating laser beam to the outer peripheral side of the optical disk 12 and the oscillation output may be outputted as the reading/writing clock R/W CK.

By driving the optical disk 12 to rotate such that the reading/writing clock R/W CK has a constant frequency, and by recording desired data with the reading/writing clock R/W CK as a reference, the optical disk device 110 drives the optical disk 112 to rotate by ZCLV in a manner similar to that of the previous embodiment.

Further, a cluster start pulse may be outputted from the cluster counter 38 to the system control circuit 134 based on the count result of the reading/writing clock R/WCK. Such cluster start pulse is a pulse for instructing or indicating the timing of a starting cluster.

Figure 44:
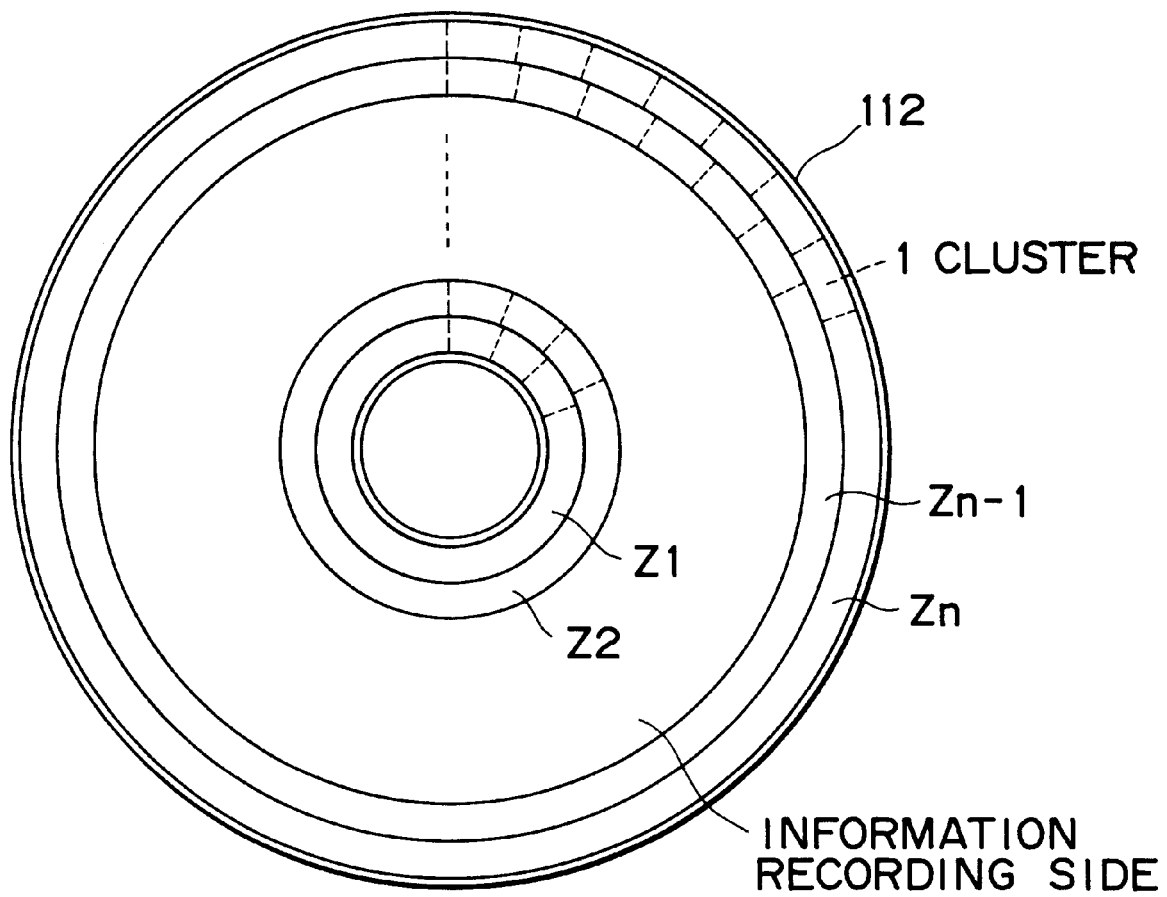
FIG. 44 is a plane view of an optical disk for explaining the driving of the optical disk by the optical disk apparatus of FIG. 42.

As shown by FIG. 44, according to this embodiment, the information recording face of the optical disk 12 may be divided into a plurality of zones $Z0, Z1, \ldots, Z_{n-1}, Z_n$, and the rotational speed of the optical disk may be reduced successively in steps from zones on the inner peripheral side toward zones on the outer peripheral side and the record density may be set equally with respect to zones on the inner peripheral side and zones on the outer peripheral side.

Further, by carrying out reading or writing control in accordance with the cluster start pulse outputted from the cluster counter 38, each zone may be divided radially and 1 cluster of data may be allocated to each divided region. Thereby, according to the system control circuit 134, a number of clusters of respective zones are successively increased from zones on the inner peripheral side toward zones on the outer peripheral side.

Further, with the optical disk device 110, a region corresponding to a radius of 24 (mm) through 58 (mm) is divided into 81 zones each having 840 tracks. At the inner most zone, 1 track is divided radially and 964 frames are formed. With regard to zones on the outer peripheral side, respective tracks are divided such that the number of frames are successively increased by 16 frames. The optical disk device 110 carries out a recording operation by allocating 1 cluster of data to 420 continuous frames formed as described above.

Thereby, in this embodiment, and in a manner similar to that of the previous embodiment, the optical disk device 110 enables access to the optical disk 112 for land and groove recording and ZCLV and video and audio signals can be recorded and reproduced in various operational modes.

Figure 45:
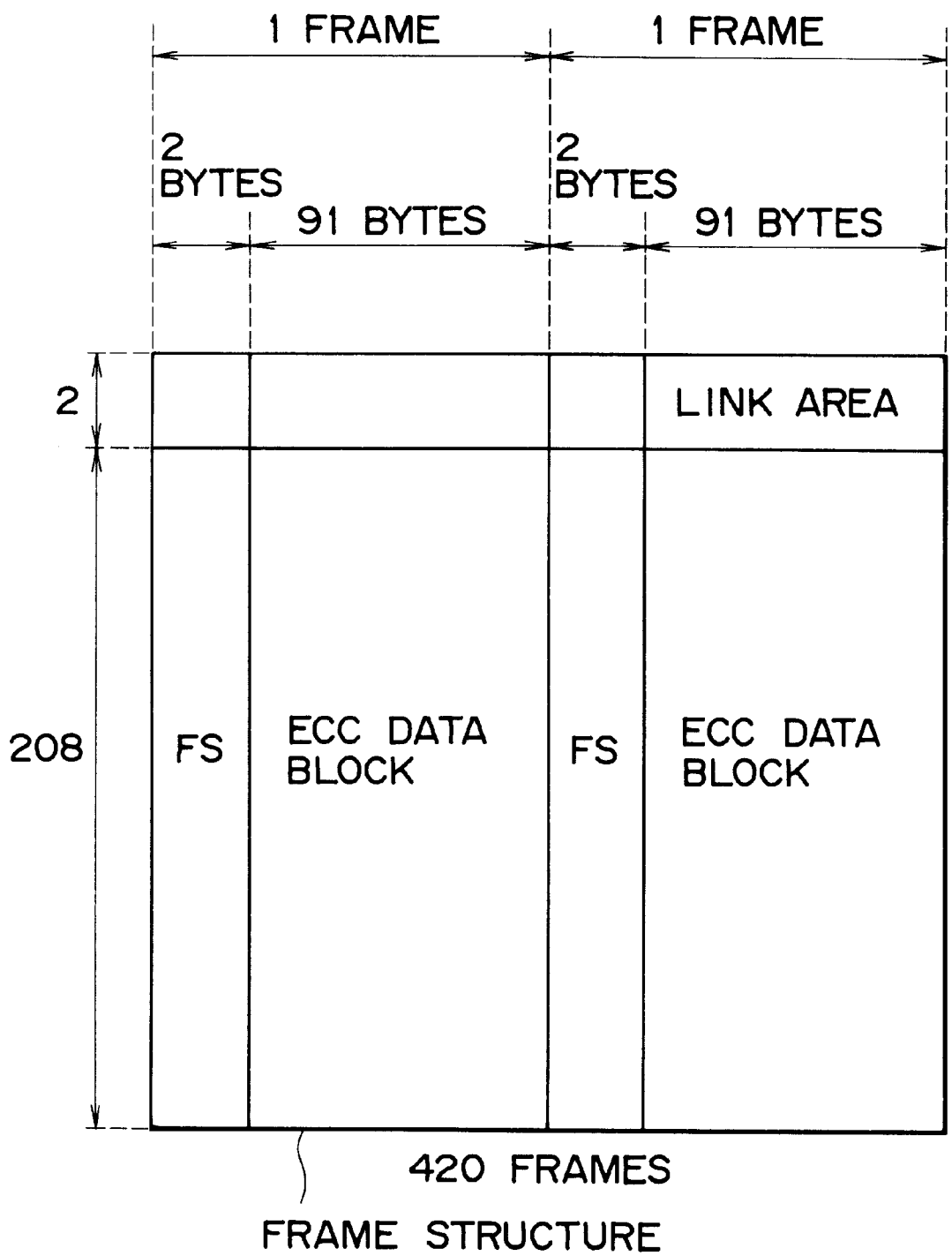
FIG. 45 illustrates a diagram of a frame structure which may be utilized in the optical disk apparatus of FIG. 42.

According to this embodiment, ECC data blocks (FIG. 13) (similar to those in the previous embodiment) are formed and a frame structure shown in FIG. 45 is formed with respect to the ECC data blocks. That is, according to the optical disk device 110, 2 bytes of a frame synchronization signal (FS) is allocated to each 91 bytes of ECC data block comprising 182 bytes×208 bytes in which 416 frames are formed from one ECC data block. Further, 2×2 frames of link frames are allocated to the 416 frames. Thereby, with the recording and reproducing circuit 53, 1 cluster of data is formed having the frame structure shown in FIG. 45. (A frame indicated in FIG. 45 corresponds to a frame described above in reference to FIG. 44.)

Figure 46:
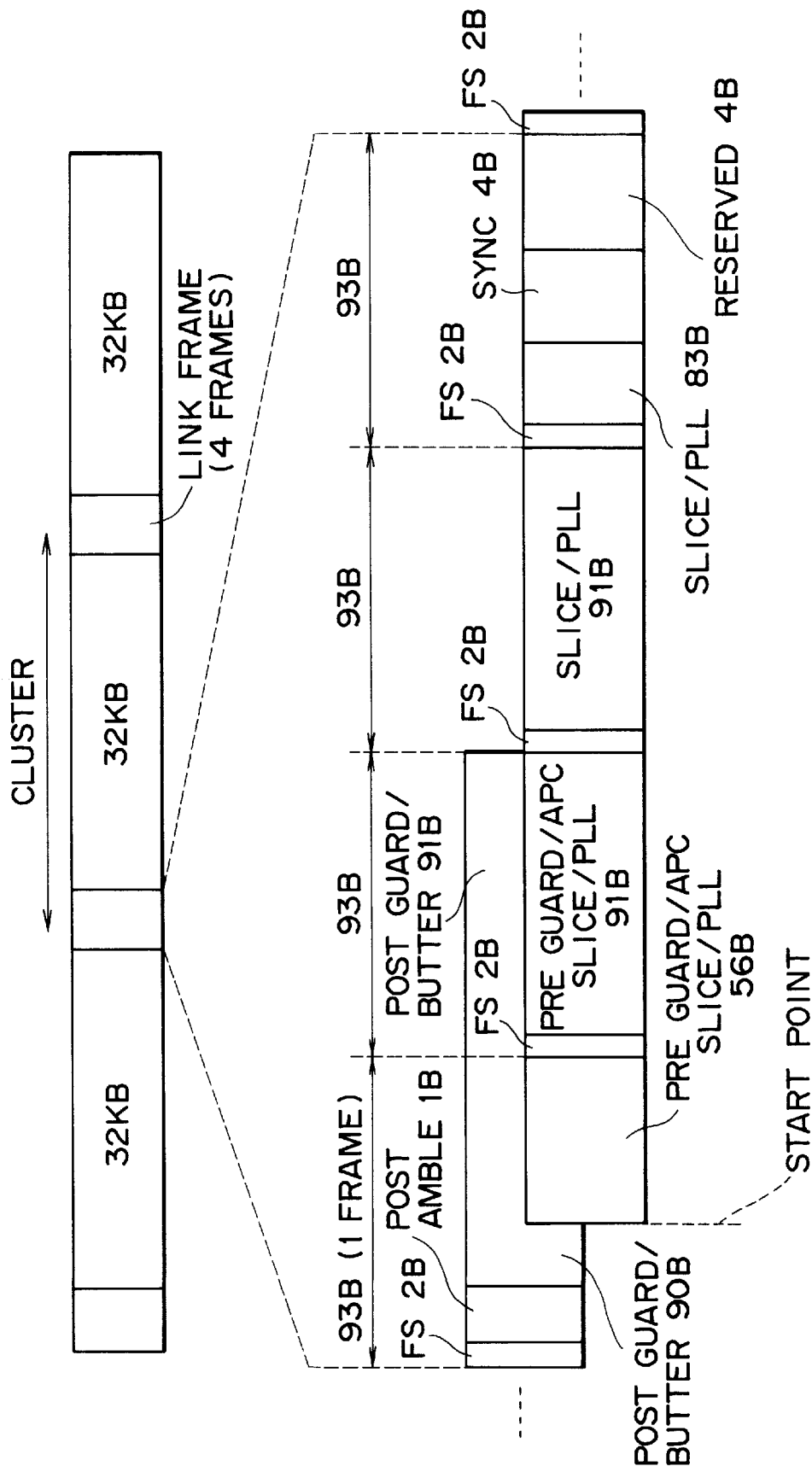
FIG. 46 illustrates a diagram for explaining the use of a cluster of data in the optical disk apparatus of FIG. 42.

The link frames are used for buffers between contiguous clusters in recording data to the optical disk 11 a cluster unit(s). That is, as shown by FIG. 46, with the optical disk device 110, after recording 56 bytes of data and 3 link frames successively to the optical disk 112, frames constituted by ECC blocks are successively recorded. More specifically, a front 56 bytes and a successive 91 bytes with a frame synchronization signal therebetween are used for promoting an overwrite cycle in a record area by suppressing fluidity of recording material caused by overwriting in the case where phase change media are used as a record media and for controlling the amount of laser beam (pre guard/APC) (APC: Automatic Power Control). Next, a frame synchronization signal (FS) and a region (Slice/PLL) for adjusting slice level in reproducing and for PLL synchronization is allocated. Further, bytes for adjusting the amount of laser beam may also be utilized for adjusting the slice level in reproducing and for PLL synchronization. Further, at end of the front side, 4 bytes of synchronization pattern (Sync) and a region for reserve (Reserved) are provided. At the end of a frame of the ECC block, is a frame synchronization signal (FS), a 1 byte postamble, 90 bytes of a post guard/buffer, the frame synchronization signal and 91 bytes of a post guard/buffer. These bytes and a successively recorded cluster may overlap. Further, the postamble is a region for adjusting the mark length of data and setting the signal polarity to a predetermined value, the post guard is a region for promoting the overwrite cycle of a record area by suppressing fluidity of record material caused by overwriting when phase change media are used as record media, and the buffer is an area for absorbing record jitter caused by eccentricity of the disk, the record sensitivity or the like.

According to the above-described constitution, even when wobble data comprising address data formed by a meandering or varying groove is recorded in place of a pit row arrangement, an effect similar to that of the previous embodiment can be provided. Further, by omitting the pit row arrangement, video and audio signals can be recorded on the information recording face of an optical disk more efficiently compared with the previous embodiment.

Figure 47:
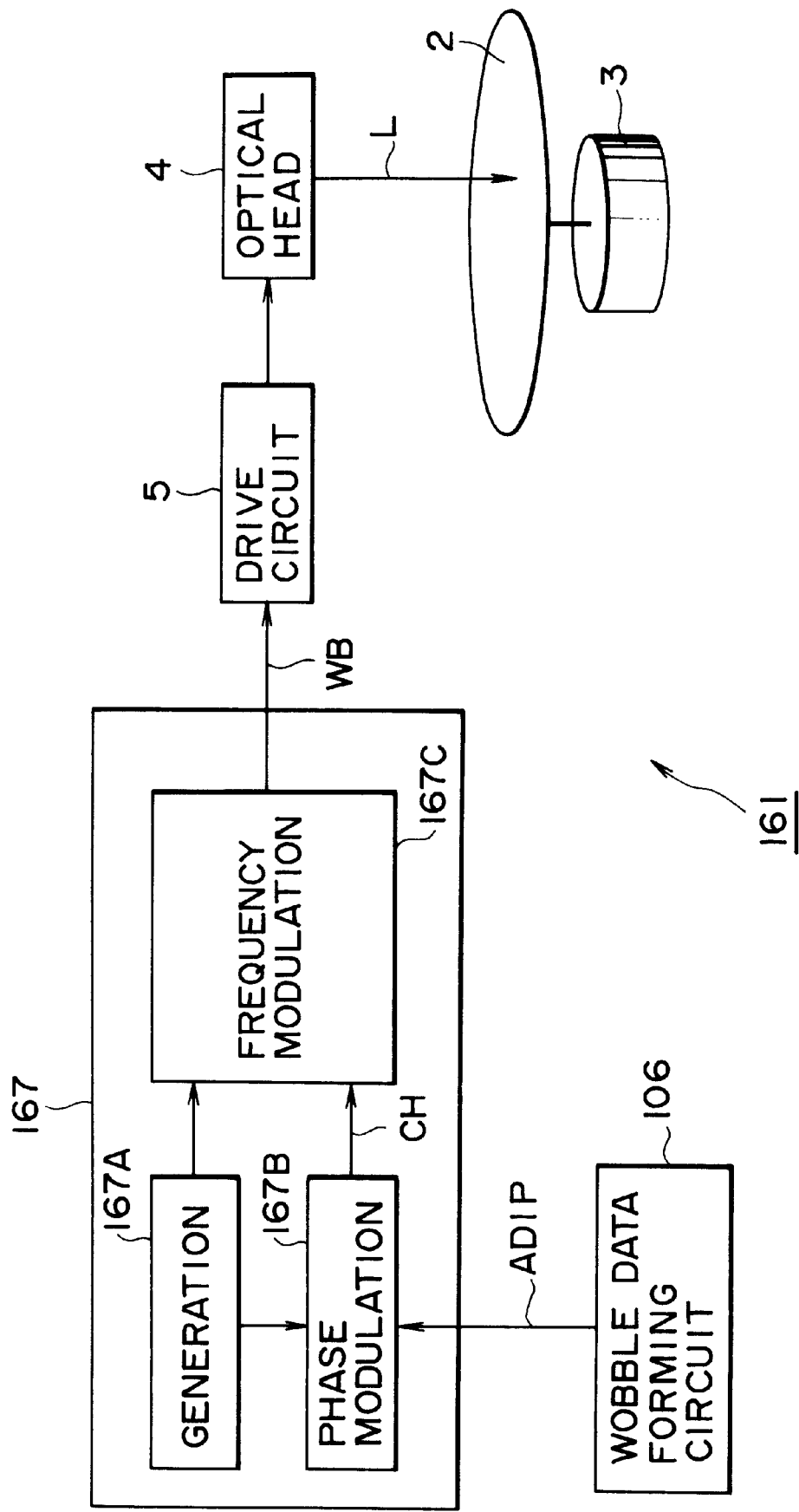
FIG. 47 is a diagram of a mastering device according to another embodiment of the present invention.

FIG. 47 illustrates a mastering device 161 according to another embodiment of the present invention. In fabricating an optical disk according to this embodiment, the original disk 2 is exposed by the mastering device 161 and an optical disk is fabricated from the original disk 2. Further, the mastering device may have a number of elements similar to those in the is mastering devices 1 and 101 (described above with reference to FIGS. 2 and 38). Such similar elements are designated with the same notation and a duplicated explanation will be omitted herein.

In the mastering device 161, a wobble signal generating circuit 167 forms the wobble signal WB from wobble data ADIP. The wobble signal generating circuit 167 includes a generating circuit 167A which forms and outputs predetermined reference signals. According to the mastering device 161, the spindle motor 3 is controlled by using one of the reference signals formed by the generating circuit 167A by which the wobble signal WB in synchronism with rotation of the original disk 2 is formed.

The signal generating circuit 167 further includes a phase modulating circuit 167B which forms the channel signal ch by modulating the phase of the wobble data ADIP by allocating a first reference clock $\phi 1$ in synchronism with the reference signal and a second reference clock $\phi 2$ having a phase different from the phase of the first reference clock $\phi 1$ by 180° in accordance with the logical level of the wobble data ADIP. As shown by FIGS. 48A, 48B1, 48B2, 48C,48D and 48E, the phase modulating circuit 167B allocates the first and the second reference clocks $\phi 1$ and $\phi 2$ such that an even number of channels are formed at the earlier half and later half of each bit (2 channels in this case) with a timing tc in correspondence with the center of each bit of the wobble data ADIP as a boundary and periods of Logic 1 and periods of Logic 0 are equalized at earlier halves and later halves.

That is, according to the phase modulating circuit 167B, when the wobble data ADIP is at Logic 1 and after allocating 1 period of the first reference clock, 1 period of the second reference clock is allocated whereby the channel signal ch is formed such that channels of 0110 are successively formed (FIGS. 48A–D). On the other hand, when the wobble data ADIP is at Logic 0 and after allocating 1 period of the second reference clock, 1 period of the first reference clock is allocated by which the channel signal ch is formed such that channels of 1001 are successively formed.

The signal generating circuit further includes the signal generating circuit further includes a frequency modulating circuit 167C wherein the frequency of the channel signal ch is modulated and the modulated signal is outputted as the wobble signal WB. In this processing, the frequency modulating circuit 167C forms the wobble signal WB by modulating the frequency of the channel signal ch without interposing synchronization pattern and, as a result, reduces the redundancy by a corresponding amount. Further, if the central frequency of frequency modulation is designated by a notation n, the frequency modulating circuit 167C forms the wobble signal WB by allocating sine wave signals of the frequencies n−d and n+d to Logic 1 and Logic 0 of the channel signal ch. Such sine wave signals are allocated in units of a 0.5 wave such that zero crossings are carried out at timings ts and tc in correspondence with the bit center and the bit boundary of the wobble data ADIP.

Thus, in the signal generating circuit 167, an even number of channels are formed at an earlier half and a later half of each bit with regard to the timing tc in the center of each bit of the wobble data ADIP and the first and the second reference clocks $\phi 1$ and $\phi 2$ are allocated such that periods of Logic 1 and periods of Logic 0 are equalized at the earlier half and the later half whereby, according to the channel signal ch, the number of channels of Logic 1 are maintained to be the same as that of Logic 0 at the earlier half and the later half.

When sine wave signals having frequencies of n−d and n+d are allocated to the channel signal ch in units of a 0.5 wave, in periods corresponding to the periods of the earlier half and later half of each bit of the wobble data ADIP, the wobble signal WB can be formed by canceling out phase displacements of the carrier signal having a frequency n. Accordingly, the wobble signal WB can be formed such that zero crossings exist at the timings ts and tc in correspondence with the bit center and the bit boundary of wobble data ADIP. Further, by allocating sine wave signals having frequencies of n−d and n+d in units of a 0.5 wave, the timing of the signal level of the wobble signal WB rising from 0 level and falling from 0 level, are maintained at the timings ts and tc in correspondence with the bit center and the bit boundary of the wobble data ADIP and correct phase information of the carrier signal can be maintained.

Figures 49A, 49B, 49C, 49D, 49E, 49F:
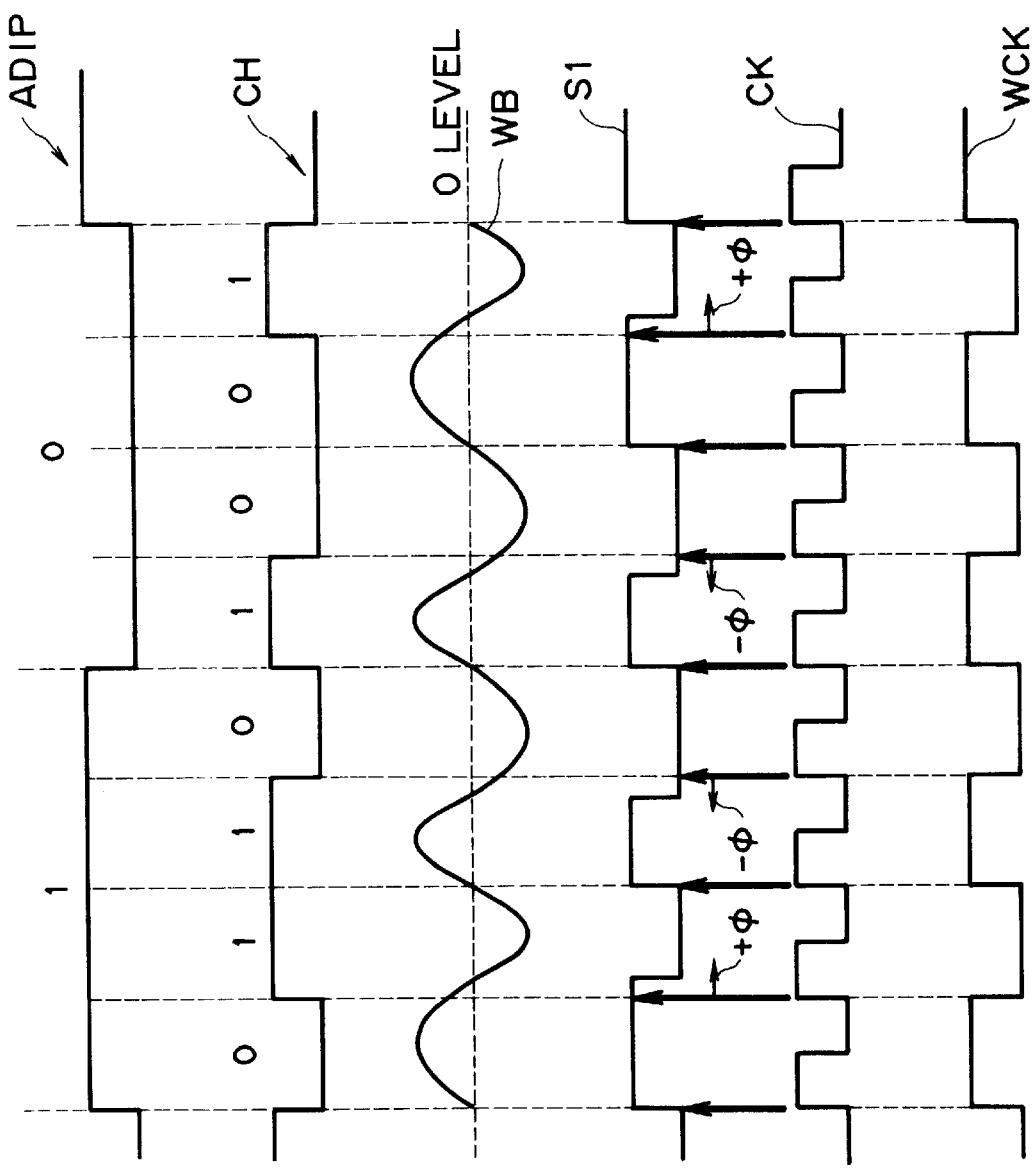
FIGS. 49A, 49B, 49C, 49D, 49E and 49F are signal waveform diagrams for explaining processing of a wobble signal by the mastering device of FIG. 47.

As shown by FIGS. 49A, 49B, 49C, 49D,49E and 49F, when the wobble signal WB is binarized with 0 level as a reference, a binarized signal S1 having a rising edge or a falling edge which coincides with the timing of an edge of the channel signal ch can be formed (FIGS. 49A through 49D). The clock CK and the wobble clock WCK are formed with edge timing having correct phase information as a reference so that a clock with high accuracy and having no variation in frequency and phase can be formed (FIGS. 49E and 49F). Further, as shown by the arrow marks, with regard to the remaining edges, the phase difference +φ and −φ of the clock CK represent the logical levels of an earlier half and a later half of the channel signal ch and, therefore, the wobble data ADIP can be decoded with the phase differences +φ and −φ as references.

Thereby, the wobble signal generating circuit 167 produces a wobble signal WB for causing the grooves to meander or vary and a highly accurate clock.

In this embodiment, and in a manner similar to a previous embodiment, various optical disks are fabricated from the original disk 2. In this way, with regard to the optical disk, the timing in which the signal level of the wobble signal WB rises from 0 level and falls from 0 level, the maintaining of correct phase information of the carrier signal, therefore, a period in which the groove crosses the track center from the inner peripheral side to the outer peripheral side or a period in which the groove crosses the track center from the outer peripheral side to the inner peripheral side may be constant and the timing of such crossings may coincide with the timing of zero crossings of the carrier signal.

Figure 50:
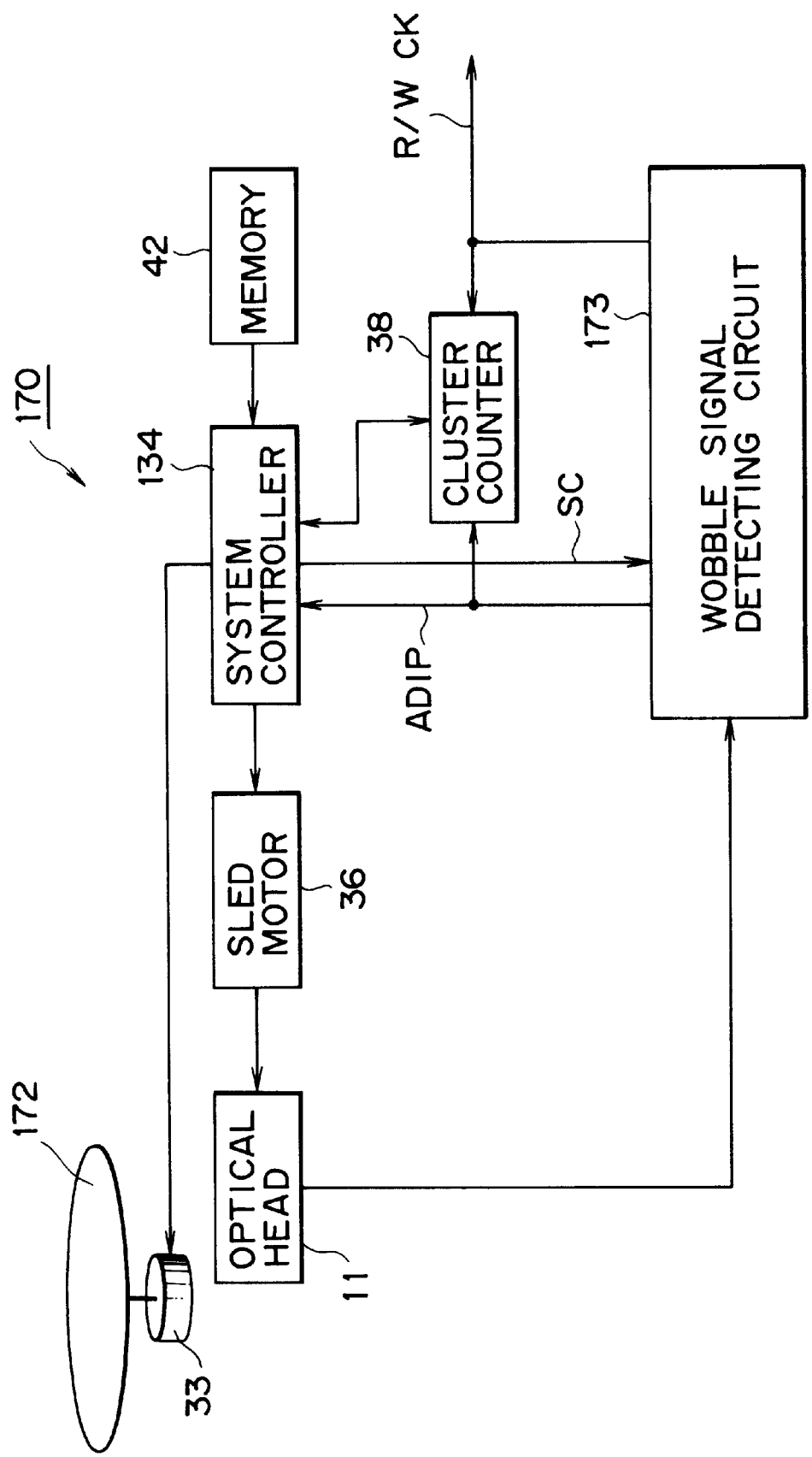
FIG. 50 is a diagram of an optical disk apparatus for use with an optical disk fabricated with the mastering device of FIG. 47.

FIG. 50 illustrates an optical disk device 170 according to this embodiment. The optical disk device 170 may have a number of elements similar to those in the optical disk devices 10 and 110 mentioned above in reference to FIGS. 6 and 42. Such similar elements are designated with the same notation and a duplicated explanation will be omitted herein.

The optical disk device 170 may include a wobble signal processing circuit 173 which samples the wobble signal WB from the push pull signal PP, processes the wobble signal WB and forms the wobble clock WCK, the clock CK and the reading/writing clock R/W CK. Further, the wobble signal processing circuit 173 detects the wobble data ADIP from the wobble signal WB and supplies the same to the system control circuit 134.

Figure 51:
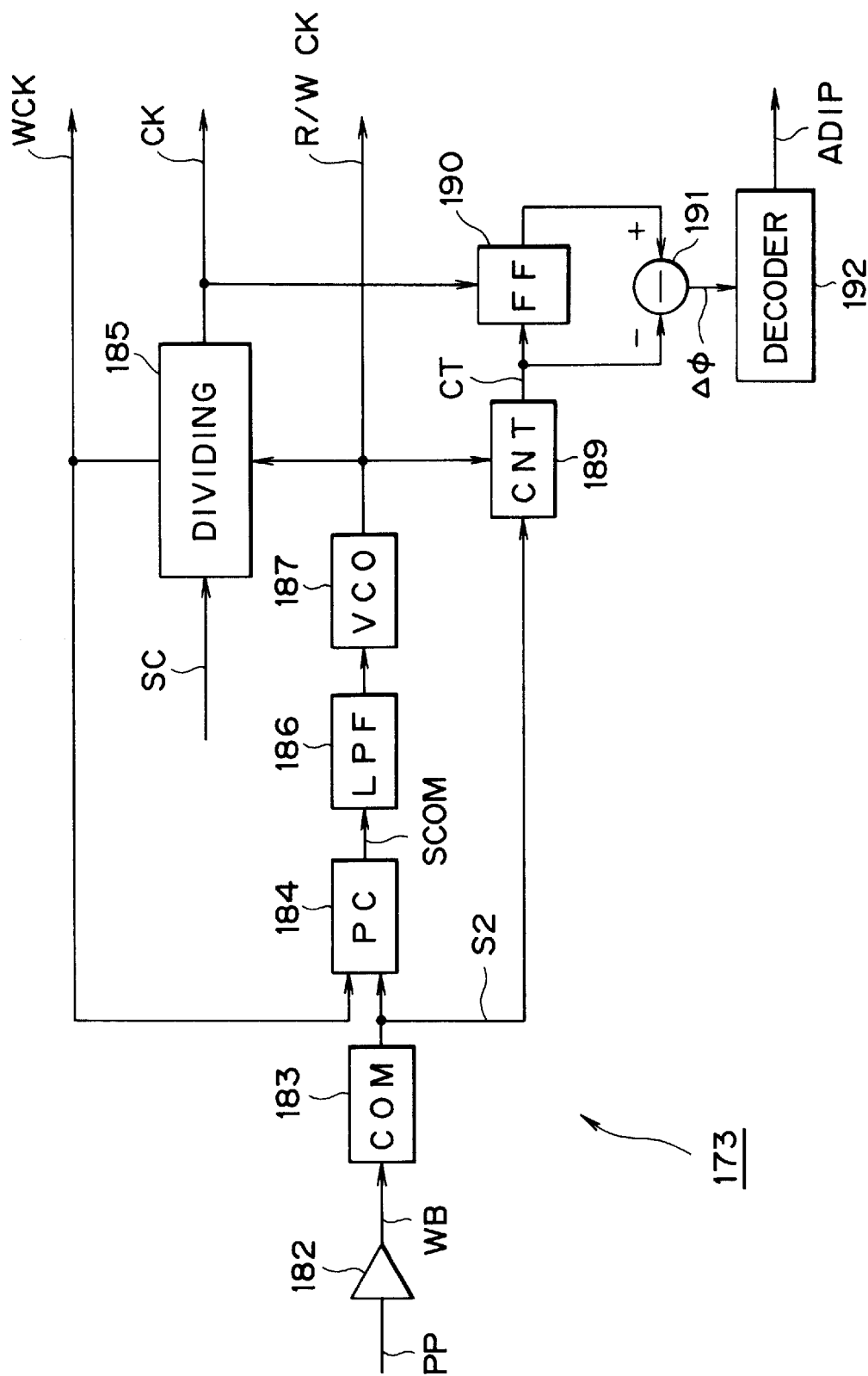
FIG. 51 is a diagram of a wobble signal processing circuit of the optical disk apparatus of FIG. 50.

FIG. 51 is the block diagram of the wobble signal processing circuit 173. The wobble signal processing circuit 173 amplifies the push pull signal PP by an amplifier circuit 182 having predetermined gain and, thereafter, samples the wobble signal WB by way of a band-pass filter (not illustrated). A comparing circuit (COM) 183 binarizes the wobble signal WB with regard to a 0 level so as to form a binarized signal S2 in which edge information is detected or obtained from the wobble signal WB (FIGS. 52A through 52D). In this way, either a rising edge or a falling edge of the binarized signal S2 is provided with correct phase information and phase information of the remaining or other edge corresponds with information of the wobble data ADIP.

A phase comparing circuit (PC) 184 which may include constituted by an EXCLUSIVE OR circuit compares phases of the wobble clock WCK and the wobble signal WB and outputs a result SCOM of such phase comparison (FIGS. 52D through 52G). A low-pass filter (LPF) 186 limits the phase comparison result and outputs the low frequency component to a voltage control type oscillating circuit (VCO) 187 which forms and outputs the reading/writing clock R/W CK. The voltage control type oscillating circuit 187 forms the reading/writing clock R/W CK with a frequency that is 4 times larger than the frequency of the wobble signal WB. A dividing circuit 185 successively divides the reading/writing clock R/W CK and forms the clock CK and the wobble clock WCK.

Therefore, the phase comparing circuit 184, the dividing circuit 185, the low-pass filter 186 and the voltage control type oscillating circuit 187 constitute a PLL circuit which forms the clocks R/W CK, CK and WCK by synchronizing the phases with timing corresponding to where the wobble signal WB rises after a zero crossing(s) (timing having correct phase information). Further, the wobble clock WCK is formed by shifting the phase of the binarized signal S2 by $\pi/2$ with respect to the correct edge thereof.

Therefore, according to this embodiment, with regard to the optical disk, due to the timing where the signal level of the wobble signal WB rises from 0 level or falls from 0 level and the maintaining of correct phase information of the carrier signal, in the case where the wobble clock WCK is in phase synchronism with the binarized signal S2, the oscillating frequency is controlled such that a mean value of the phase comparison result SCOM provided via the low-pass filter 186 has a constant value. In this case, for example, when the phase of the wobble clock WCK is advanced (FIG. 52H), the mean value of the phase comparison result SCOM is decreased by that amount (FIG. 52I) and is controlled such that the oscillating frequency is decreased. Thereby, the PLL circuit forms various clocks with the rise of wobble signal WB having correct phase information as a reference.

Meanwhile, with regard to the binarized signal S2, in a time period T from when the logical level rises to when the logical level falls again, a difference between the time period where the logical level rises and the time period where the logical level falls is changed by timing of a falling edge during the time period T. The difference is provided with phase information of timing where the wobble signal WB falls after a zero crossing.

Figures 53A, 53B, 53C, 53D, 53E, 53F, 53G, 53H:
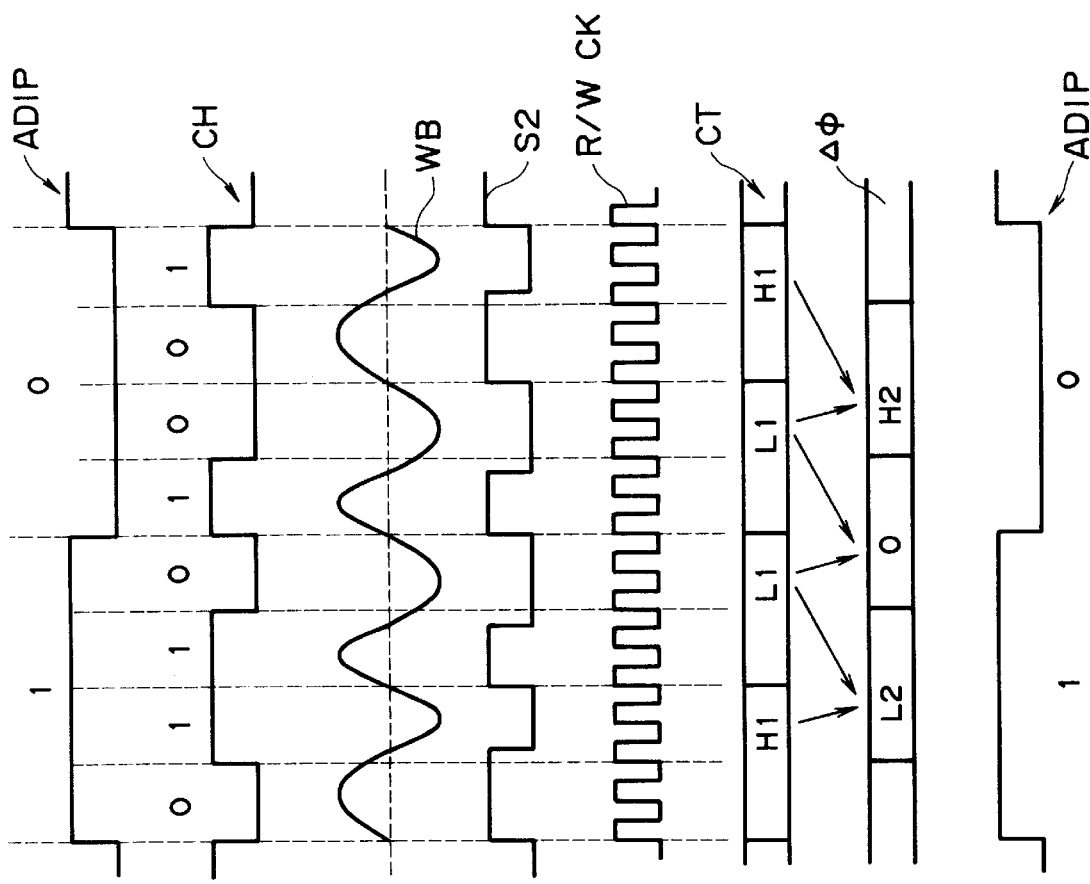
FIGS. 53A, 53B, 53C, 53D, 53E, 53F, 53G and 53H are signal waveform diagrams for explaining an operation of the wobble signal processing circuit of FIG. 51.

The wobble signal processing circuit 173 reproduces the wobble data ADIP by effectively utilizing the above relationship. That is, a counter (CNT) 189 clears a count value with a rise edge of the binarized signal S2 as a reference, counts up the reading/writing clock R/W CK during a time period where the logical level of the binarized signal S2 rises and counts down the reading/writing clock R/W CK during the time period where the logical level of the binarized signal S2 falls (FIGS. 53A through 53F). Thereby, the counter 189 detects an advance phase and a retard phase of the wobble signal WB in respect of the wobble clock WCK by the count value CNT with a half period of the wobble data ADIP as a unit. A flip flop (FF) 190 retards the count value CNT by the half period of the wobble data ADIP. A subtracting circuit 191 subtracts output data of the counter 189 from the output data of the flip flop 190. The subtracting circuit 191 detects a change in timing where the wobble signal WB carries out zero crossing before and after the respective references of a bit boundary and bit center of the wobble data ADIP. When the timing change is advanced in respect of the wobble clock WCK, the subtraction result is a negative value L2 which is twice the count value CNT. When the timing change is retarded in respect of the wobble clock WCK, the subtraction result is a positive value H2 that is twice the count value CNT. When the phase remains unchanged, the subtraction result is a value 0 (FIG. 53G)

With regard to the timing where the wobble signal WB carries out zero crossing before and after the respective references of the bit boundary and the bit center, an intermediary before and after the reference can be determined as a bit boundary from a phase modulation rule. When the value of subtraction before and after the bit boundary is positive and negative, respectively, the wobble data ADIP can be determined to beat Logic 1 and 0. Incidentally, the value of subtraction which interposes a portion remote from the bit boundary by 1 has no significance. According to this embodiment, bit reversion is set to occur always once in one address data block so that the bit boundary can be detected in a predetermined time period.

The decoder 192 detects the bit boundary from output data $\Delta\phi$ of the subtracting circuit 191. Further, by determining the subtraction value $\Delta\phi$ at every period with the detected bit boundary as a reference, the wobble data ADIP is decoded and outputted (FIGS. 53G and 53H).

According to the constitution of this embodiment, even when the wobble signal is meandered or varied by phase modulation, an effect similar to that of the first embodiment can be provided. Further, in this case, the wobble signal can be formed such that the phase error becomes 0 when zero crossings occur at the timings ts and tc which correspond to the bit centers and the bit boundaries of the wobble data ADIP and the wobble data ADIP is averaged in one bit of the wobble data ADIP whereby clocks with small variation in frequency and small variation in phase on an average and with high accuracy can be formed and the user data can be recorded with high density and the information recording face can be effectively utilized.

FIGS. 54A, 54B, 54C, 54D1, 54D2 and 54D3 are plane views showing access to an optical disk by an optical disk device according to another or fourth embodiment of the present invention. Such optical disk device provides access to the optical disk 12 in a manner similar to that described above in the first embodiment.

The optical disk device is constituted similar to the optical disk device according to the first embodiment except with regard to the processing performed by the system control circuit during a multichannel mode.

That is, in this embodiment, if the multichannel mode is selected, the system control circuit sets the rotational speed of the optical disk 12 twice the normal rotational speed and enables access to the optical disk 12 alternately by respective channels. In this case, the system control circuit 34 records the user data by allocating a track of the optical disk 12 comprising an idle region alternately to respective channels from the inner peripheral side to the outer peripheral side (FIGS. 54A through 54D3). An effect similar to that of the first embodiment can be provided even when the user data is recorded alternately by the track units in this way. Further, the recorded user data may be reproduced.

Figure 55:
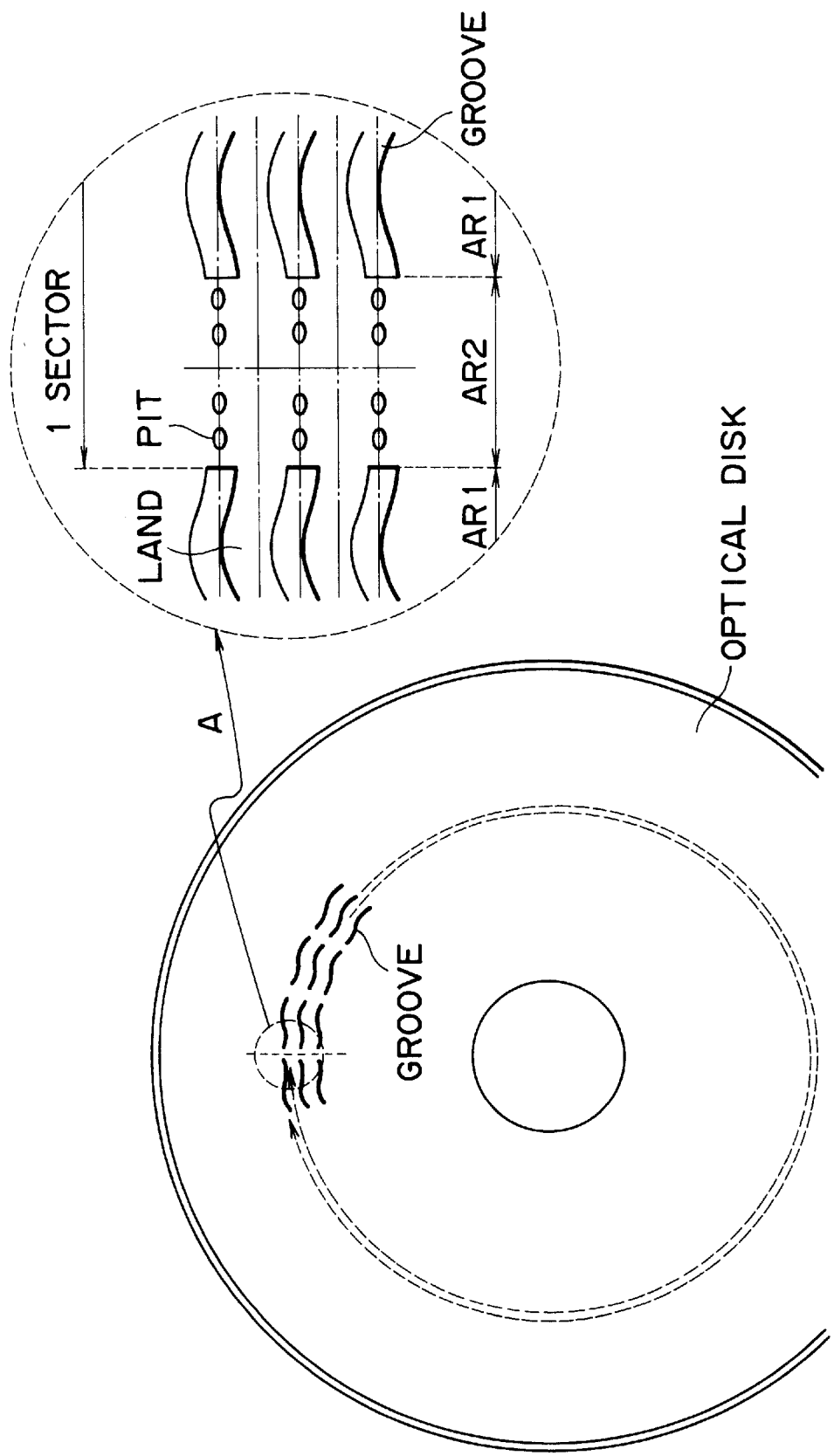
FIG. 55 is a plane view of an optical disk for explaining a sector arrangement by the mastering device according to an embodiment of the present invention.

FIG. 55 is a plane view showing an optical disk according to another or fifth embodiment of the present invention which may be utilized with the device of FIG. 1. In fabricating an optical disk according to this embodiment, and in a similar manner to that of the first embodiment, grooves are formed and address data is recorded in a pit row or rows by interrupting the formation of the grooves at predetermined angular intervals. In this case, according to this embodiment, address data of a sector constituted by succeeding grooves and address data of a sector constituted by succeeding lands are recorded at an earlier half and a later half of the address area AR2 and the pit row is arranged on the track center of the groove.

The optical disk device enables access to the optical disk in a manner similar to that in the above-described first or second embodiment.

The arrangement of the optical disk shown in FIG. 55 enables an effect similar to that with the above-described first embodiment to be obtained.

Figure 56:
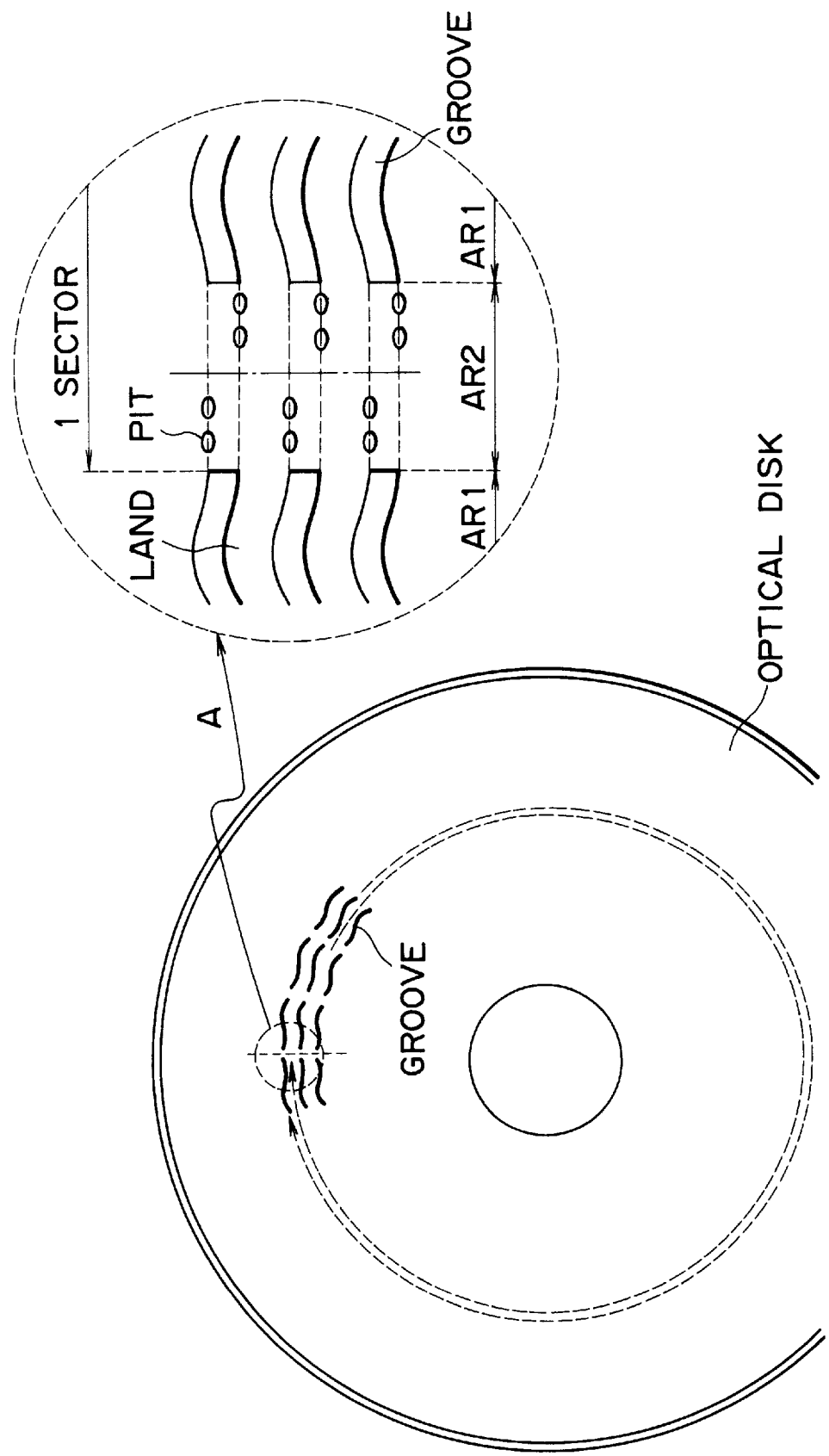
FIG. 56 is a plane view of an optical disk for explaining a sector arrangement by a mastering device according to an embodiment of the present invention.

FIG. 56 is a plane view of an optical disk according to another or sixth embodiment of the present invention which may be utilized with the device of FIG. 1. In fabricating an optical disk according to this embodiment, and in a manner similar to that of the first embodiment, grooves are formed and address data is recorded in a pit row or rows by interrupting the formation of the grooves at predetermined angular intervals. In this case, according to this embodiment, address data of a sector constituted by succeeding grooves and address data of a sector constituted by succeeding lands are recorded at an earlier half and a later half of the address area AR2 and the pit rows on the earlier half and a later half are recorded in a boundary or area between the land and groove.

The optical disk device enables access to the optical disk in a manner similar to that in the above-described first or second embodiment.

The arrangement of the optical disk shown in FIG. 56 enables an effect similar to that with the above-described first embodiment to be obtained.

Figure 57:
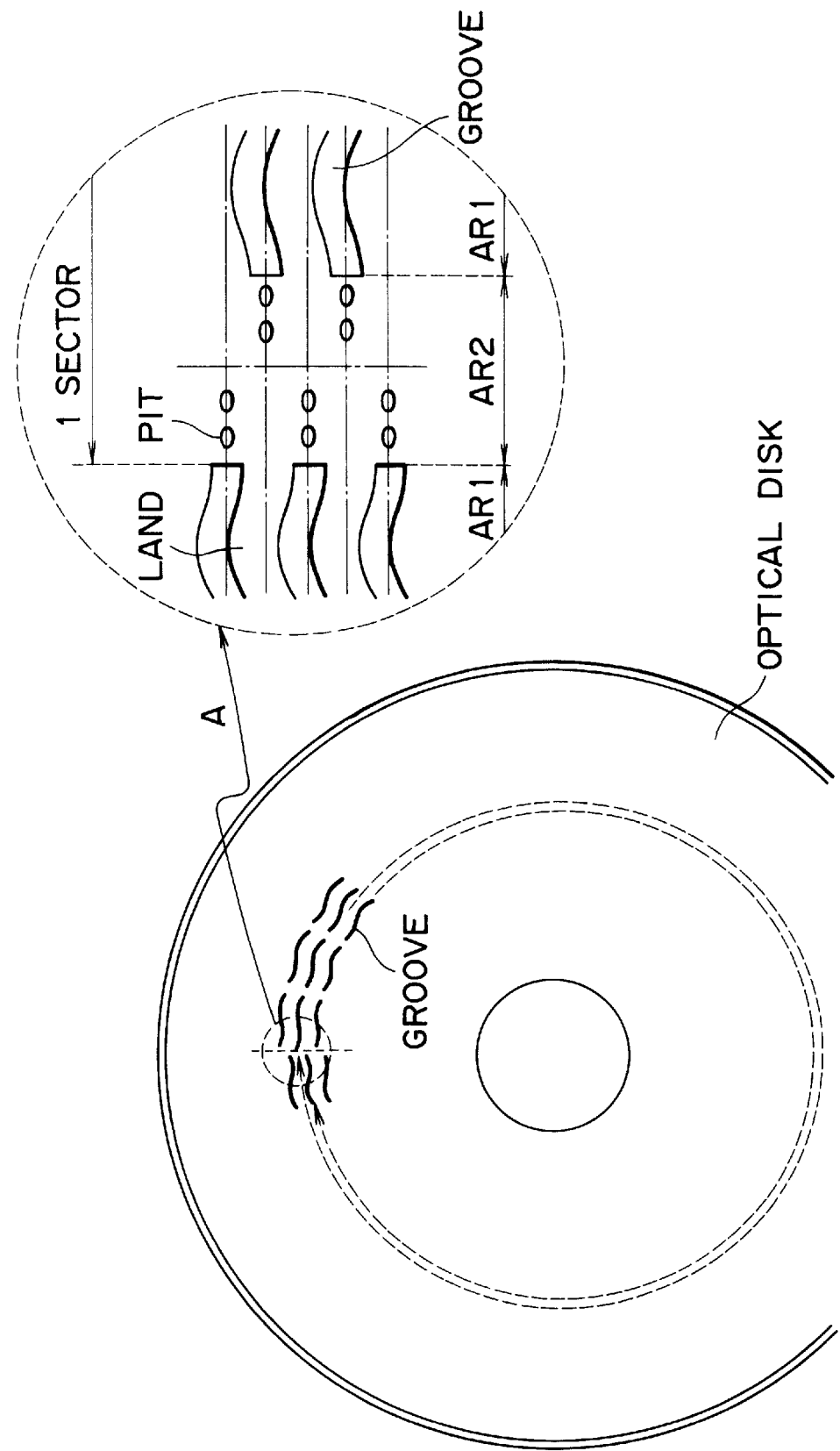
FIG. 57 is a plane view of an optical disk for explaining a sector arrangement by a mastering device according to an embodiment of the present invention.

FIG. 57 is a plane view of an optical disk according to another or seventh embodiment of the present invention which may be utilized with the device of FIG. 1. In fabricating an optical disk according to this embodiment, tracks are formed with a pitch of 0.5 ($\mu$m) by alternately repeating grooves and lands in a circumferential direction successive to a land on the outer peripheral side when one turn of a groove is made or successive to a groove on the outer peripheral side after one turn of a land is made.

Further, the address data is recorded in a pit row or rows by interrupting the formation of the groove at predetermined angular intervals. In this case, according to this embodiment, address data of a sector constituted by succeeding grooves is arranged at an earlier half and a later half of the address area AR2 and address data of a sector constituted by succeeding lands is arranged on the corresponding track center.

With regard to the optical disk shown in FIG. 57, even when grooves and lands are repeated alternately in the circumferential direction of the optical disk and tracks are formed by repetition of grooves and lands with a pitch of 0.5 ($\mu$m), an effect similar to that of the first embodiment can be obtained. Further, as compared to the first and the second embodiments, the frequency of access can be reduced.

Figure 58:
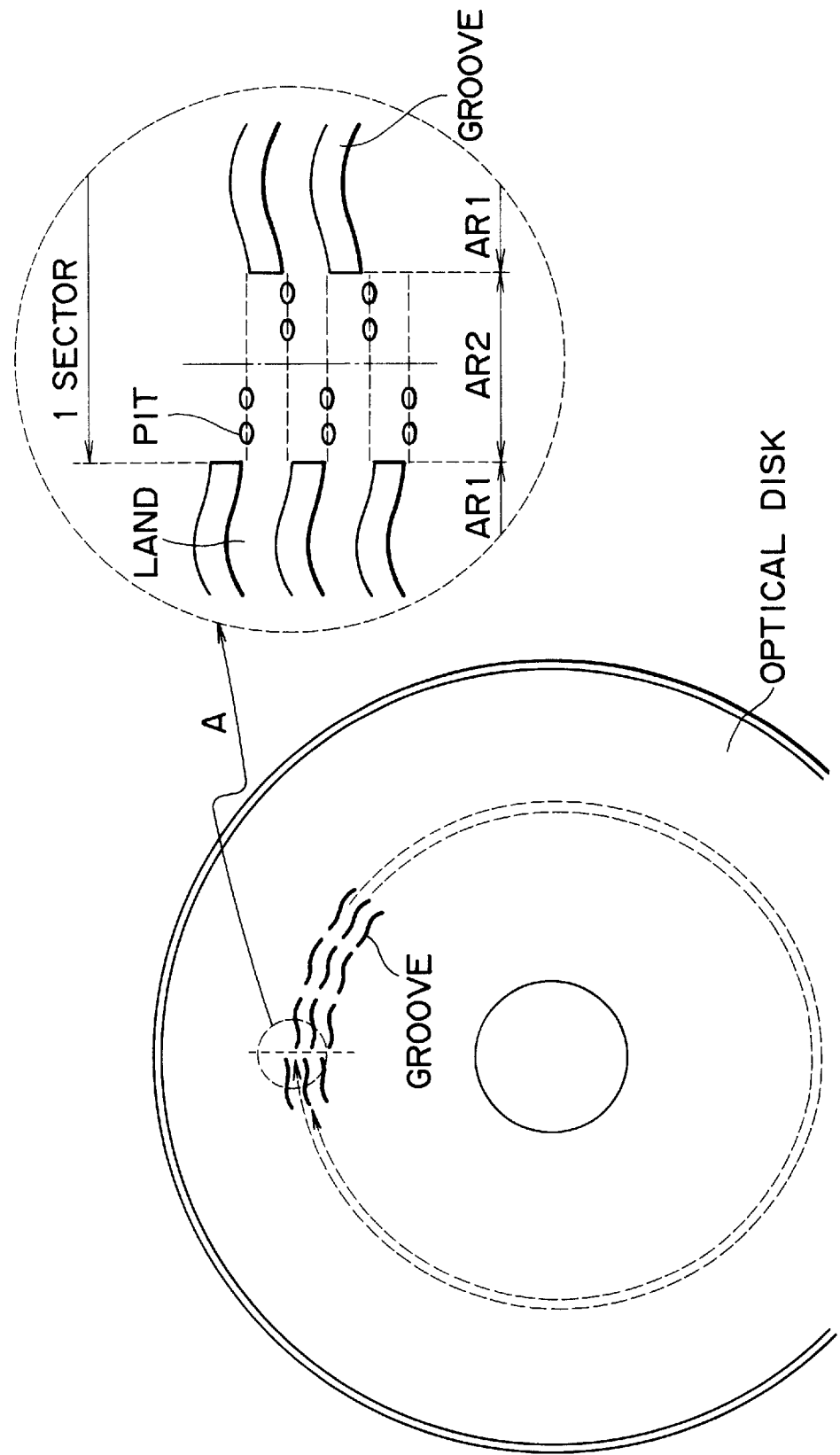
FIG. 58 is a plane view of an optical disk for explaining a sector arrangement by a mastering device according to an embodiment of the present invention.

FIG. 58 is a plane view of an optical disk according to another or eighth embodiment of the present invention which may be utilized with the device of FIG. 1. In fabricating an optical disk according to this embodiment, grooves are successively formed to continue to lands on the outer peripheral side when one turn of a groove is made or to continue to grooves on the outer peripheral side when one turn of a land is made. Further, address data is recorded in a pit row or rows by interrupting the formation of grooves at predetermined angular intervals. In this case, according to this embodiment, address data is recorded to an earlier half and a later half of the address area AR2. In this case, the respective pit rows are allocated to boundaries of grooves and lands, respectively, and are arranged in an offset manner at an earlier half portion and a later half portion.

With regard to the optical disk shown in FIG. 58, even when land and groove recording is carried out by alternately connecting lands and grooves, an effect similar to that of the first embodiment can be obtained.

Although embodiments have been described which utilize land and groove recording, the present invention is not limited thereto, but may be applied to other types of recording such as land recording and groove recording.

Further, although embodiments have been described wherein one groove is formed in a spiral shape, the present invention is not limited thereto, but may be applicable to other arrangements such as where one track is formed in a spiral shape by alternately switching lands and grooves, and the like.

Further, although embodiments have been described wherein the total groove or grooves are meandered or varied in accordance with a wobble signal, the present invention is not limited thereto, but may be applicable to other arrangements such as where only one side edge of a groove(s) is varied or where both edges of a groove(s) are varied in accordance with different wobble signals.

Further, although embodiments have been described wherein a magneto-optical disk, a phase change type optical disk and a write once type optical disk may be used in one optical disk device, the present invention is not limited thereto and may be applied to other arrangements such as where only one kind of an optical disk is used in an optical disk device or where a DVD, compact disk or the like in addition to optical disks is used in an optical disk device.

Further, although embodiments have been described wherein a groove is formed such that the track pitch is 0.5 ($\mu$m) in land and groove recording, the present invention is not limited thereto but may be applicable to other cases such as where the groove is formed with a narrower or wider track pitch. However, by setting the track pitch (such as to 0.6 ($\mu$m) or less) and/or the line record density and/or the data redundancy for recording or the like as previously described, a recording capacity of 8 (GB) can be obtained.

Further, although embodiments have been described wherein the thickness of the light transmitting layer is set to 0.1 (mm), the present invention is not limited thereto and other thicknesses or arrangements may be used. For example, thermomagnetic recording can be carried out efficiently by setting the thickness of the light transmitting layer to 177 ($\mu$m) or less and applying a modulation magnetic field from the side of an irradiating laser beam by which the 8 (GB) capacity can be obtained. Incidentally, the thickness of the light transmitting layer should be approximately 3 ($\mu$m) or more to protect the information recording face.

Further, although embodiments have been described wherein user data is recorded with a line record density of 0.21 ($\mu$m/bit), the present invention is not limited thereto but is applicable with other line record densities such as a line record density of 0.23 ($\mu$m/bit). Further, when this is converted into bit length or mark length, the shortest bit length or the shortest mark length of 0.3 ($\mu$m) is an acceptable value. Furthermore, according to the present invention, a modulation system of 8–16 conversion or the like may be utilized and, according to the 8–16 modulation, the maximum run length is 3T, the minimum run length is 1T and the shortest bit length or the shortest mark length is 3/2 bit.

Further, although embodiments have been described wherein a video signal or the like is recorded or reproduced by irradiating laser beam having a wavelength of 650 (nm) or less by an optical system having a numerical aperture of 0.70 or more, the present invention is not limited thereto but may be applicable to other arrangements. When the thickness of the light transmitting layer, the working distance which can be realized and the like are considered, a capacity of approximately 8 (GB) may be obtained when the numerical aperture is 0.7 or more, the working distance is 560 ($\mu$m) or less and the wavelength of the laser beam is 680 (nm) or less.

Further, embodiments have been described wherein 8 Kbytes of data are recorded in a pit row(s) to one address area AR2, the present invention is not limited thereto, but may be applied to other arrangements such as, for example, those in which 2 Kbytes of data, 4 Kbytes of data or the like may be allocated.

Further, although embodiments have been described wherein the same address data ID is recorded by repeating it twice, the present invention is not limited thereto and such repetition may be carried out 3 or more times or such repetition may be omitted.

Further, although embodiments have been described wherein grooves are meandered or varied in accordance with a wobble signal without modulating the wobble signal, the present invention is not limited thereto and may be applied to other arrangements such as those wherein various information may also be recorded by varying the grooves.

Further, although embodiments have been described wherein the meandering period of a groove is changed successively in steps by zoning, the present invention is not limited thereto but may be applicable to other cases such as where the grooves are meandered or varied with a constant meandering period in conversion to the rotational angle, where the meandering period of a groove in conversion to the line speed is made constant and where the meandering period of the groove in conversion to the line speed is changed successively in steps in the radial direction of the optical disk.

Further, although in describing the above-described first through fourth embodiments, reference has been made to a case where a pair of tracks of groove(s) and land(s) are formed in a spiral shape, the present invention is not limited thereto but may be applied to other cases such as that wherein a plurality of pairs of tracks of grooves and lands are formed in a spiral shape.

Further, although in describing the above-described fifth and sixth embodiments reference has been made to a case where one track is formed in a spiral shape by switching land(s) and groove(s) at every turn or rotation of the track, the present invention is not limited thereto but may be applied to other cases such as a case wherein one track is formed in a spiral shape by switching lands and grooves at predetermined angular intervals or a case wherein a plurality of tracks in a spiral shape are formed by repeating lands and grooves.

Further, although embodiments have been described wherein grooves and pits are preformatted on the optical disk, the present invention is not limited thereto but may be applicable to other arrangements such as where only the grooves are preformatted or where only the pits are preformatted.

Further, although embodiments have been described wherein a recordable optical disk is utilized, the present invention is not limited thereto but may be applicable to other types of disks such as an optical disk exclusively for reproducing.

Accordingly, in the present invention, a laser beam having a wavelength $\lambda$ of 680 (nm) or less may be irradiated onto an optical disk by use of an optical system having a numerical aperture NA of 0.7 or more in which the working distance is set to 560 ($\mu$m) or less. As a result, 8 (GB) of data can be recorded onto such disk. Furthermore, the present invention provides an optical disk device for use with an optical disk which may provide a number of functions and which may be relatively easy to operate.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. An optical disk apparatus for recording and/or reproducing user data onto and/or from an optical disk, said apparatus having an optical head having a lens with a numerical aperture (NA) of approximately 0.7 or more and a working distance of approximately 560 ($\mu$m) or less for irradiating a laser beam having a wavelength of approximately 680 (nm) or less to said optical disk, wherein said optical disk includes a light transmitting layer having a thickness value within a range of 10 through 177 ($\mu$m) with a dispersion of +/− $\Delta$t in which $\Delta$t is defined by $$\Delta t \leq \pm 5.26(\lambda/NA^4)(\mu m)$$

wherein NA is numerical aperture and λ is wavelength.

2. The optical disk apparatus according to claim 1, wherein the user data is recorded onto said optical disk as a number of pits or marks in which the shortest pit length or shortest mark length is approximately 0.3 ($\mu$m) or less.

3. The optical disk apparatus according to claim 1, further having means for modulating the user data in accordance with a (1, 7) repeated minimum transition run-length limited (RLL) code modulation technique and wherein the modulated user data is recorded with a record density of 0.23 ($\mu$m/bit) or less.

4. The optical disk apparatus according to claim 1, wherein the user data is recorded onto the optical disk with a track pitch of 0.6 ($\mu$m) or less.

5. The optical disk apparatus according to claim 1, further having a buffer memory and wherein the user data is successively inputted to said buffer memory and transmitted therefrom with a data transmitting speed of approximately 10 Mbps or more in a manner so as to be intermittently recorded onto the optical disk.

6. The optical disk apparatus according to claim 1, further having a buffer memory for intermittently receiving the user data reproduced from the optical disk at a data transmitting speed of approximately 10 Mbps or more and for successively outputting the same therefrom.

7. The optical disk apparatus according to claim 1, wherein redundant data is added to the user data and recorded onto the optical disk so as to provide a redundancy of approximately 23% or less.

8. The optical disk apparatus according to claim 1, wherein said optical disk is rotatably arranged in a cartridge and wherein said cartridge has means for providing access to said optical disk.

9. The optical disk apparatus according to claim 1, wherein a number of grooves having a guide groove of the laser beam vary on said optical disk in a spiral shape or in shapes of concentric circles and wherein a varying period of the groove varies successively in steps from an inner peripheral side to an outer peripheral side of said optical disk, and further having means for rotating said optical disk with a rotational speed which is switched successively in steps in correspondence with the varying period of the groove at a position of the irradiating laser beam.

10. The optical disk apparatus according to claim 1, wherein at least one a groove having a guide groove of the laser beam is formed in a spiral shape or in shapes of concentric circles on said optical disk to form a track, and wherein one revolution of said optical disk is divided into a plurality of sectors based on address information which is recorded in the track, and wherein the user data is recorded in the sectors.

11. The optical disk apparatus according to claim 1, wherein at least one a groove having a guide groove of the laser beam is formed in a spiral shape or in shapes of concentric circles on said optical disk, and wherein the user data is recorded at the groove and a land area adjacent to the groove.

12. The optical disk apparatus according to claim 1, further having a buffer memory and wherein the user data is successively inputted to the buffer memory and intermittently recorded to the optical disk by way of the buffer memory, and wherein a speed of transmitting the user data for recording onto the optical disk is greater than a speed at which the data is supplied to and/or from the buffer memory.

13. The optical disk apparatus according to claim 1, further having a buffer memory and wherein the user data reproduced from the optical disk is intermittently inputted to the buffer memory, and wherein a speed of transmitting the user data during reproducing from the optical disk is greater a speed at which the data is outputted from the buffer memory.

14. The optical disk apparatus according to claim 1, wherein the user data is arranged in a number of predetermined block units and an error correction code is added to each block unit, and wherein the user data is recorded to or reproduced from the optical disk in one or more block units in which a block unit has 32 or more KB of data.

15. An optical disk apparatus for recording and/or reproducing data, said apparatus comprising an optical pickup device having a numerical aperture of 0.70 or more and a working distance of 560 ($\mu$m) or less for irradiating a laser beam onto an optical disk so as to record desired user data onto the optical disk with a shortest pit or mark length of 0.3 ($\mu$m) or less, said optical disk having a diameter of approximately 120 (mm), an information recording portion, and a light transmitting layer through which the laser beam is transmitted to said information recording face and having a thickness value within a range of 10 through 177 ($\mu$m) with a dispersion of +/− Δt in which Δt is defined by $$\Delta t \leq \pm 5.26(\lambda/NA^4)(\mu m)$$

wherein NA is numerical aperture and λ is wavelength, wherein the user data includes video signal data and audio signal data.

16. The optical disk apparatus according to claim 15, wherein the video signal data and the audio signal data have been compressed.

17. The optical disk apparatus according to claim 15, wherein the video signal data and the audio signal data are subjected to data compression and time division multiplexing.

18. The optical disk apparatus according to claim 15, further comprising a buffer memory and a data processing circuit for compressing the video signal data and the audio signal data to form the user data and for expanding the user data to form the video signal data and the audio signal data, wherein the user data is recorded to and reproduced from the optical disk intermittently by way of the buffer memory, and wherein a speed of transmitting the user data to or from the optical disk is greater than a speed at which the user data is transmitted between the buffer memory and the data processing circuit.

19. The optical disk apparatus according to claim 15, further comprising a buffer memory and a data processing circuit for compressing the video signal data and the audio signal data to form the user data and for expanding the user data to form the video signal data and the audio signal data, wherein the user data is recorded to and reproduced from the optical disk intermittently by way of the buffer memory, and wherein a speed of transmitting the user data to or from the optical disk is approximately twice the speed at which the user data is transmitted between the buffer memory and the data processing circuit.

20. The optical disk apparatus according to claim 19, wherein the data processing circuit processes a plurality of channels of the user data in correspondence with a plurality of channels of the video signal data and the audio signal data, wherein the plurality of channels of user data are concurrently inputted and outputted between the buffer memory and the data processing circuit, and wherein the plurality of channels of user data are alternately inputted and outputted between the buffer memory and the optical disk in predetermined data amount units.

21. The optical disk apparatus according to claim 20, wherein the plurality of channels of video signal data and audio signal data are concurrently supplied to the data processing circuit and recorded to the optical disk, and wherein the plurality of channels of video signal data and audio signal data are reproduced from the optical disk and outputted concurrently from the data processing circuit.

22. The optical disk apparatus according to claim 20, wherein the buffer memory outputs user data for recording to the optical disk and receives other user data from the optical disk during reproduction in which the user data for recording is continuously inputted from the data processing circuit and the user data received during reproducing is continuously outputted to the data processing circuit, and wherein the data processing circuit compresses the video signal data and the audio signal data to form the user data for recording and expands the user data obtained during reproduction to form the video signal data and the audio signal data.

23. The optical disk apparatus according to claim 22, wherein the video signal data and the audio signal data for recording are obtained by editing the video signal data and the audio signal data for reproducing, and wherein the user data for recording is recorded at a portion wherein the user data for reproducing is reproduced after a predetermined time period.

24. An optical disk apparatus for recording and/or reproducing data, said apparatus comprising:

an optical pickup device for irradiating a laser beam onto an optical disk having a diameter of approximately 120 (mm), an information recording portion, and a light transmitting layer through which the laser beam is transmitted to said information recording face and having a thickness value within a range of 10 through 177 ($\mu$m) with a dispersion of +/− $\Delta$t in which $\Delta$t is defined by $$\Delta t \leq \pm 5.26(\lambda/NA^4)(\mu m)$$

wherein NA is numerical aperture and $\lambda$ is wavelength; and means for rotating the optical disk such that a rotational speed thereof is varied successively in steps in accordance with a position of the laser beam;

wherein the information recording face of the optical disk is divided into a plurality of regions in shapes of concentric circles and desired data is recorded such that record densities at the respective regions are substantially equalized; and wherein when data recorded on the optical disk is reproduced by switching the regions of the desired data to the regions of a predetermined recording object, the data recorded on the optical disk is reproduced while maintaining the rotational speed of the optical disk in correspondence with the regions of the predetermined recording object.

25. A method of recording and/or reproducing data to and/or from an optical disk, said method comprising the steps of:

varying successively a rotational speed of the optical disk in steps in accordance with a position of a laser beam;

dividing an information recording face of the optical disk into a plurality of regions having shapes of concentric circles; and recording data to the optical disk such that recording densities at respective regions are substantially equal and reproducing recorded data from the optical disk;

wherein when data recorded on the optical disk is reproduced by switching the regions of the desired data to the regions of a predetermined recording object, the data recorded on the optical disk is reproduced while maintaining the rotational speed of the optical disk in correspondence with the regions of the predetermined recording object.

26. The method according to claim 25, wherein the recording and reproducing of the data to and from the optical disk are alternately repeated.

27. An optical disk apparatus for recording and/or reproducing data to and/or from an optical disk, said apparatus comprising:

means for varying successively a rotational speed of the optical disk in steps in accordance with a position of a laser beam;

means for dividing an information recording face of the optical disk into a plurality of regions having shapes of concentric circles; and means for recording data to the optical disk such that recording densities at respective regions are substantially equal and for reproducing recorded data from the optical disk;

wherein when data recorded on the optical disk is reproduced by switching the regions of the desired data to the regions of a predetermined recording object, the data recorded on the optical disk is reproduced while maintaining the rotational speed of the optical disk in correspondence with the regions of the predetermined recording object.

28. The optical disk apparatus according to claim 27, wherein the recording and reproducing of the data to and from the optical disk is alternately repeated.

29. A disk cartridge for accommodating and retaining an optical disk having data recorded thereon by use of an optical head wherein said optical disk can be rotated in said disk cartridge but cannot be easily removed therefrom, said disk cartridge comprising:

an opening extending in a radial direction of said optical disk; and a shutter for closing and exposing said opening when the shutter is respectively moved between first and second positions;

wherein said optical head has a lens with a numerical aperture (NA) of approximately 0.7 or more and a working distance of approximately 560 ($\mu$m) or less and irradiates a laser beam having a wavelength of approximately 680 (nm) or less to said optical disk, and wherein said optical disk includes a light transmitting layer having a thickness value within a range of 10 through 177 ($\mu$m) with a dispersion of +/− $\Delta$t in which $\Delta$t is defined by $$\Delta t \leq \pm 5.26(\lambda/NA^4)(\mu m)$$

wherein NA is numerical aperture and $\lambda$ is wavelength.

30. A disk cartridge according to claim 29, wherein the optical disk has a light transmitting layer with of thickness between 3 and 177 $\mu$m.

31. An optical disk apparatus for recording and/or reproducing user data onto and/or from an optical disk, said apparatus having an optical head having a lens with a numerical aperture (NA) of approximately 0.7 and a working distance of approximately 560 ($\mu$m) for irradiating a laser beam having a wavelength of approximately 680 (nm) to said optical disk.

32. An optical disk apparatus for recording and/or reproducing data, said apparatus comprising an optical pickup device having a numerical aperture of 0.70 and a working distance of 560 ($\mu$m) for irradiating a laser beam onto an optical disk so as to record desired user data onto the optical disk with a shortest pit or mark length of 0.3 ($\mu$m), said optical disk having a diameter of approximately 120 (mm), an information recording portion, and a light transmitting layer through which the laser beam is transmitted to said information recording face and having a thickness value within a range of 10 through 177 ($\mu$m), wherein the user data includes video signal data and audio signal data.

33. A disk cartridge for accommodating and retaining an optical disk having data recorded thereon by use of an optical head wherein said optical disk can be rotated in said disk cartridge but cannot be easily removed therefrom, said disk cartridge comprising:

an opening extending in a radial direction of said optical disk; and a shutter for closing and exposing said opening when the shutter is respectively moved between first and second positions;

wherein said optical head has a lens with a numerical aperture (NA) of approximately 0.7 and a working distance of approximately 560 ($\mu$m) and irradiates a laser beam having a wavelength of approximately 680 (nm) to said optical disk.

* * * * *